(12) United States Patent
Costa et al.

(10) Patent No.: US 12,553,079 B2
(45) Date of Patent: Feb. 17, 2026

(54) NUCLEIC ACID CONCATEMERS AND METHODS FOR STABILIZING AND/OR COMPACTING THE SAME

(71) Applicant: 10x Genomics, Inc., Pleasanton, CA (US)

(72) Inventors: Justin Costa, Union City, CA (US); Jorge Iván Hernández Neuta, Stockholm (SE); Patrick J. Marks, San Francisco, CA (US)

(73) Assignee: 10X GENOMICS, INC., Pleasanton, CA (US)

( * ) Notice: Subject to any disclaimer, the term of this patent is extended or adjusted under 35 U.S.C. 154(b) by 693 days.

(21) Appl. No.: 17/816,995

(22) Filed: Aug. 2, 2022

(65) Prior Publication Data

US 2023/0057571 A1    Feb. 23, 2023

Related U.S. Application Data

(60) Provisional application No. 63/228,827, filed on Aug. 3, 2021.

(51) Int. Cl.
| | |
|---|---|
| *C07H 21/04* | (2006.01) |
| *C12Q 1/6816* | (2018.01) |
| *C12Q 1/682* | (2018.01) |
| *C12Q 1/6832* | (2018.01) |
| *C12Q 1/6837* | (2018.01) |
| *C12Q 1/6841* | (2018.01) |
| *C12Q 1/6844* | (2018.01) |
| *C12Q 1/6876* | (2018.01) |
| *G01N 21/64* | (2006.01) |

(52) U.S. Cl.
CPC ......... *C12Q 1/6837* (2013.01); *C12Q 1/6816* (2013.01); *C12Q 1/682* (2013.01); *C12Q 1/6832* (2013.01); *C12Q 1/6841* (2013.01); *C12Q 1/6844* (2013.01); *C12Q 1/6876* (2013.01); *C12Q 2525/161* (2013.01); *C12Q 2525/307* (2013.01); *C12Q 2527/156* (2013.01); *C12Q 2531/125* (2013.01); *C12Q 2543/101* (2013.01); *C12Q 2563/107* (2013.01); *G01N 21/6458* (2013.01)

(58) Field of Classification Search
CPC .................................................. C12Q 1/6837
See application file for complete search history.

(56) References Cited

U.S. PATENT DOCUMENTS

| | | | |
|---|---|---|---|
| 4,318,846 A | 3/1982 | Khanna et al. | |
| 4,683,195 A | 7/1987 | Mullis et al. | |
| 4,683,202 A | 7/1987 | Mullis | |
| 4,757,141 A | 7/1988 | Fung et al. | |
| 4,800,159 A | 1/1989 | Mullis et al. | |
| 4,849,336 A | 7/1989 | Miyoshi et al. | |
| 4,965,188 A | 10/1990 | Mullis et al. | |
| 5,066,580 A | 11/1991 | Lee | |
| 5,091,519 A | 2/1992 | Cruickshank | |
| 5,151,507 A | 9/1992 | Hobbs et al. | |
| 5,188,934 A | 2/1993 | Menchen | |
| 5,198,537 A | 3/1993 | Huber et al. | |
| 5,344,757 A | 9/1994 | Holtke et al. | |
| 5,354,657 A | 10/1994 | Boehringer et al. | |
| 5,366,860 A | 11/1994 | Bergot et al. | |
| 5,512,462 A | 4/1996 | Cheng | |
| 5,599,675 A | 2/1997 | Brenner | |
| 5,635,352 A | 6/1997 | Urdea et al. | |
| 5,688,648 A | 11/1997 | Mathies | |
| 5,695,940 A | 12/1997 | Drmanac et al. | |
| 5,702,888 A | 12/1997 | Holtke et al. | |
| 5,750,341 A | 5/1998 | Macevicz | |
| 5,800,996 A | 9/1998 | Lee et al. | |
| 5,847,162 A | 12/1998 | Lee et al. | |
| 5,990,479 A | 11/1999 | Weiss et al. | |
| 6,054,274 A | 4/2000 | Sampson et al. | |
| 6,172,218 B1 | 1/2001 | Brenner | |
| 6,207,392 B1 | 3/2001 | Weiss et al. | |
| 6,251,303 B1 | 6/2001 | Bawendi et al. | |

(Continued)

FOREIGN PATENT DOCUMENTS

| | | | |
|---|---|---|---|
| WO | WO 1991/017160 | 11/1991 | |
| WO | WO-2006108422 A2 * | 10/2006 | ........... C12Q 1/6816 |

(Continued)

OTHER PUBLICATIONS

Soares et al. (Acc. Chem. Res. 2021, 54, 3979-3990).*

(Continued)

*Primary Examiner* — Amy Rose Hudson
(74) *Attorney, Agent, or Firm* — Morrison & Foerster LLP

(57) ABSTRACT

The present disclosure in some aspects relates to methods and compositions for accurately detecting and quantifying multiple analytes present in a biological sample. In some aspects, the methods and compositions provided herein address one or more issues associated with the stability and/or size of nucleic acid structures, such as RCPs, in the biological sample without the use of exogenously added oligonucleotide compaction probes. In some embodiments, provided herein are methods involving the use of self-hybridizing hybridizing regions for compacting and/or stabilizing nucleic acid concatemers (e.g., RCPs). In some embodiments, dynamic inter-strand annealing between tandem units of an RCP is used for compaction and/or stabilization. In some embodiments, short palindromic regions in an RCP are used for compaction and/or stabilization.

20 Claims, 11 Drawing Sheets

Specification includes a Sequence Listing.

(56) References Cited

U.S. PATENT DOCUMENTS

| | | |
|---|---|---|
| 6,265,552 B1 | 7/2001 | Schatz |
| 6,291,187 B1 | 9/2001 | Kingsmore et al. |
| 6,306,597 B1 | 10/2001 | Macevicz |
| 6,319,426 B1 | 11/2001 | Bawendi et al. |
| 6,322,901 B1 | 11/2001 | Bawendi et al. |
| 6,323,009 B1 | 11/2001 | Lasken et al. |
| 6,344,329 B1 | 2/2002 | Lizardi et al. |
| 6,368,801 B1 | 4/2002 | Faruqi |
| 6,391,937 B1 | 5/2002 | Beuhler et al. |
| 6,423,551 B1 | 7/2002 | Weiss et al. |
| 6,426,513 B1 | 7/2002 | Bawendi et al. |
| 6,444,143 B2 | 9/2002 | Bawendi et al. |
| 6,534,266 B1 | 3/2003 | Singer |
| 6,576,291 B2 | 6/2003 | Bawendi et al. |
| 6,969,488 B2 | 11/2005 | Bridgham et al. |
| 7,057,026 B2 | 6/2006 | Barnes et al. |
| 7,255,994 B2 | 8/2007 | Lao |
| 7,264,929 B2 | 9/2007 | Rothberg et al. |
| 7,345,159 B2 | 3/2008 | Ju et al. |
| 7,473,767 B2 | 1/2009 | Dimitrov |
| 7,534,991 B2 | 5/2009 | Miller et al. |
| 7,544,794 B1 | 6/2009 | Benner |
| 7,555,155 B2 | 6/2009 | Levenson et al. |
| 7,566,537 B2 | 7/2009 | Balasubramanian et al. |
| 7,655,898 B2 | 2/2010 | Miller |
| 7,893,227 B2 | 2/2011 | Wu et al. |
| 7,910,304 B2 | 3/2011 | Drmanac |
| 7,941,279 B2 | 5/2011 | Hwang et al. |
| 7,989,166 B2 | 8/2011 | Koch et al. |
| 8,124,751 B2 | 2/2012 | Pierce et al. |
| 8,199,999 B2 | 6/2012 | Hoyt et al. |
| 8,268,554 B2 | 9/2012 | Schallmeiner |
| 8,330,087 B2 | 12/2012 | Domenicali |
| 8,415,102 B2 | 4/2013 | Geiss et al. |
| 8,431,691 B2 | 4/2013 | McKernan et al. |
| 8,460,865 B2 | 6/2013 | Chee et al. |
| 8,462,981 B2 | 6/2013 | Determan et al. |
| 8,481,258 B2 | 7/2013 | Church et al. |
| 8,519,115 B2 | 8/2013 | Webster et al. |
| 8,551,710 B2 | 10/2013 | Bernitz et al. |
| 8,632,975 B2 | 1/2014 | Vander Horn et al. |
| 8,658,361 B2 | 2/2014 | Wu et al. |
| 8,771,950 B2 | 7/2014 | Church et al. |
| 8,986,926 B2 | 3/2015 | Ferree et al. |
| 9,201,063 B2 | 12/2015 | Sood et al. |
| 9,217,178 B2 | 12/2015 | Fedurco et al. |
| 9,273,349 B2 | 3/2016 | Nguyen et al. |
| 9,371,563 B2 | 6/2016 | Geiss et al. |
| 9,371,598 B2 | 6/2016 | Chee |
| 9,376,717 B2 | 6/2016 | Gao et al. |
| 9,512,422 B2 | 12/2016 | Barnard et al. |
| 9,541,504 B2 | 1/2017 | Hoyt |
| 9,551,032 B2 | 1/2017 | Landegren et al. |
| 9,624,538 B2 | 4/2017 | Church et al. |
| 9,650,406 B2 | 5/2017 | Zhou et al. |
| 9,714,446 B2 | 7/2017 | Webster et al. |
| 9,714,937 B2 | 7/2017 | Dunaway |
| 9,727,810 B2 | 8/2017 | Fodor et al. |
| 9,778,155 B2 | 10/2017 | Gradinaru et al. |
| 9,783,841 B2 | 10/2017 | Nolan et al. |
| 9,889,422 B2 | 2/2018 | Smith et al. |
| 9,909,167 B2 | 3/2018 | Samusik et al. |
| 10,032,064 B2 | 7/2018 | Hoyt |
| 10,059,990 B2 | 8/2018 | Boyden et al. |
| 10,126,242 B2 | 11/2018 | Miller et al. |
| 10,138,509 B2 | 11/2018 | Church et al. |
| 10,179,932 B2 | 1/2019 | Church et al. |
| 10,227,639 B2 | 3/2019 | Levner et al. |
| 10,246,700 B2 | 4/2019 | Dunaway et al. |
| 10,266,888 B2 | 4/2019 | Daugharthy et al. |
| 10,267,808 B2 | 4/2019 | Cai |
| 10,309,879 B2 | 6/2019 | Chen et al. |
| 10,317,321 B2 | 6/2019 | Tillberg et al. |
| 10,364,457 B2 | 7/2019 | Wassie et al. |
| 10,370,698 B2 | 8/2019 | Nolan et al. |
| 10,415,080 B2 | 9/2019 | Dunaway et al. |
| 10,457,980 B2 | 10/2019 | Cai et al. |
| 10,465,235 B2 | 11/2019 | Gullberg et al. |
| 10,494,662 B2 | 12/2019 | Church et al. |
| 10,495,554 B2 | 12/2019 | Deisseroth et al. |
| 10,501,777 B2 | 12/2019 | Beechem et al. |
| 10,501,791 B2 | 12/2019 | Church et al. |
| 10,510,435 B2 | 12/2019 | Cai et al. |
| 10,526,649 B2 | 1/2020 | Chen et al. |
| 10,545,075 B2 | 1/2020 | Deisseroth et al. |
| 10,550,429 B2 | 2/2020 | Harada et al. |
| 10,580,128 B2 | 3/2020 | Miller |
| 10,640,816 B2 | 5/2020 | Beechem et al. |
| 10,640,826 B2 | 5/2020 | Church et al. |
| 10,669,569 B2 | 6/2020 | Gullberg et al. |
| 10,746,981 B2 | 8/2020 | Tomer et al. |
| 10,774,372 B2 | 9/2020 | Chee et al. |
| 10,774,374 B2 | 9/2020 | Frisén et al. |
| 10,794,802 B2 | 10/2020 | Gradinaru et al. |
| 10,802,262 B2 | 10/2020 | Tomer et al. |
| 10,815,519 B2 | 10/2020 | Husain et al. |
| 10,829,814 B2 | 11/2020 | Fan et al. |
| 10,844,426 B2 | 11/2020 | Daugharthy et al. |
| 10,858,698 B2 | 12/2020 | Church et al. |
| 10,872,679 B2 | 12/2020 | Cai et al. |
| 10,964,001 B2 | 3/2021 | Miller |
| 11,174,281 B1 | 11/2021 | Graham et al. |
| 11,261,485 B2 * | 3/2022 | Namsaraev .......... C12Q 1/6851 |
| 11,287,422 B2 | 3/2022 | Previte et al. |
| 11,434,525 B2 | 9/2022 | Glezer |
| 11,459,603 B2 | 10/2022 | Tyagi et al. |
| 11,499,185 B2 | 11/2022 | Vijayan et al. |
| 11,643,679 B2 | 5/2023 | Glezer et al. |
| 11,788,119 B2 * | 10/2023 | Russel ................. C12Q 1/6853 435/6.11 |
| 11,999,999 B2 | 6/2024 | Ju et al. |
| 2002/0045045 A1 | 4/2002 | Adams et al. |
| 2003/0013091 A1 | 1/2003 | Dimitrov |
| 2003/0017264 A1 | 1/2003 | Treadway et al. |
| 2005/0100900 A1 | 5/2005 | Kawashima et al. |
| 2006/0188901 A1 | 8/2006 | Barnes et al. |
| 2006/0240439 A1 | 10/2006 | Smith et al. |
| 2006/0281109 A1 | 12/2006 | Barr et al. |
| 2007/0166705 A1 | 7/2007 | Milton et al. |
| 2007/0166708 A1 | 7/2007 | Dimitrov et al. |
| 2009/0118128 A1 | 5/2009 | Liu et al. |
| 2010/0015607 A1 | 1/2010 | Geiss et al. |
| 2010/0047924 A1 | 2/2010 | Webster et al. |
| 2010/0055733 A1 | 3/2010 | Lutolf et al. |
| 2010/0112710 A1 | 5/2010 | Geiss et al. |
| 2010/0261026 A1 | 10/2010 | Ferree et al. |
| 2010/0262374 A1 | 10/2010 | Hwang et al. |
| 2011/0059865 A1 | 3/2011 | Smith et al. |
| 2011/0223585 A1 | 9/2011 | Gullberg et al. |
| 2012/0270305 A1 | 10/2012 | Reed et al. |
| 2013/0079232 A1 | 3/2013 | Kain et al. |
| 2013/0260372 A1 | 10/2013 | Buermann et al. |
| 2013/0288249 A1 | 10/2013 | Gullbert |
| 2013/0323729 A1 | 12/2013 | Landegren et al. |
| 2014/0194311 A1 | 7/2014 | Gullberg et al. |
| 2014/0371088 A1 | 12/2014 | Webster |
| 2016/0024555 A1 | 1/2016 | Church et al. |
| 2016/0108458 A1 | 4/2016 | Frei et al. |
| 2016/0305856 A1 | 10/2016 | Boyden et al. |
| 2016/0369329 A1 | 12/2016 | Cai et al. |
| 2016/0376642 A1 | 12/2016 | Landegren et al. |
| 2017/0009278 A1 | 1/2017 | Söderberg et al. |
| 2017/0081489 A1 | 3/2017 | Rodriques et al. |
| 2017/0101672 A1 | 4/2017 | Luo et al. |
| 2017/0219465 A1 | 8/2017 | Desseroth et al. |
| 2017/0220733 A1 | 8/2017 | Zhuang et al. |
| 2017/0253918 A1 | 9/2017 | Kohman |
| 2018/0052081 A1 | 2/2018 | Kohman |
| 2018/0080876 A1 | 3/2018 | Rockel et al. |
| 2018/0208967 A1 | 7/2018 | Larman et al. |
| 2018/0237864 A1 | 8/2018 | Imler et al. |
| 2018/0251833 A1 | 9/2018 | Daugharthy et al. |
| 2018/0320226 A1 | 11/2018 | Church et al. |
| 2018/0327818 A1 | 11/2018 | Landegren et al. |

(56) References Cited

U.S. PATENT DOCUMENTS

| | | |
|---|---|---|
| 2019/0017106 A1 | 1/2019 | Frisen et al. |
| 2019/0032121 A1 | 1/2019 | Daugharthy et al. |
| 2019/0032128 A1 | 1/2019 | Chen et al. |
| 2019/0055594 A1 | 2/2019 | Samusik et al. |
| 2019/0112599 A1 | 4/2019 | Church et al. |
| 2019/0119735 A1 | 4/2019 | Deisseroth et al. |
| 2019/0144940 A1 | 5/2019 | Landegren et al. |
| 2019/0155835 A1 | 5/2019 | Daugharthy et al. |
| 2019/0161796 A1 | 5/2019 | Hauling et al. |
| 2019/0177718 A1 | 6/2019 | Church et al. |
| 2019/0177800 A1 | 6/2019 | Boutet et al. |
| 2019/0194709 A1 | 6/2019 | Church et al. |
| 2019/0218608 A1 | 7/2019 | Daugharthy et al. |
| 2019/0249248 A1 | 8/2019 | Beechem et al. |
| 2019/0264270 A1 | 8/2019 | Zhuang et al. |
| 2019/0271028 A1 | 9/2019 | Khafizov et al. |
| 2019/0276881 A1 | 9/2019 | Zhuang et al. |
| 2019/0339203 A1 | 11/2019 | Miller et al. |
| 2019/0367969 A1 | 12/2019 | Belhocine |
| 2020/0010891 A1 | 1/2020 | Beechem et al. |
| 2020/0071751 A1 | 3/2020 | Daugharthy et al. |
| 2020/0080139 A1 | 3/2020 | Cai et al. |
| 2020/0123597 A1 | 4/2020 | Daniel |
| 2020/0140920 A1 | 5/2020 | Pierce et al. |
| 2020/0224243 A1 | 7/2020 | Desai et al. |
| 2020/0224244 A1 | 7/2020 | Nilsson et al. |
| 2020/0239946 A1 | 7/2020 | Dewal |
| 2020/0354774 A1 | 11/2020 | Church et al. |
| 2020/0354782 A1 | 11/2020 | Dewal |
| 2020/0362398 A1 | 11/2020 | Kishi et al. |
| 2020/0393343 A1 | 12/2020 | Kennedy-Darling et al. |
| 2021/0017587 A1 | 1/2021 | Cai et al. |
| 2021/0115504 A1 | 4/2021 | Cai et al. |
| 2021/0164039 A1 | 6/2021 | Wang et al. |
| 2021/0238662 A1 | 8/2021 | Bava |
| 2021/0238674 A1 | 8/2021 | Bava |
| 2021/0254140 A1 | 8/2021 | Stahl et al. |
| 2021/0262018 A1 | 8/2021 | Bava et al. |
| 2021/0277460 A1 | 9/2021 | Bava |
| 2021/0340618 A1 | 11/2021 | Kuhnemund et al. |
| 2021/0340621 A1 | 11/2021 | Daugharthy et al. |
| 2021/0388423 A1 | 12/2021 | Bava et al. |
| 2021/0388424 A1 | 12/2021 | Bava |
| 2022/0010358 A1 | 1/2022 | Kuhnemund et al. |
| 2022/0049302 A1 | 2/2022 | Daugharthy et al. |
| 2022/0049303 A1 | 2/2022 | Busby et al. |
| 2022/0083832 A1 | 3/2022 | Shah |
| 2022/0084628 A1 | 3/2022 | Shah |
| 2022/0084629 A1 | 3/2022 | Shah |
| 2022/0136049 A1 | 5/2022 | Bava et al. |
| 2022/0186300 A1 | 6/2022 | Bava |
| 2022/0195498 A1 | 6/2022 | Kuhnemund et al. |
| 2022/0213529 A1 | 7/2022 | Kuhnemund et al. |
| 2022/0228200 A1 | 7/2022 | Bava |
| 2022/0235403 A1 | 7/2022 | Costa |
| 2022/0282306 A1 | 9/2022 | Bava et al. |
| 2022/0282316 A1 | 9/2022 | Bava |
| 2022/0282319 A1 | 9/2022 | Verheyen |
| 2022/0372570 A1 | 11/2022 | Costa |
| 2022/0380838 A1 | 12/2022 | Kuhnemund et al. |
| 2022/0403458 A1 | 12/2022 | Bava |
| 2023/0002808 A1 | 1/2023 | Mignardi |
| 2023/0012607 A1 | 1/2023 | Kuhnemund et al. |
| 2023/0013775 A1 | 1/2023 | Chen et al. |
| 2023/0015226 A1 | 1/2023 | Chen et al. |
| 2023/0026886 A1 | 1/2023 | Chen |
| 2023/0031305 A1 | 2/2023 | Hernandez Neuta et al. |
| 2023/0031996 A1 | 2/2023 | Hernandez Neuta et al. |
| 2023/0035685 A1 | 2/2023 | Hernandez Neuta et al. |
| 2023/0037182 A1 | 2/2023 | Bava et al. |
| 2023/0039148 A1 | 2/2023 | Verheyen |
| 2023/0041485 A1 | 2/2023 | Hernandez Neuta et al. |
| 2023/0044650 A1 | 2/2023 | Dockter |
| 2023/0061542 A1 | 3/2023 | Kuhnemund |
| 2023/0084407 A1 | 3/2023 | Hernandez Neuta et al. |
| 2023/0159997 A1 | 5/2023 | Belhocine et al. |
| 2023/0160794 A1 | 5/2023 | Dockter et al. |
| 2023/0183787 A1 | 6/2023 | Bava et al. |
| 2023/0242974 A1 | 8/2023 | Costa et al. |
| 2023/0279465 A1 | 9/2023 | He et al. |
| 2023/0279475 A1 | 9/2023 | Kuhnemund et al. |
| 2023/0279480 A1 | 9/2023 | Kuhnemund |
| 2023/0287478 A1 | 9/2023 | Bava |
| 2023/0314327 A1 | 10/2023 | Hoffman |
| 2023/0314328 A1 | 10/2023 | Costa |
| 2023/0323427 A1 | 10/2023 | Schnall-Levin |
| 2023/0323430 A1 | 10/2023 | Shastry |
| 2023/0323437 A1 | 10/2023 | Chen et al. |
| 2023/0374573 A1 | 11/2023 | Qian et al. |
| 2023/0374580 A1 | 11/2023 | Costa |
| 2023/0416821 A1 | 12/2023 | Bava et al. |
| 2024/0002902 A1 | 1/2024 | Jakobsen et al. |
| 2024/0026426 A1 | 1/2024 | Bava |
| 2024/0026427 A1 | 1/2024 | Kuhnemund et al. |
| 2024/0026439 A1 | 1/2024 | Sasaki |
| 2024/0026448 A1 | 1/2024 | Costa |
| 2024/0035070 A1 | 2/2024 | Christopherson |
| 2024/0035071 A1 | 2/2024 | Delaney et al. |
| 2024/0035072 A1 | 2/2024 | Christopherson |
| 2024/0043910 A1 | 2/2024 | Shastry |
| 2024/0043914 A1 | 2/2024 | Chen et al. |
| 2024/0060119 A1 | 2/2024 | Bava |
| 2024/0084373 A1 | 3/2024 | Shastry |
| 2024/0084378 A1 | 3/2024 | Marks et al. |
| 2024/0101978 A1 | 3/2024 | Boghospor et al. |
| 2024/0132938 A1 | 4/2024 | Kuhnemund |
| 2024/0141418 A1 | 5/2024 | Mielinis |
| 2024/0150816 A1 | 5/2024 | Feng et al. |
| 2024/0158852 A1 | 5/2024 | Belhocine et al. |
| 2024/0167081 A1 | 5/2024 | Bava et al. |
| 2024/0175082 A1 | 5/2024 | Costa |
| 2024/0175083 A1 | 5/2024 | Bava et al. |
| 2024/0191297 A1 | 6/2024 | Christopherson et al. |
| 2024/0209330 A1 | 6/2024 | Shastry et al. |
| 2024/0218424 A1 | 7/2024 | Costa et al. |
| 2024/0218437 A1 | 7/2024 | Belhocine et al. |
| 2024/0263219 A1 | 8/2024 | Kuhnemund |
| 2024/0263220 A1 | 8/2024 | Olofsson |
| 2024/0264155 A1 | 8/2024 | Costa |

FOREIGN PATENT DOCUMENTS

| | | |
|---|---|---|
| WO | WO 2014/163886 | 10/2014 |
| WO | WO 2017/079406 | 5/2017 |
| WO | WO 2017/143155 | 8/2017 |
| WO | WO 2018/026873 | 2/2018 |
| WO | WO 2019/199579 | 10/2019 |
| WO | WO 2020/076976 | 4/2020 |
| WO | WO 2020/076979 | 4/2020 |
| WO | WO 2020/096687 | 5/2020 |
| WO | WO 2020/099640 | 5/2020 |
| WO | WO 2020/117914 | 6/2020 |
| WO | WO 2020/123316 | 6/2020 |
| WO | WO 2020/123742 | 6/2020 |
| WO | WO 2020/142490 | 7/2020 |
| WO | WO 2020/240025 | 12/2020 |
| WO | WO 2020/254519 | 12/2020 |
| WO | WO 2021/123282 | 6/2021 |
| WO | WO 2021/123286 | 6/2021 |
| WO | WO 2021/138676 | 7/2021 |
| WO | WO 2021/155063 | 8/2021 |
| WO | WO 2021/168326 | 8/2021 |
| WO | WO 2023/108139 | 6/2023 |
| WO | WO 2023/141476 | 7/2023 |
| WO | WO 2023/172915 | 9/2023 |
| WO | WO 2023/192302 | 10/2023 |
| WO | WO 2024/148300 | 7/2024 |

OTHER PUBLICATIONS

Archer et al., "Selective and flexible depletion of problematic sequences from RNA-seq libraries at the cDNA stage," BMC Genomics. (2014) 15(1):401.

(56) References Cited

OTHER PUBLICATIONS

Baner et al., "Signal amplification of padlock probes by rolling circle replication," Nucleic Acids Res. (1998) 26(22):5073-5078.
Bibikova et al., "Quantitative gene expression profiling in formalin-fixed, paraffin-embedded tissues using universal bead arrays," Am J Pathol. Nov. 2004; 165(5):1799-807.
Bolognesi et al., "Multiplex Staining by Sequential Immunostaining and Antibody Removal on Routine Tissue Sections," J. Histochem. Cytochem. (2017); 65(8): 431-444.
Capodieci et al., "Gene expression profiling in single cells within tissue," Nat Methods. (2005) 2(9): 663-5.
Chen et al., "Nanoscale imaging of RNA with expansion microscopy," Nat Methods. (2016) 13:679-684.
Chen et al., "RNA imaging. Spatially resolved, highly multiplexed RNA profiling in single cells," Science. (2015) 348(6233): aaa6090. 16 pgs.
Chen et al., "Expansion Microscopy," Science (2015) 347(6221):543-548.
Conze et al., "Single molecule analysis of combinatorial splicing," Nucleic Acids Res. (2010) 38(16): e163.
Dean et al., "Rapid Amplification Of Plasmid And Phage DNA Using Phi29 DNA Polymerase And Multiply-Primed Rolling Circle Amplification," Genome Research (2001) 11:1095-1099.
Eng et al., "Transcriptome-scale super-resolved imaging in tissues by RNA seqFISH," Nature. (2019) 568(7751): 235-239.
Fang et al., "Fluoride-Cleavable Biotinylation Phosphoramidite for 5'-end-Labelling and Affinity Purification of Synthetic Oligonucleotides," Nucleic Acids Res. (2003) 31(2): 708-715.
Faruqi et al., "High-throughput genotyping of single nucleotide polymorphisms with rolling circle amplification," BMC Genomics. (2001) 2:4.
Femino et al., "Visualization of single RNA transcripts in situ," Science. (1998) 280(5363): 585-90.
Forcucci et al., "All-plastic miniature fluorescence microscope for point-of-care readout of bead-based bioassays," J Biomed Opt. (2015) 20(10): 105010.
Gavrilovic et al., "Automated classification of multicolored rolling circle products in dual-channel wide-field fluorescence microscopy," Cytometry A. (2011) 79(7): 518-27.
Geiss et al., "Direct multiplexed measurement of gene expression with color-coded probe pairs," Nat Biotechnol. (2008) 26(3): 317-25.
Glass et al., "SIMPLE: a sequential immunoperoxidase labeling and erasing method," J Histochem Cytochem. (2009) 57(10); 899-905.
Goh, J.J.L et al. (Jul. 2020, e-pub. Jun. 15, 2020). "Highly Specific Multiplexed RNA Imaging In Tissues With Split-FISH," Nat Methods 17(7):689-693. doi: 10.1038/s41592-020-0858-0. Epub Jun. 15, 2020.
Goransson et al., "A single molecule array for digital targeted molecular analyses," Nucleic Acids Res. 2009 37(1):e7. doi: 10.1093/nar/gkn921.
Gunderson et al. "Decoding randomly ordered DNA arrays." Genome research 14.5 (2004): 870-877.
Gyllborg et al., "Hybridization-based in situ sequencing (HybISS) for spatially resolved transcriptomics in human and mouse brain tissue," Nucleic Acids Res. (2020) 48(19): e112.
Han et al., "Quantum-dot-tagged microbeads for multiplexed optical coding of biomolecules," Nat Biotechnol. (2001) 19(7): 631-5.
Henegariu et al., "Custom fluorescent-nucleotide synthesis as an alternative method for nucleic acid labeling," Nature Biotechnol. (2000) 18:345.
Itzkovitz et al., "Single-molecule transcript counting of stem-cell markers in the mouse intestine," Nat Cell Biol. (2011) 14(1): 106-14.
Itzkovitz et al., "Validating Transcripts with Probes and Imaging Technology," Nat Methods. (2011) 8(4 Suppl): S12-S19.
Jamur et al., "Permeabilization of cell membranes," Method Mol. Biol. (2010) 588: 63-66 (abstract only).
Korlach et al. "Selective aluminum passivation for targeted immobilization of single DNA polymerase molecules in zero-mode waveguide nanostructures." *Proceedings of the National Academy of Sciences* 105.4 (2008): 1176-1181.
Krzywkowski et al., "Fidelity of RNA templated end-joining by chlorella virus DNA ligase and a novel iLock assay with improved direct RNA detection accuracy," Nucleic Acids Res. (2017) 45(18): e161.
Lagunavicius et al., "Novel application of Phi29 DNA polymerase: RNA detection and analysis in vitro and in situ by target RNA-primed RCA," RNA. (2009) 15(5):765-71.
Lakowicz et al., "Silver particles enhance emission of fluorescent DNA oligomers," Bio Techniques (2003) 34(1); 62-66.
Larsson et al. "In situ detection and genotyping of individual mRNA molecules," Nat Methods. (2010) 7(5):395-397.
Lee et al. "Highly Multiplexed Subcellular RNA Sequencing In Situ", Science (2014) 343(6177):1360-1363.
Levene et al. "Zero-mode waveguides for single-molecule analysis at high concentrations." *science* 299.5607 (2003): 682-686.
Levsky et al., "Fluorescence in situ hybridization: past, present and future," J Cell Sci. (2003) 116(Pt 14): 2833-8.
Levsky et al., "Single-cell gene expression profiling," Science. (2002) 297(5582): 836-40.
Lin et al., "Highly multiplexed imaging of single cells using a high-throughput cyclic immunofluorescence method," Nat Commun. (2015) 6:8390.
Liu et al. Barcoded oligonucleotides ligated on RNA amplified for multiplexed and parallel in situ analyses. Nucleic Acids Res. (2021) 49(10):e58, 15 pages. doi: 10.1093/nar/gkab120.
Lizardi et al., "Mutation detection and single-molecule counting using isothermal rolling-circle amplification," Nat Genet. (1998) 19(3): 225-232.
Lundquist et al. "Parallel confocal detection of single molecules in real time." Optics letters 33.9 (2008): 1026-1028.
Lyamichev et al., "Comparison of the 5' nuclease activities of taq DNA polymerase and its isolated nuclease domain," Proc Natl Acad Sci USA. (1999) 96(11): 6143-6148.
Ma et al., "RNA template-dependent 5' nuclease activity of Thermus aquaticus and Thermus thermophilus DNA polymerases," J Biol Chem. (2000) 275(32): 24693-700.
Maierhorfer et al., "Multicolor deconvolution microscopy of thick biological specimens," Am J Pathol. (2003) 162(2): 373-9.
McGinn et al., "New technologies for DNA analysis—a review of the READNA Project," N Biotechnol. (2016) 33(3): 311-30. doi: 10.1016/j.nbt.2015.10.003.
Meade et al. "Multiplexed DNA detection using spectrally encoded porous SiO2 photonic crystal particles," Anal Chem. (2009) 81(7): 2618-25.
Mitra et al., "Fluorescent in situ sequencing on polymerase colonies," Anal. Biochem. (2003) 320, 55-65.
Moffitt et al., "RNA Imaging with Multiplexed Error-Robust Fluorescence In Situ Hybridization (MERFISH)," Methods in Enzymology, (2016) 572; 1-49.
Mohsen et al., "The Discovery of Rolling Circle Amplification and Rolling Circle Transcription," Acc Chem Res. (2016) 49(11): 2540-2550.
Nallur et al., "Signal amplification by rolling circle amplification on DNA microarrays," Nucleic Acids Res. (2001) 29(23): e118.
Payne et al. "In situ genome sequencing resolves DNA sequence and structure in intact biological samples," Science. (2021) 371(6532): eaay3446. doi: 10.1126/science.aay3446. Epub Dec. 31, 2020.
Pirici et al., "Antibody elution method for multiple immunohistochemistry on primary antibodies raised in the same species and of the same subtype," J Histochem Cytochem. (2009) 57(6); 567-75.
Raj et al., "Imaging individual mRNA molecules using multiple singly labeled probes," Nat Methods. (2008) 5(10): 877-879.
Rajeswari et al., "Multiple pathogen biomarker detection using an encoded bead array in droplet PCR," J Microbiol Methods. (2017) 139: 22-28.
Rouhanifard et al. "ClampFISH detects individual nucleic acid molecules using click chemistry-based amplification," Nat Biotechnol. (2018) 17 pages. doi: 10.1038/nbt.4286.

(56) References Cited

OTHER PUBLICATIONS

Schweitzer et al. "Immunoassays with rolling circle DNA amplification: A versatile platform for ultrasensitive antigen detection," Proc. Natl Acad. Sci. USA (2000) 97:10113-119.

Schweitzer et al., "Multiplexed protein profiling on microarrays by rolling-circle amplification," Nature Biotech. (2002) 20:359-365.

Shendure et al., "Accurate multiplex polony sequencing of an evolved bacterial genome," Science (2005) 309(5741); 1728-1732.

Sun et al., "Composite organic-inorganic nanoparticles as Raman labels for tissue analysis," Nano Lett. (2007) 7(2): 351-6.

Takei et al., (Feb. 2021, e-pub Jan. 27, 2021). "Integrated Spatial Genomics Reveals Global Architecture Of Single Nuclei," Nature 590(7845):344-350, 53 pages. doi: 10.1038/s41586-020-03126-2.

Vandernoot et al., "cDNA normalization by hydroxyapatite chromatography to enrich transcriptome diversity in RNA-seq applications," Biotechniques, (2012) 53(6) 373-80.

Wahlby et al., "Sequential immunofluorescence staining and image analysis for detection of large numbers of antigens in individual cell nuclei," Cytometry. (2002) 47(1): 32-41.

Wang et al., "Three-dimensional intact-tissue sequencing of single-cell transcriptional states," Science. (2018) 361(6400): eaat5691.

Weibrecht et al., "Simultaneous visualization of both signaling cascade activity and end-point gene expression in single cells," PLoS One. (2011) 6(5): e20148.

Wetmur, "DNA Probes: Applications of the Principles of Nucleic Acid Hybridization," Critical Reviews in Biochemistry and Molecular Biology, (1991) 26(91); 227-259.

Wilson et al., "Encoded microcarriers for high-throughput multiplexed detection," Angew Chem Int Ed Engl. (2006) 18;45(37): 6104-17.

Wu, C. et al. "RollFISh Achieves Robust Quantification Of Single-Molecule RNA Biomarkers In Paraffin-Embedded Tumor Tissue Samples," Commun Biol. (2018) 1:(209):1-8. doi: 10.1038/s42003-018-0218-0.

Zhao et al., "Advances of multiplex and high throughput biomolecular detection technologies based on encoding microparticles," Sci China Chem. (2011) 54(8):1185.

Chen et al., "Efficient in situ barcode sequencing using padlock probe-based BaristaSeq," Nucleic Acids Res. (2018) 46(4): e22.

Sun et al., "Integrating barcoded neuroanatomy with spatial transcriptional profiling enables identification of gene correlates of projections," Nat Neurosci. (2021) 24(6):873-885.

* cited by examiner

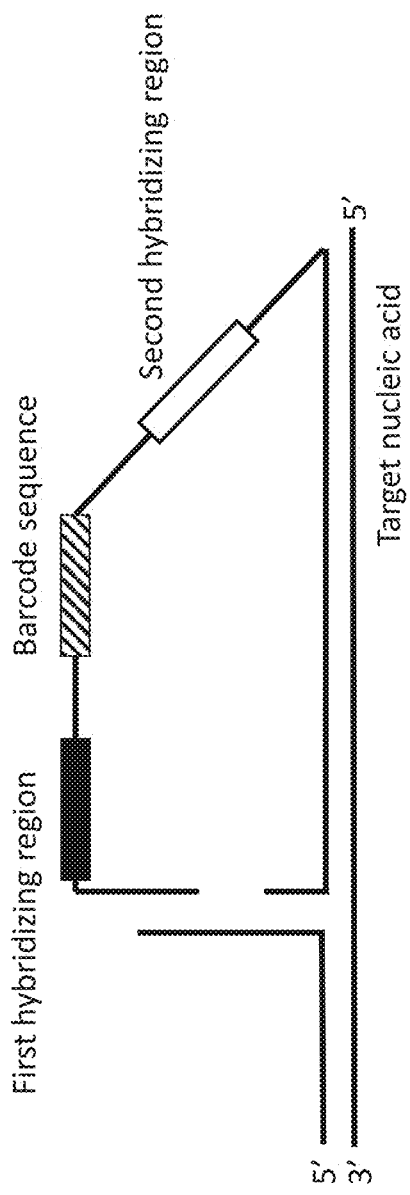
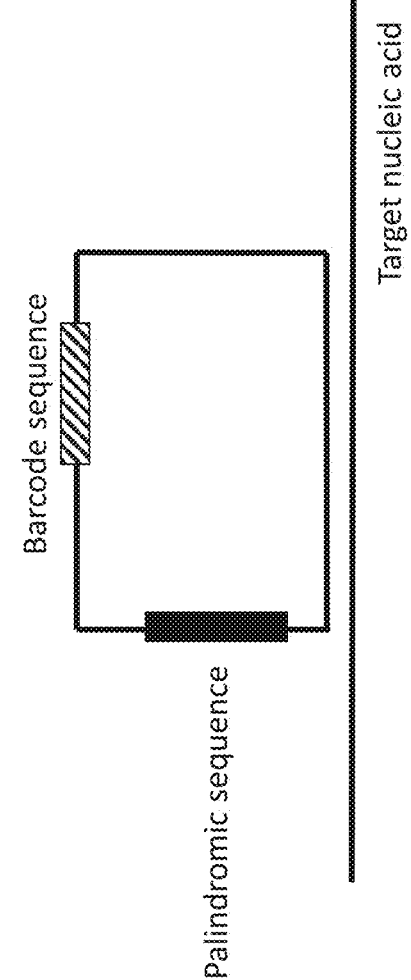
FIG. 1A
FIG. 1B

SEQUENCE LISTING

```
Sequence total quantity: 1
SEQ ID NO: 1           moltype = DNA  length = 12
FEATURE                Location/Qualifiers
source                 1..12
                       mol_type = other DNA
                       organism = synthetic construct
SEQUENCE: 1
aggtagctac ct                                                          12
```

US 12,553,079 B2

NUCLEIC ACID CONCATEMERS AND METHODS FOR STABILIZING AND/OR COMPACTING THE SAME

CROSS-REFERENCE TO RELATED APPLICATIONS

This application claims priority to U.S. Provisional Patent Application No. 63/228,827, filed Aug. 3, 2021, entitled "NUCLEIC ACID CONCATEMERS AND METHODS FOR STABILIZING AND/OR COMPACTING THE SAME," which is herein incorporated by reference in its entirety for all purposes.

REFERENCE TO AN ELECTRONIC SEQUENCE LISTING

The contents of the electronic sequence listing (202412009300SEQLIST.xml; Size: 1,926 bytes; and Date of Creation: Jul. 28, 2022) is herein incorporated by reference in its entirety.

FIELD

The present disclosure relates in some aspects to methods and compositions for analyzing a biological sample, such as probes for generating stable and/or compact nucleic acid molecules, structures, and/or complexes for in situ analysis.

BACKGROUND

Methods are available for analyzing nucleic acids in a biological sample in situ, such as a cell or a tissue. For instance, advances in single molecule fluorescent hybridization (smFISH) have enabled nanoscale-resolution imaging of RNA in cells and tissues. However, oligonucleotide probe-based assay methods for in situ analysis may suffer from low sensitivity, specificity, and/or detection efficiency and may require careful and laborious optimization. Improved methods for in situ analysis are needed. The present disclosure addresses these and other needs.

BRIEF SUMMARY

There is a need for increasing the compaction and/or stability of structures comprising nucleic acid molecules (e.g., nucleic acid concatemers such as rolling circle amplification products (RCPs)) during in situ analysis of a biological sample. For example, compaction of nucleic acid in the sample (e.g., a cell or tissue sample) may allow for better resolution of signals and resolution of individual nucleic acid molecules. Furthermore, probe/target hybridization complexes and/or RCPs may become destabilized (e.g., when wash conditions are too stringent), which may result in a decrease in the number of useful signals, impaired spatial fidelity of signals between hybridization cycles, and loss of information in the assay.

Provided herein are methods and compositions for compaction and/or stabilization of structures comprising nucleic acid molecules in situ in a biological sample, including methods for enhancing the compaction and/or stability of nucleic acid molecules prior to and/or during the in situ analysis, e.g., for decoding nucleic acid barcode sequences through sequential cycles of detectable probe hybridization (directly or indirectly) to the nucleic acid molecules (e.g., nucleic acid concatemers such as RCPs). The compaction and/or stabilization may be achieved through hybridization of a region (e.g., a hybridizing region or complement or reverse complement thereof) within the nucleic acid molecule to other copies of regions (e.g., other copies of the hybridizing region or complement or reverse complement thereof) within the nucleic acid molecule. In some embodiments, the region comprises a palindromic sequence.

In some embodiments, disclosed herein is a method comprising generating a nucleic acid concatemer outside a biological sample. In some embodiments, the generated nucleic acid concatemer can be deposited or attached (e.g., immobilized) to a substrate (e.g., a planar substrate or a bead) or matrix (e.g., a hydrogel matrix). In some embodiments, the generated nucleic acid concatemer comprises multiple copies of a hybridizing region. Different copies of the hybridizing region may hybridize to one another, thereby stabilizing and/or compacting the nucleic acid concatemer.

In some embodiments, disclosed herein is a method comprising generating a nucleic acid concatemer in a biological sample. In some embodiments, the method comprises generating a nucleic acid concatemer in situ in the biological sample.

In some aspects, provided herein is a method for analyzing a biological sample, comprising (a) contacting a biological sample with a circular probe or circularizable probe or probe set that hybridizes to a target nucleic acid in the biological sample, wherein the circular probe or circularizable probe or probe set comprises a first hybridizing region and a second hybridizing region capable of hybridizing to each other, and (b) generating a rolling circle amplification product in situ in the biological sample using the circular probe or a circularized probe generated from the circularizable probe or probe set as a template, wherein the rolling circle amplification product comprises multiple copies of complementary sequences of the first and second hybridizing regions, and wherein the complementary sequences of the first and second hybridizing regions from different copies hybridize to on another, thereby compacting and/or stabilizing the rolling circle amplification product in situ in the biological sample. In some embodiments, the complementary sequence of the first hybridizing region in a first copy hybridizes to the complementary sequence of the second hybridizing region in a second copy. In some embodiments, the complementary sequence of the second hybridizing region in the first copy hybridizes to the complementary sequence of the first hybridizing region in the second copy. Alternatively, in some embodiments, the complementary sequence of the second hybridizing region in the first copy hybridizes to the complementary sequence of the first hybridizing region in a third copy, optionally wherein the complementary sequence of the first hybridizing region in the second copy hybridizes to the complementary sequence of the second hybridizing region in the third copy or optionally wherein the complementary sequence of the first hybridizing region in the second copy hybridizes to the complementary sequence of the second hybridizing region in a fourth copy. In any of the proceeding embodiments, the first, second, third, and fourth copies can be distinct copies of a unit sequence in the rolling circle amplification product.

In any of the embodiments herein, the first and second hybridizing regions may be complementary to each other. In any of the embodiments herein, the first and/or second hybridizing regions may comprise a palindromic sequence. In any of the embodiments herein, the circular probe or circularizable probe or probe set may further comprise a third hybridizing region and a fourth hybridizing region capable of hybridizing to each other. In any of the embodiments herein, the first and second hybridizing regions may be different in sequence from the third and fourth hybridizing regions, respectively. In any of the embodiments herein, the first and second hybridizing regions may not hybridize to the third or fourth hybridizing regions. In any of the embodiments herein, the first and second compactions regions may be the same in sequence as the third and fourth hybridizing regions, respectively.

In any of the embodiments herein, the circular probe or circularizable probe or probe set may further comprise one or more barcode sequences. In any of the embodiments herein, the first and second hybridizing regions may be linked by a loop region, wherein the loop region optionally comprises one or more barcode sequences. In any of the embodiments herein, the loop regions may be no more than 5, no more than 10, no more than 15, no more than 20, no more than 25, or no more than 30 nucleotides in length.

In any of the embodiments herein, the first, second, third, and/or fourth hybridizing regions independently may be between about 5 and 40 nucleotides in length. In any of the embodiments herein, the first, second, third, and/or fourth hybridizing regions independently hybridizing region may be between about 8 and 15 nucleotides in length. In any of the embodiments herein, the first, second, third, and/or fourth hybridizing regions independently hybridizing region may be no more than 14 nucleotides in length. In any of the embodiments herein, the first, second, third, and/or fourth hybridizing regions hybridizing region independently may be between 15 and 35 nucleotides in length. In any of the embodiments herein, the first, second, third, and/or fourth hybridizing regions may be independently 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 nucleotides in length.

In any of the embodiments herein, the circularizable probe may be a padlock probe. In any of the embodiments herein, the padlock probe may be no more than 25, no more than 30, no more than 40, no more than 50, no more than 60, no more than 70, no more than 80, no more than 90, no more than 100, no more than 110, or no more than 120 nucleotides in length.

In any of the embodiments herein, the melting temperature of a duplex of the first and second hybridizing regions (or complements thereof) may be in thermodynamic equilibrium with the temperature at which the rolling circle amplification product is generated. In any of the embodiments herein, the melting temperature may be between about 15° C. and about 45° C. In any of the embodiments herein, the melting temperature may be between about 15° C. and about 20° C. In any of the embodiments herein, the melting temperature may be between about 20° C. and about 25° C. In any of the embodiments herein, the melting temperature may be between about 25° C. and about 30° C. In any of the embodiments herein, the melting temperature may be between about 30° C. and about 35° C. In any of the embodiments herein, the temperature at which the rolling circle amplification product is generated may be between about 15° C. and about 45° C. In any of the embodiments herein, the melting temperature may be the same as the rolling circle amplification temperature. In any of the embodiments herein, the melting temperature may be about 15° C.-20° C. such as 18° C., and the rolling circle amplification product may be generated at about 15° C.-20° C. such as 18° C. In any of the embodiments herein, the melting temperature may be about 30° C., and the rolling circle amplification product may be generated at about 30° C.

In any of the embodiments herein, wherein in the rolling circle amplification product, the complementary sequence of the first hybridizing region of a first copy may hybridize to the complementary sequence of the second hybridizing region of a second copy, and the complementary sequence of the second hybridizing region of the first copy may hybridize to the complementary sequence of the first hybridizing region of the second copy. In any of the embodiments herein, the first and second copies may be adjacent to each other. In any of the embodiments herein, the first and second copies may be separated by 0, 1, 2, 5, 10, 20, 50, 100, or more copies in the rolling circle amplification product.

In any of the embodiments herein, the compacted rolling circle amplification product may have a diameter of between about 0.1 µm and about 3 µm, e.g., between about 0.1 µm and about 0.5 µm (e.g., between about 0.2 µm and about 0.3 µm, or between about 0.3 µm and about 0.4 µm), between about 0.5 µm and about 1 µm, between about 0.8 µm and about 1.3 µm, or between about 1 µm and about 1.5 µm. In any of the embodiments herein, the compacted rolling circle amplification product may be between about 1 and about 15 kilobases, between about 15 and about 25 kilobases, between about 25 and about 35 kilobases, between about 35 and about 45 kilobases, between about 45 and about 55 kilobases, between about 55 and about 65 kilobases, between about 65 and about 75 kilobases, or more than 75 kilobases in length, e.g., between about 45 and about 70 kilobases. In any of the embodiments herein, the compacted rolling circle amplification product may comprise between about 10 and about 100, between about 100 and about 1,000, between about 1,000 and about 5,000, between about 5,000 and about 10,000, or more than 10,000 copies. In any of the embodiments herein, the compacted rolling circle amplification product may be a product of an endogenous nucleic acid molecule in the biological sample. In some embodiments, the product is an extension product, a replication product, a reverse transcription product, and/or a rolling circle amplification (RCA) product. In some embodiments, the endogenous nucleic acid molecule is a viral or cellular DNA or RNA. In some embodiments, the endogenous nucleic acid molecule is genomic DNA/RNA, mRNA, or cDNA.

In any of the embodiments herein, the compacted rolling circle amplification product may comprise one or more barcode sequences. In some embodiments, the barcode sequence corresponds to a target nucleic acid in the biological sample. In any of the embodiments herein, the compacted rolling circle amplification product may be a product of a labelling agent that directly or indirectly binds to a target nucleic acid in the biological sample. In any of the embodiments herein, the labelling agent may comprise a reporter oligonucleotide. In some embodiments, the reporter oligonucleotide comprises one or more barcode sequences and the compacted rolling circle amplification product comprises one or a plurality of copies of the one or more barcode sequences.

In any of the embodiments herein, the compacted rolling circle amplification product may be generated from a plurality of different mRNA and/or cDNA molecules are analyzed, a barcode sequence in a particular circular or circularizable probe or probe set uniquely corresponds to a particular mRNA or cDNA molecule, and the particular circular or circularizable probe or probe set further comprises an anchor sequence that is common among circular or circularizable probes or probe sets for a subset of the plurality of different mRNA and/or cDNA molecules. In any of the embodiments herein, the target nucleic acid may comprise a DNA or an RNA. In any of the embodiments herein, the target nucleic acid may be cDNA or mRNA. In any of the embodiments herein, the target nucleic acid may be a pre-mRNA.

In any of the embodiments herein, the compacted rolling circle amplification product may be immobilized in the biological sample. In any of the embodiments herein, the compacted rolling circle amplification product may be cross-linked to one or more other molecules in the biological sample. In any of the embodiments herein, the method may comprise imaging the biological sample to detect the nucleic acid concatemer. In some embodiments, the imaging comprises fluorescent microscopy. In any of the embodiments herein, the sequence of the nucleic acid molecule may be analyzed in situ in the biological sample. In any of the embodiments herein, the sequence of the nucleic acid concatemer may be analyzed by sequential hybridization, sequencing by hybridization, sequencing by ligation, sequencing by synthesis, sequencing by binding, or a combination thereof. In any of the embodiments herein, the sequence to by analyzed may comprise a barcode sequence. In some embodiments, the barcode sequence corresponds to a target nucleic acid or a portion thereof or a labelling agent for an analyte or portion thereof in the biological sample.

In any of the embodiments herein, the biological sample may be a tissue section. In any of the embodiments herein, the biological sample may be a processed or cleared biological sample. In any of the embodiments herein, the biological sample may be an intact tissue sample or a non-homogenized tissue sample. In any of the embodiments herein, the tissue sample may be a tissue slice between about 1 μm and about 50 μm in thickness. In some embodiments, the tissue slice is between about 5 μm and about 35 μm in thickness. In any of the embodiments herein, the tissue sample may be embedded in a hydrogel. In any of the embodiments herein, the nucleic acid concatemer may be crosslinked to the hydrogel. In any of the embodiments herein, the nucleic acid concatemer may comprise one or more functional groups for attachment to the hydrogel. In any of the embodiments herein, the biological sample may be a fixed tissue sample. In some embodiments, the tissue sample is a formalin-fixed, paraffin-embedded (FFPE) sample, a frozen tissue sample, or a fresh tissue sample.

In some aspects, provided herein is a method for analyzing a biological sample, comprising: (a) contacting the biological sample with a circular probe or circularizable probe or probe set comprising a sequence that hybridizes to a target nucleic acid in the biological sample, wherein the circular probe or circularizable probe or probe set comprises (i) a first hybridizing region and a second hybridizing region capable of hybridizing to each other and (ii) one or more barcode sequences, wherein the first and second hybridizing regions are linked by a loop region, optionally wherein the loop region comprises the one or more barcode sequences, and optionally wherein the target nucleic acid is a cDNA or an mRNA; and (b) generating a rolling circle amplification product in situ in the biological sample using the circular probe or a circularized probe generated from the circularizable probe or probe set as a template, wherein the rolling circle amplification product comprises multiple copies of complementary sequences of the first and second hybridizing regions, and wherein the complementary sequences of the first and second hybridizing regions from different copies hybridize to one another, thereby compacting and/or stabilizing the rolling circle amplification product in situ in the biological sample.

In some aspects, provided herein is a method for analyzing a biological sample, comprising: (a) contacting the biological sample with a padlock probe comprising a sequence that hybridizes to a target nucleic acid in the biological sample, wherein the padlock probe comprises: (i) a first hybridizing region and a second hybridizing region capable of hybridizing to each other, wherein the first and second hybridizing regions are linked by a first loop region; (ii) a third hybridizing region and a fourth hybridizing region capable of hybridizing to each other, wherein the third and fourth hybridizing regions are linked by a second loop region; and (iii) one or more barcode sequences in the first and/or second loop regions; and (b) generating a rolling circle amplification product in situ in the biological sample using a circularized padlock probe as a template, wherein the padlock probe is circularized to generate the circularized padlock probe using the target nucleic acid and/or a splint as template, wherein the rolling circle amplification product comprises multiple copies of complementary sequences of the first, second, third, and fourth hybridizing regions, and wherein the complementary sequences of the first and second hybridizing regions from two or more different copies hybridize to one another and the complementary sequences of the third and fourth hybridizing regions from two or more different copies hybridize to one another, thereby compacting and/or stabilizing the rolling circle amplification product in situ in the biological sample.

In any of the embodiments herein, the melting temperature of a duplex of the first and second hybridizing regions and the melting temperature of a duplex of the third and fourth hybridizing regions may be in thermodynamic equilibrium with the temperature at which the rolling circle amplification product is generated (e.g., an RCA reaction temperature such as between about 15° C. and about 45° C.). In any of the embodiments herein, the complementary sequences of the first and/or second hybridizing regions may hybridize to the complementary sequences of the third and/or fourth hybridizing regions. Alternatively, in any of the embodiments herein, the complementary sequences of the first and second hybridizing regions may not hybridize to the complementary sequences of the third and fourth hybridizing regions.

In some aspects, provided herein is a method for analyzing a biological sample, comprising: (a) contacting the biological sample with a padlock probe comprising a sequence that hybridizes to a target nucleic acid in the biological sample, wherein the padlock probe comprises: (i) a first hybridizing region and a second hybridizing region capable of hybridizing to each other, wherein the first and second hybridizing regions are linked by a loop region; and (iii) one or more barcode sequences; and (b) generating a rolling circle amplification product in situ in the biological sample using a circularized padlock probe as a template, wherein the padlock probe is circularized to generate the circularized padlock probe using the target nucleic acid and/or a splint as template, wherein the rolling circle amplification product comprises multiple copies of a unit sequence comprising complementary sequences of the first and second hybridizing regions, and wherein the complementary sequence of the first hybridizing region from a first copy hybridize to the complementary sequence of the second hybridizing region from a second copy, and the complementary sequence of the second hybridizing region from the first copy hybridize to the complementary sequence of the first hybridizing region from the second copy, thereby compacting and/or stabilizing the rolling circle amplification product in situ in the biological sample.

In any of the embodiments herein, the first and second copies can be adjacent copies of the unit sequence in the rolling circle amplification product. Alternatively, in any of the embodiments herein, the first and second copies may be separated by one or more copies of the unit sequence in the rolling circle amplification product. In any of the embodiments herein, hybridization between sequences in different copies of the unit sequence may be favored over hybridization between sequences in the same copy of the unit sequence.

In any of the embodiments herein, the melting temperature of a duplex comprising (i) the complementary sequence of the first hybridizing region from the first copy hybridized to the complementary sequence of the second hybridizing region from the second copy and (ii) the complementary sequence of the second hybridizing region from the first copy hybridized to the complementary sequence of the first hybridizing region from the second copy can be higher than: (a) the melting temperature of a duplex comprising the complementary sequence of the first hybridizing region from the first copy hybridized to the complementary sequence of the second hybridizing region from the first copy, and/or (b) the melting temperature of a duplex comprising the complementary sequence of the first hybridizing region from the second copy hybridized to the complementary sequence of the second hybridizing region from the second copy.

In any of the embodiments herein, in the circularized padlock probe, the first and second hybridizing regions linked by the loop region may form a hairpin structure, wherein the first and second hybridizing regions form a duplex stem region of the hairpin structure. In any of the embodiments herein, the loop region can be about four nucleotides in length, and the duplex stem region can be between about 10 and about 40 base pairs. In some embodiments, the duplex stem region is about 30 base pairs. In any of the embodiments herein, in addition to the hairpin structure, the circularized padlock probe can further comprise a sequence between about 50 and about 120 nucleotides in length.

In any of the embodiments herein, the circularized padlock probe may form a dumbbell structure, wherein the first and second hybridizing regions form a duplex stem region of the dumbbell structure flanked by the first loop region and a second loop region. In any of the embodiments herein, the first loop region can be between about 15 and about 60 nucleotides in length, the second loop region can be between about 30 and about 60 nucleotides in length, and the duplex stem region can be between about 5 and about 30 base pairs. In some embodiments, the duplex stem region is about 10 base pairs.

In any of the embodiments herein, the method can further comprise crosslinking the rolling circle amplification product to itself, to one or more other molecules in the biological sample, and/or to a matrix embedding the biological sample. In some embodiments, the crosslinking reduces the mobility of the rolling circle amplification product in the biological sample and/or in the matrix.

In any of the embodiments herein, the method can further comprise detecting the rolling circle amplification product in situ in the biological sample and/or in a matrix embedding the biological sample or molecules thereof.

In any of the embodiments herein, the detecting may comprise detecting the one or more barcode sequences and/or complements thereof.

In any of the embodiments herein, the one or more barcode sequences and/or complements thereof can be analyzed (e.g., detected or sequenced) using any suitable methods or techniques, including those described herein, such as RNA sequential probing of targets (RNA SPOTs), sequential fluorescent in situ hybridization (seqFISH), single-molecule fluorescent in situ hybridization (smFISH), multiplexed error-robust fluorescence in situ hybridization (MERFISH), in situ sequencing, hybridization-based in situ sequencing (HybISS), targeted in situ sequencing, fluorescent in situ sequencing (FISSEQ), sequencing by synthesis (SBS), sequencing by ligation (SBL), sequencing by hybridization (SBH), or spatially-resolved transcript amplicon readout mapping (STARmap). In any of the embodiments herein, the methods provided herein can comprising analyzing the one or more barcode sequences and/or complements thereof by sequential hybridization and detection with a plurality of detectable probes, such as fluorescently-labelled probes and/or intermediate probes that are capable of binding to fluorescently-labelled probes as well as the barcode sequences and/or complements thereof.

BRIEF DESCRIPTION OF THE DRAWINGS

The drawings illustrate certain embodiments of the features and advantages of this disclosure. These embodiments are not intended to limit the scope of the appended claims in any manner.

FIGS. 1A-1C each depicts an exemplary circular probe or circularizable probe or probe set, comprising a first hybridizing region and a second hybridizing region capable of hybridizing to each other (FIG. 1A), a palindromic sequence (FIG. 1B), or a first hybridizing region and a second hybridizing region capable of hybridizing to each other and a third hybridizing region and a fourth hybridizing region capable of hybridizing to each other (FIG. 1C). The hybridizing regions may but do not need to be palindromic sequences. The first and second hybridizing regions are of the same sequence when they are palindromic. The circular probe or circularizable probe or probe set may comprise one or more barcode sequences that can be used to identify the target nucleic acid during downstream analyses.

DETAILED DESCRIPTION

Figure 1C:
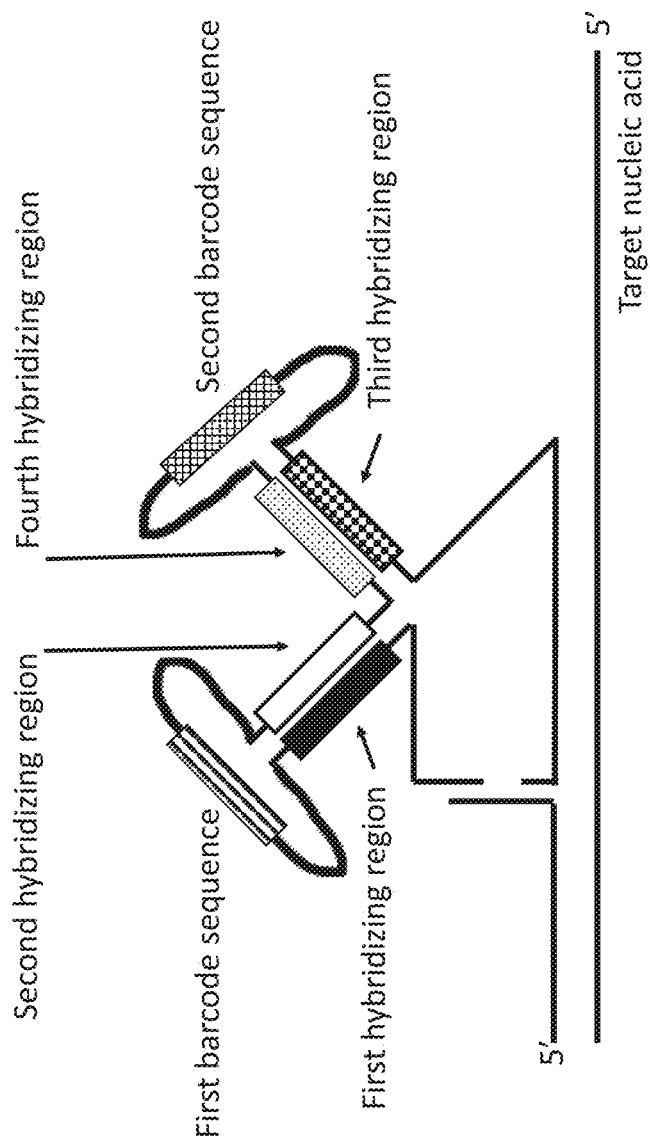

All publications, comprising patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

The section headings used herein are for organizational purposes only and are not to be construed as limiting the subject matter described.

I. Overview

When utilizing rolling circle amplification (RCA) to detect nucleic acid targets, properly resolving densely packed rolling circle amplification products (RCPs) in a cell or surface depends upon resolution of the individual RCPs. RCPs are concatemers comprising multiple copies of the target sequence and the RCA probe sequence, which can be visualized using in situ detection probes. RCP detection is enhanced by compaction of the concatemers, as reduction in size results in local concentration of the detection probes to increase signal intensity. Compaction also allows for increased resolution of individual RCPs. Typical compaction strategies rely on exogenously added oligonucleotide compaction probes that may be stripped away along with detection probes following rounds of in situ hybridization and target detection. Thus, there is a need for methods and compositions for persistent compaction of RCPs that are resistant to stripping. Hybridizing regions within the circular probe or circularizable probe or probe set used for RCA are designed to hybridize to each other (e.g., other copies of hybridizing regions) on the RCP and pull the concatemer together to reduce its overall size and reduce the radius of gyration of its diffusion, therefore making the RCP appear smaller and causing decreased optical crowding. Hybridizing regions can be short palindromic, but do not need to be palindromic, as long as they are able to hybridize to each other. The hybridizing regions may form a hairpin hybridization structure, however, more often the hybridizing region will hybridize to another copy of the hybridizing region elsewhere on the RCP, to further compact the RCP.

Provided herein are methods involving the use of self-hybridizing hybridizing regions for compacting and/or stabilizing nucleic acid concatemers (e.g., rolling circle amplification (RCA) products (RCP)). In some aspects, the present disclosure provides methods and compositions for persistent compaction of RCPs. In some embodiments, circularizable oligonucleotide probes comprising hybridizing regions, and methods of hybridization and ligation reactions are provided.

In some embodiments, provided herein is a method for analyzing a biological sample, comprising: (a) contacting a biological sample with a circular probe or circularizable probe or probe set that hybridizes to a target nucleic acid in the biological sample, wherein the circular probe or circularizable probe or probe set comprises a hybridizing region (e.g., a palindromic sequence, or a hybridizing region comprising first and second hybridizing regions that are complementary to each other); and (b) generating a nucleic acid concatemer (e.g., an RCP) at a location in the biological sample using the circular probe or a circularized probe generated from the circularizable probe or probe set as a template, wherein the nucleic acid concatemer comprises multiple copies of complementary sequences of the hybridizing region, and wherein the complementary sequences of the hybridizing region from different copies hybridize to one another, thereby compacting and/or stabilizing the nucleic acid concatemer at the location. In some embodiments, the method further comprises detecting the compacted and/or stabilized nucleic acid concatemer (e.g., RCP) in situ in the biological sample.

In some embodiments, the circular probe or circularizable probe or probe set comprises a palindromic sequence. In some embodiments, provided herein is a plurality of circular probe(s) or circularizable probe(s) or probe set(s) each comprising a different palindromic sequence, such that the palindromic sequences in the plurality do not hybridize to each other.

In some embodiments, the composition and methods disclosed herein allow for compaction of RCP concatemers generated in the biological sample, comprising multiple copies of a hybridizing region. In some aspects, provided herein are methods and compositions for compacting RCPs using one or more hybridizing regions on the RCP, wherein each hybridizing region comprises a nucleic acid sequence capable of hybridizing to another copy of the hybridizing region. In some embodiments, provided herein are methods and compositions comprising a circularizable probe used for RCA, wherein the circularizable probe comprises a first hybridizing region and a second hybridizing region capable of hybridizing to each other. In some embodiments, the first hybridizing region and the second hybridizing region hybridize to each other to form a hairpin hybridization structure. In some aspects, provided herein are methods and compositions for compacting RCPs using hybridizing regions capable of hybridizing to each other, wherein in the RCP, the complementary sequence of the first hybridizing region of a first copy hybridizes to the complementary sequence of the second hybridizing region of a second copy, and the complementary sequence of the second hybridizing region of the first copy hybridizes to the complementary sequence of the first hybridizing region of the second copy.

In some embodiments, the hybridization of the hybridizing regions to each other leads to more compacted RCPs and/or more punctuated detection signals of the RCPs. In some embodiments, the compaction leads to more bright signal spots for the RCP. In some embodiments, the stabilized and/or compacted RCP is resistant to stripping treatment and remains stable and/or compacted during repeated cycles of detectable probe hybridization and stripping. In some embodiments, the stabilized and/or compacted RCP can be crosslinked, e.g., by crosslinking the RCP to itself, to one or more other molecules in the biological sample, and/or to a matrix embedding the biological sample, where the crosslinking reduces the mobility of the RCP in the biological sample. Overall, the compaction and/or stabilization can facilitate the detection and/or resolving of more RCPs in a crowded space while maintaining spatial fidelity.

II. Samples, Analytes, and Target Sequences

A. Samples

A sample disclosed herein can be or derived from any biological sample. Methods and compositions disclosed herein may be used for analyzing a biological sample, which may be obtained from a subject using any of a variety of techniques including, but not limited to, biopsy, surgery, and laser capture microscopy (LCM), and generally includes cells and/or other biological material from the subject. In addition to the subjects described above, a biological sample can be obtained from a prokaryote such as a bacterium, an archaea, a virus, or a viroid. A biological sample can also be obtained from non-mammalian organisms (e.g., a plant, an insect, an arachnid, a nematode, a fungus, or an amphibian). A biological sample can also be obtained from a eukaryote, such as a tissue sample, a patient derived organoid (PDO) or patient derived xenograft (PDX). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic individuals, individuals that have or are suspected of having a disease (e.g., a patient with a disease such as cancer) or a pre-disposition to a disease, and/or individuals in need of therapy or suspected of needing therapy.

The biological sample can include any number of macromolecules, for example, cellular macromolecules and organelles (e.g., mitochondria and nuclei). The biological sample can be a nucleic acid sample and/or protein sample. The biological sample can be a carbohydrate sample or a lipid sample. The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions. In some embodiments, the biological sample may comprise cells which are deposited on a surface.

Cell-free biological samples can include extracellular polynucleotides. Extracellular polynucleotides can be isolated from a bodily sample, e.g., blood, plasma, serum, urine, saliva, mucosal excretions, sputum, stool, and tears.

Biological samples can be derived from a homogeneous culture or population of the subjects or organisms mentioned herein or alternatively from a collection of several different organisms, for example, in a community or ecosystem.

Biological samples can include one or more diseased cells. A diseased cell can have altered metabolic properties, gene expression, protein expression, and/or morphologic features. Examples of diseases include inflammatory disorders, metabolic disorders, nervous system disorders, and cancer. Cancer cells can be derived from solid tumors, hematological malignancies, cell lines, or obtained as circulating tumor cells. Biological samples can also include fetal cells and immune cells.

Biological samples can include analytes (e.g., protein, RNA, and/or DNA) embedded in a 3D matrix. In some embodiments, amplicons (e.g., rolling circle amplification products) derived from or associated with analytes (e.g., protein, RNA, and/or DNA) can be embedded in a 3D matrix. In some embodiments, a 3D matrix may comprise a network of natural molecules and/or synthetic molecules that are chemically and/or enzymatically linked, e.g., by crosslinking. In some embodiments, a 3D matrix may comprise a synthetic polymer. In some embodiments, a 3D matrix comprises a hydrogel.

In some embodiments, a substrate herein can be any support that is insoluble in aqueous liquid and which allows for positioning of biological samples, analytes, features, and/or reagents (e.g., probes) on the support. In some embodiments, a biological sample can be attached to a substrate. Attachment of the biological sample can be irreversible or reversible, depending upon the nature of the sample and subsequent steps in the analytical method. In certain embodiments, the sample can be attached to the substrate reversibly by applying a suitable polymer coating to the substrate, and contacting the sample to the polymer coating. The sample can then be detached from the substrate, e.g., using an organic solvent that at least partially dissolves the polymer coating. Hydrogels are examples of polymers that are suitable for this purpose.

In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

A variety of steps can be performed to prepare or process a biological sample for and/or during an assay. Except where indicated otherwise, the preparative or processing steps described below can generally be combined in any manner and in any order to appropriately prepare or process a particular sample for and/or analysis.

(i) Tissue Sectioning

A biological sample can be harvested from a subject (e.g., via surgical biopsy, whole subject sectioning) or grown in vitro on a growth substrate or culture dish as a population of cells, and prepared for analysis as a tissue slice or tissue section. Grown samples may be sufficiently thin for analysis without further processing steps. Alternatively, grown samples, and samples obtained via biopsy or sectioning, can be prepared as thin tissue sections using a mechanical cutting apparatus such as a vibrating blade microtome. As another alternative, in some embodiments, a thin tissue section can be prepared by applying a touch imprint of a biological sample to a suitable substrate material.

The thickness of the tissue section can be a fraction of (e.g., less than 0.9, 0.8, 0.7, 0.6, 0.5, 0.4, 0.3, 0.2, or 0.1) the maximum cross-sectional dimension of a cell. However, tissue sections having a thickness that is larger than the maximum cross-section cell dimension can also be used. For example, cryostat sections can be used, which can be, e.g., 10-20 µm thick.

More generally, the thickness of a tissue section typically depends on the method used to prepare the section and the physical characteristics of the tissue, and therefore sections having a wide variety of different thicknesses can be prepared and used. For example, the thickness of the tissue section can be at least 0.1, 0.2, 0.3, 0.4, 0.5, 0.7, 1.0, 1.5, 2, 3, 4, 5, 6, 7, 8, 9, 10, 12, 13, 14, 15, 20, 30, 40, or 50 µm. Thicker sections can also be used if desired or convenient, e.g., at least 70, 80, 90, or 100 µm or more. Typically, the thickness of a tissue section is between 1-100 µm, 1-50 µm, 1-30 µm, 1-25 µm, 1-20 µm, 1-15 µm, 1-10 µm, 2-8 µm, 3-7

μm, or 4-6 μm, but as mentioned above, sections with thicknesses larger or smaller than these ranges can also be analysed.

Multiple sections can also be obtained from a single biological sample. For example, multiple tissue sections can be obtained from a surgical biopsy sample by performing serial sectioning of the biopsy sample using a sectioning blade. Spatial information among the serial sections can be preserved in this manner, and the sections can be analysed successively to obtain three-dimensional information about the biological sample.

(ii) Freezing

In some embodiments, the biological sample (e.g., a tissue section as described above) can be prepared by deep freezing at a temperature suitable to maintain or preserve the integrity (e.g., the physical characteristics) of the tissue structure. The frozen tissue sample can be sectioned, e.g., thinly sliced, onto a substrate surface using any number of suitable methods. For example, a tissue sample can be prepared using a chilled microtome (e.g., a cryostat) set at a temperature suitable to maintain both the structural integrity of the tissue sample and the chemical properties of the nucleic acids in the sample. Such a temperature can be, e.g., less than −15° C., less than −20° C., or less than −25° C.

(iii) Fixation and Postfixation

In some embodiments, the biological sample can be prepared using formalin-fixation and paraffin-embedding (FFPE), which are established methods. In some embodiments, cell suspensions and other non-tissue samples can be prepared using formalin-fixation and paraffin-embedding. Following fixation of the sample and embedding in a paraffin or resin block, the sample can be sectioned as described above. Prior to analysis, the paraffin-embedding material can be removed from the tissue section (e.g., deparaffinization) by incubating the tissue section in an appropriate solvent (e.g., xylene) followed by a rinse (e.g., 99.5% ethanol for 2 minutes, 96% ethanol for 2 minutes, and 70% ethanol for 2 minutes).

As an alternative to formalin fixation described above, a biological sample can be fixed in any of a variety of other fixatives to preserve the biological structure of the sample prior to analysis. For example, a sample can be fixed via immersion in ethanol, methanol, acetone, paraformaldehyde (PFA)-Triton, and combinations thereof.

In some embodiments, acetone fixation is used with fresh frozen samples, which can include, but are not limited to, cortex tissue, mouse olfactory bulb, human brain tumor, human post-mortem brain, and breast cancer samples. When acetone fixation is performed, pre-permeabilization steps (described below) may not be performed. Alternatively, acetone fixation can be performed in conjunction with permeabilization steps.

In some embodiments, the methods provided herein comprises one or more post-fixing (also referred to as postfixation) steps. In some embodiments, one or more post-fixing step is performed after contacting a sample with a polynucleotide disclosed herein, e.g., one or more probes such as a circular or padlock probe. In some embodiments, one or more post-fixing step is performed after a hybridization complex comprising a probe and a target is formed in a sample. In some embodiments, one or more post-fixing step is performed prior to a ligation reaction disclosed herein, such as the ligation to circularize a padlock probe.

In some embodiments, one or more post-fixing step is performed after contacting a sample with a binding or labelling agent (e.g., an antibody or antigen binding fragment thereof) for a non-nucleic acid analyte such as a protein analyte. The labelling agent can comprise a nucleic acid molecule (e.g., reporter oligonucleotide) comprising a sequence corresponding to the labelling agent and therefore corresponds to (e.g., uniquely identifies) the analyte. In some embodiments, the labelling agent can comprise a reporter oligonucleotide comprising one or more barcode sequences.

A post-fixing step may be performed using any suitable fixation reagent disclosed herein, for example, 3% (w/v) paraformaldehyde in DEPC-PBS.

(iv) Embedding

As an alternative to paraffin embedding described above, a biological sample can be embedded in any of a variety of other embedding materials to provide structural substrate to the sample prior to sectioning and other handling steps. In some cases, the embedding material can be removed e.g., prior to analysis of tissue sections obtained from the sample. Suitable embedding materials include, but are not limited to, waxes, resins (e.g., methacrylate resins), epoxies, and agar.

In some embodiments, the biological sample can be embedded in a matrix (e.g., a hydrogel matrix). Embedding the sample in this manner typically involves contacting the biological sample with a hydrogel such that the biological sample becomes surrounded by the hydrogel. For example, the sample can be embedded by contacting the sample with a suitable polymer material, and activating the polymer material to form a hydrogel. In some embodiments, the hydrogel is formed such that the hydrogel is internalized within the biological sample.

In some embodiments, the biological sample is immobilized in the hydrogel via cross-linking of the polymer material that forms the hydrogel. Cross-linking can be performed chemically and/or photochemically, or alternatively by any other hydrogel-formation method.

The composition and application of the hydrogel-matrix to a biological sample typically depends on the nature and preparation of the biological sample (e.g., sectioned, non-sectioned, type of fixation). As one example, where the biological sample is a tissue section, the hydrogel-matrix can include a monomer solution and an ammonium persulfate (APS) initiator/tetramethylethylenediamine (TEMED) accelerator solution. As another example, where the biological sample consists of cells (e.g., cultured cells or cells disassociated from a tissue sample), the cells can be incubated with the monomer solution and APS/TEMED solutions. For cells, hydrogel-matrix gels are formed in compartments, including but not limited to devices used to culture, maintain, or transport the cells. For example, hydrogel-matrices can be formed with monomer solution plus APS/TEMED added to the compartment to a depth ranging from about 0.1 μm to about 2 mm.

Additional methods and aspects of hydrogel embedding of biological samples are described for example in Chen et al., Science 347(6221):543-548, 2015, the entire contents of which are incorporated herein by reference.

(v) Staining

To facilitate visualization, biological samples can be stained using a wide variety of stains and staining techniques. In some embodiments, for example, a sample can be stained using any number of stains and/or immunohistochemical reagents. One or more staining steps may be performed to prepare or process a biological sample for an assay described herein or may be performed during and/or after an assay. In some embodiments, the sample can be contacted with one or more nucleic acid stains, membrane stains (e.g., cellular or nuclear membrane), cytological stains, or combinations thereof. In some examples, the stain may be specific to proteins, phospholipids, DNA (e.g., dsDNA, ssDNA), RNA, an organelle or compartment of the cell. The sample may be contacted with one or more labeled antibodies (e.g., a primary antibody specific for the analyte of interest and a labeled secondary antibody specific for the primary antibody). In some embodiments, cells in the sample can be segmented using one or more images taken of the stained sample.

In some embodiments, the stain is performed using a lipophilic dye. In some examples, the staining is performed with a lipophilic carbocyanine or aminostyryl dye, or analogs thereof (e.g., DiI, DiO, DiR, DiD). Other cell membrane stains may include FM and RH dyes or immunohistochemical reagents specific for cell membrane proteins. In some examples, the stain may include, but not limited to, acridine orange, Bismarck brown, carmine, coomassie blue, cresyl violet, DAPI, eosin, ethidium bromide, acid fuchsine, haematoxylin, Hoechst stains, iodine, methyl green, methylene blue, neutral red, Nile blue, Nile red, osmium tetroxide, ruthenium red, propidium iodide, rhodamine (e.g., rhodamine B), or safranine or derivatives thereof. In some embodiments, the sample may be stained with haematoxylin and eosin (H&E).

The sample can be stained using hematoxylin and eosin (H&E) staining techniques, using Papanicolaou staining techniques, Masson's trichrome staining techniques, silver staining techniques, Sudan staining techniques, and/or using Periodic Acid Schiff (PAS) staining techniques. PAS staining is typically performed after formalin or acetone fixation. In some embodiments, the sample can be stained using Romanowsky stain, including Wright's stain, Jenner's stain, Can-Grunwald stain, Leishman stain, and Giemsa stain.

In some embodiments, biological samples can be destained. Methods of destaining or discoloring a biological sample generally depend on the nature of the stain(s) applied to the sample. For example, in some embodiments, one or more immunofluorescent stains are applied to the sample via antibody coupling. Such stains can be removed using techniques such as cleavage of disulfide linkages via treatment with a reducing agent and detergent washing, chaotropic salt treatment, treatment with antigen retrieval solution, and treatment with an acidic glycine buffer. Methods for multiplexed staining and destaining are described, for example, in Bolognesi et al., *J. Histochem. Cytochem.* 2017; 65(8): 431-444, Lin et al., *Nat Commun.* 2015; 6:8390, Pirici et al., *J. Histochem. Cytochem.* 2009; 57:567-75, and Glass et al., *J. Histochem. Cytochem.* 2009; 57:899-905, the entire contents of each of which are incorporated herein by reference.

(vi) Isometric Expansion

In some embodiments, a biological sample embedded in a matrix (e.g., a hydrogel) can be isometrically expanded. Isometric expansion methods that can be used include hydration, a preparative step in expansion microscopy, as described in Chen et al., *Science* 347(6221):543-548, 2015.

Isometric expansion can be performed by anchoring one or more components of a biological sample to a gel, followed by gel formation, proteolysis, and swelling. In some embodiments, analytes in the sample, products of the analytes, and/or probes associated with analytes in the sample can be anchored to the matrix (e.g., hydrogel). Isometric expansion of the biological sample can occur prior to immobilization of the biological sample on a substrate, or after the biological sample is immobilized to a substrate. In some embodiments, the isometrically expanded biological sample can be removed from the substrate prior to contacting the substrate with probes disclosed herein.

In general, the steps used to perform isometric expansion of the biological sample can depend on the characteristics of the sample (e.g., thickness of tissue section, fixation, cross-linking), and/or the analyte of interest (e.g., different conditions to anchor RNA, DNA, and protein to a gel).

In some embodiments, proteins in the biological sample are anchored to a swellable gel such as a polyelectrolyte gel. An antibody can be directed to the protein before, after, or in conjunction with being anchored to the swellable gel. DNA and/or RNA in a biological sample can also be anchored to the swellable gel via a suitable linker. Examples of such linkers include, but are not limited to, 6-((Acryloyl) amino) hexanoic acid (Acryloyl-X SE) (available from ThermoFisher, Waltham, MA), Label-IT Amine (available from MirusBio, Madison, WI) and Label X (described for example in Chen et al., Nat. Methods 13:679-684, 2016, the entire contents of which are incorporated herein by reference).

Isometric expansion of the sample can increase the spatial resolution of the subsequent analysis of the sample. The increased resolution in spatial profiling can be determined by comparison of an isometrically expanded sample with a sample that has not been isometrically expanded.

In some embodiments, a biological sample is isometrically expanded to a size at least 2×, 2.1×, 2.2×, 2.3×, 2.4×, 2.5×, 2.6×, 2.7×, 2.8×, 2.9×, 3×, 3.1×, 3.2×, 3.3×, 3.4×, 3.5×, 3.6×, 3.7×, 3.8×, 3.9×, 4×, 4.1×, 4.2×, 4.3×, 4.4×, 4.5×, 4.6×, 4.7×, 4.8×, or 4.9× its non-expanded size. In some embodiments, the sample is isometrically expanded to at least 2× and less than 20× of its non-expanded size.

(vii) Crosslinking and De-Crosslinking

In some embodiments, the biological sample is reversibly cross-linked prior to or during an in situ assay round. In some aspects, the analytes, polynucleotides and/or amplification product (e.g., amplicon) of an analyte or a probe bound thereto can be anchored to a polymer matrix. For example, the polymer matrix can be a hydrogel. In some embodiments, one or more of the polynucleotide probe(s) and/or amplification product (e.g., amplicon) thereof can be modified to contain functional groups that can be used as an anchoring site to attach the polynucleotide probes and/or amplification product to a polymer matrix. In some embodiments, a modified probe comprising oligo dT may be used to bind to mRNA molecules of interest, followed by reversible crosslinking of the mRNA molecules.

In some embodiments, the biological sample is immobilized in a hydrogel via cross-linking of the polymer material that forms the hydrogel. Cross-linking can be performed chemically and/or photochemically, or alternatively by any other hydrogel-formation method. A hydrogel may include a macromolecular polymer gel including a network. Within the network, some polymer chains can optionally be cross-linked, although cross-linking does not always occur.

In some embodiments, a hydrogel can include hydrogel subunits, such as, but not limited to, acrylamide, bis-acrylamide, polyacrylamide and derivatives thereof, poly(ethylene glycol) and derivatives thereof (e.g. PEG-acrylate (PEG-DA), PEG-RGD), gelatin-methacryloyl (GelMA), methacrylated hyaluronic acid (MeHA), polyaliphatic polyurethanes, polyether polyurethanes, polyester polyurethanes, polyethylene copolymers, polyamides, polyvinyl alcohols, polypropylene glycol, polytetramethylene oxide, polyvinyl pyrrolidone, polyacrylamide, poly(hydroxyethyl acrylate), and poly(hydroxyethyl methacrylate), collagen, hyaluronic acid, chitosan, dextran, agarose, gelatin, alginate, protein polymers, methylcellulose, and the like, and combinations thereof.

In some embodiments, a hydrogel includes a hybrid material, e.g., the hydrogel material includes elements of both synthetic and natural polymers. Examples of suitable hydrogels are described, for example, in U.S. Pat. Nos. 6,391,937, 9,512,422, and 9,889,422, and in U.S. Patent Application Publication Nos. 2017/0253918, 2018/0052081 and 2010/0055733, the entire contents of each of which are incorporated herein by reference.

In some embodiments, the hydrogel can form the substrate. In some embodiments, the substrate includes a hydrogel and one or more second materials. In some embodiments, the hydrogel is placed on top of one or more second materials. For example, the hydrogel can be pre-formed and then placed on top of, underneath, or in any other configuration with one or more second materials. In some embodiments, hydrogel formation occurs after contacting one or more second materials during formation of the substrate. Hydrogel formation can also occur within a structure (e.g., wells, ridges, projections, and/or markings) located on a substrate.

In some embodiments, hydrogel formation on a substrate occurs before, contemporaneously with, or after probes are provided to the sample. For example, hydrogel formation can be performed on the substrate already containing the probes.

In some embodiments, hydrogel formation occurs within a biological sample. In some embodiments, a biological sample (e.g., tissue section) is embedded in a hydrogel. In some embodiments, hydrogel subunits are infused into the biological sample, and polymerization of the hydrogel is initiated by an external or internal stimulus.

In embodiments in which a hydrogel is formed within a biological sample, functionalization chemistry can be used. In some embodiments, functionalization chemistry includes hydrogel-tissue chemistry (HTC). Any hydrogel-tissue backbone (e.g., synthetic or native) suitable for HTC can be used for anchoring biological macromolecules and modulating functionalization. Non-limiting examples of methods using HTC backbone variants include CLARITY, PACT, ExM, SWITCH and ePACT. In some embodiments, hydrogel formation within a biological sample is permanent. For example, biological macromolecules can permanently adhere to the hydrogel allowing multiple rounds of interrogation. In some embodiments, hydrogel formation within a biological sample is reversible.

In some embodiments, additional reagents are added to the hydrogel subunits before, contemporaneously with, and/or after polymerization. For example, additional reagents can include but are not limited to oligonucleotides (e.g., probes), endonucleases to fragment DNA, fragmentation buffer for DNA, DNA polymerase enzymes, dNTPs used to amplify the nucleic acid and to attach the barcode to the amplified fragments. Other enzymes can be used, including without limitation, RNA polymerase, transposase, ligase, proteinase K, and DNAse. Additional reagents can also include reverse transcriptase enzymes, including enzymes with terminal transferase activity, primers, and switch oligonucleotides. In some embodiments, optical labels are added to the hydrogel subunits before, contemporaneously with, and/or after polymerization.

In some embodiments, HTC reagents are added to the hydrogel before, contemporaneously with, and/or after polymerization. In some embodiments, a cell labelling agent is added to the hydrogel before, contemporaneously with, and/or after polymerization. In some embodiments, a cell-penetrating agent is added to the hydrogel before, contemporaneously with, and/or after polymerization.

Hydrogels embedded within biological samples can be cleared using any suitable method. For example, electrophoretic tissue clearing methods can be used to remove biological macromolecules from the hydrogel-embedded sample. In some embodiments, a hydrogel-embedded sample is stored before or after clearing of hydrogel, in a medium (e.g., a mounting medium, methylcellulose, or other semi-solid mediums).

In some embodiments, a method disclosed herein comprises de-crosslinking the reversibly cross-linked biological sample. The de-crosslinking does not need to be complete. In some embodiments, only a portion of crosslinked molecules in the reversibly cross-linked biological sample are de-crosslinked and allowed to migrate.

(viii) Tissue Permeabilization and Treatment

In some embodiments, a biological sample can be permeabilized to facilitate transfer of analytes out of the sample, and/or to facilitate transfer of species (such as probes) into the sample. If a sample is not permeabilized sufficiently, the amount of species (such as probes) in the sample may be too low to enable adequate analysis. Conversely, if the tissue sample is too permeable, the relative spatial relationship of the analytes within the tissue sample can be lost. Hence, a balance between permeabilizing the tissue sample enough to obtain good signal intensity while still maintaining the spatial resolution of the analyte distribution in the sample is desirable.

In general, a biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, TritonX100™ or Tween-20™), and enzymes (e.g., trypsin, proteases). In some embodiments, the biological sample can be incubated with a cellular permeabilizing agent to facilitate permeabilization of the sample. Additional methods for sample permeabilization are described, for example, in Jamur et al., Method Mol. Biol. 588:63-66, 2010, the entire contents of which are incorporated herein by reference. Any suitable method for sample permeabilization can generally be used in connection with the samples described herein.

In some embodiments, the biological sample can be permeabilized by adding one or more lysis reagents to the sample. Examples of suitable lysis agents include, but are not limited to, bioactive reagents such as lysis enzymes that are used for lysis of different cell types, e.g., gram positive or negative bacteria, plants, yeast, mammalian, such as lysozymes, achromopeptidase, lysostaphin, labiase, kitalase, lyticase, and a variety of other commercially available lysis enzymes.

Other lysis agents can additionally or alternatively be added to the biological sample to facilitate permeabilization. For example, surfactant-based lysis solutions can be used to lyse sample cells. Lysis solutions can include ionic surfactants such as, for example, sarcosyl and sodium dodecyl sulfate (SDS). More generally, chemical lysis agents can include, without limitation, organic solvents, chelating agents, detergents, surfactants, and chaotropic agents.

In some embodiments, the biological sample can be permeabilized by non-chemical permeabilization methods. Non-chemical permeabilization methods that can be used include, but are not limited to, physical lysis techniques such as electroporation, mechanical permeabilization methods (e.g., bead beating using a homogenizer and grinding balls to mechanically disrupt sample tissue structures), acoustic permeabilization (e.g., sonication), and thermal lysis techniques such as heating to induce thermal permeabilization of the sample.

Additional reagents can be added to a biological sample to perform various functions prior to analysis of the sample. In some embodiments, DNase and RNase inactivating agents or inhibitors such as proteinase K, and/or chelating agents such as EDTA, can be added to the sample. For example, a method disclosed herein may comprise a step for increasing accessibility of a nucleic acid for binding, e.g., a denaturation step to opening up DNA in a cell for hybridization by a probe. For example, proteinase K treatment may be used to free up DNA with proteins bound thereto.

(ix) Selective Enrichment of RNA Species

In some embodiments, where RNA is the analyte, one or more RNA analyte species of interest can be selectively enriched. For example, one or more species of RNA of interest can be selected by addition of one or more oligonucleotides to the sample. In some embodiments, the additional oligonucleotide is a sequence used for priming a reaction by an enzyme (e.g., a polymerase). For example, one or more primer sequences with sequence complementarity to one or more RNAs of interest can be used to amplify the one or more RNAs of interest, thereby selectively enriching these RNAs.

In some embodiments, an oligonucleotide with sequence complementarity to the complementary strand of captured RNA (e.g., cDNA) can bind to the cDNA. For example, biotinylated oligonucleotides with sequence complementary to one or more cDNA of interest binds to the cDNA and can be selected using biotinylation-strepavidin affinity using any of a variety of methods (e.g., streptavidin beads).

Alternatively, one or more species of RNA can be down-selected (e.g., removed) using any of a variety of methods. For example, probes can be administered to a sample that selectively hybridize to ribosomal RNA (rRNA), thereby reducing the pool and concentration of rRNA in the sample. Additionally and alternatively, duplex-specific nuclease (DSN) treatment can remove rRNA (see, e.g., Archer, et al, Selective and flexible depletion of problematic sequences from RNA-seq libraries at the cDNA stage, *BMC Genomics*, 15 401, (2014), the entire contents of which are incorporated herein by reference). Furthermore, hydroxyapatite chromatography can remove abundant species (e.g., rRNA) (see, e.g., Vandernoot, V. A., cDNA normalization by hydroxy-apatite chromatography to enrich transcriptome diversity in RNA-seq applications, Biotechniques, 53(6) 373-80, (2012), the entire contents of which are incorporated herein by reference).

A biological sample may comprise one or a plurality of analytes of interest. Methods for performing multiplexed assays to analyze two or more different analytes in a single biological sample are provided.

B. Analytes

The methods and compositions disclosed herein can be used to detect and analyze a wide variety of different analytes. In some aspects, an analyte can include any biological substance, structure, moiety, or component to be analyzed. In some aspects, a target disclosed herein may similarly include any analyte of interest. In some examples, a target or analyte can be directly or indirectly detected.

Analytes can be derived from a specific type of cell and/or a specific sub-cellular region. For example, analytes can be derived from cytosol, from cell nuclei, from mitochondria, from microsomes, and more generally, from any other compartment, organelle, or portion of a cell. Permeabilizing agents that specifically target certain cell compartments and organelles can be used to selectively release analytes from cells for analysis, and/or allow access of one or more reagents (e.g., probes for analyte detection) to the analytes in the cell or cell compartment or organelle.

The analyte may include any biomolecule or chemical compound, including a macromolecule such as a protein or peptide, a lipid or a nucleic acid molecule, or a small molecule, including organic or inorganic molecules. The analyte may be a cell or a microorganism, including a virus, or a fragment or product thereof. An analyte can be any substance or entity for which a specific binding partner (e.g. an affinity binding partner) can be developed. Such a specific binding partner may be a nucleic acid probe (for a nucleic acid analyte) and may lead directly to the generation of an RCA template (e.g. a padlock or other circularizable probe). Alternatively, the specific binding partner may be coupled to a nucleic acid, which may be detected using an RCA strategy, e.g. in an assay which uses or generates a circular nucleic acid which can be the RCA template.

Analytes of particular interest may include nucleic acid molecules, such as DNA (e.g. genomic DNA, mitochondrial DNA, plastid DNA, viral DNA, etc.) and RNA (e.g. mRNA, microRNA, rRNA, snRNA, viral RNA, etc.), and synthetic and/or modified nucleic acid molecules, (e.g. including nucleic acid domains comprising or consisting of synthetic or modified nucleotides such as LNA, PNA, morpholino, etc.), proteinaceous molecules such as peptides, polypeptides, proteins or prions or any molecule which includes a protein or polypeptide component, etc., or fragments thereof, or a lipid or carbohydrate molecule, or any molecule which comprise a lipid or carbohydrate component. The analyte may be a single molecule or a complex that contains two or more molecular subunits, e.g. including but not limited to protein-DNA complexes, which may or may not be covalently bound to one another, and which may be the same or different. Thus in addition to cells or microorganisms, such a complex analyte may also be a protein complex or protein interaction. Such a complex or interaction may thus be a homo- or hetero-multimer. Aggregates of molecules, e.g. proteins may also be target analytes, for example aggregates of the same protein or different proteins. The analyte may also be a complex between proteins or peptides and nucleic acid molecules such as DNA or RNA, e.g. interactions between proteins and nucleic acids, e.g. regulatory factors, such as transcription factors, and DNA or RNA.

(i) Endogenous Analytes

In some embodiments, an analyte herein is endogenous to a biological sample and can include nucleic acid analytes and non-nucleic acid analytes. Methods and compositions disclosed herein can be used to analyze nucleic acid analytes (e.g., using a nucleic acid probe or probe set that directly or indirectly hybridizes to a nucleic acid analyte) and/or non-nucleic acid analytes (e.g., using a labelling agent that comprises a reporter oligonucleotide and binds directly or indirectly to a non-nucleic acid analyte) in any suitable combination.

Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral coat proteins, extracellular and intracellular proteins, antibodies, and antigen binding fragments. In some embodiments, the analyte is inside a cell or on a cell surface, such as a transmembrane analyte or one that is attached to the cell membrane. In some embodiments, the analyte can be an organelle (e.g., nuclei or mitochondria). In some embodiments, the analyte is an extracellular analyte, such as a secreted analyte. Exemplary analytes include, but are not limited to, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction.

Examples of nucleic acid analytes include DNA analytes such as single-stranded DNA (ssDNA), double-stranded DNA (dsDNA), genomic DNA, methylated DNA, specific methylated DNA sequences, fragmented DNA, mitochondrial DNA, in situ synthesized PCR products, and RNA/DNA hybrids. The DNA analyte can be a transcript of another nucleic acid molecule (e.g., DNA or RNA such as mRNA) present in a tissue sample.

Examples of nucleic acid analytes also include RNA analytes such as various types of coding and non-coding RNA. Examples of the different types of RNA analytes include messenger RNA (mRNA), including a nascent RNA, a pre-mRNA, a primary-transcript RNA, and a processed RNA, such as a capped mRNA (e.g., with a 5' 7-methyl guanosine cap), a polyadenylated mRNA (poly-A tail at the 3' end), and a spliced mRNA in which one or more introns have been removed. Also included in the analytes disclosed herein are non-capped mRNA, a non-polyadenylated mRNA, and a non-spliced mRNA. The RNA analyte can be a transcript of another nucleic acid molecule (e.g., DNA or RNA such as viral RNA) present in a tissue sample. Examples of a non-coding RNAs (ncRNA) that is not translated into a protein include transfer RNAs (tRNAs) and ribosomal RNAs (rRNAs), as well as small non-coding RNAs such as microRNA (miRNA), small interfering RNA (siRNA), Piwi-interacting RNA (piRNA), small nucleolar RNA (snoRNA), small nuclear RNA (snRNA), extracellular RNA (exRNA), small Cajal body-specific RNAs (scaRNAs), and the long ncRNAs such as Xist and HOTAIR. The RNA can be small (e.g., less than 200 nucleic acid bases in length) or large (e.g., RNA greater than 200 nucleic acid bases in length). Examples of small RNAs include 5.8S ribosomal RNA (rRNA), 5S rRNA, tRNA, miRNA, siRNA, snoRNAs, piRNA, tRNA-derived small RNA (tsRNA), and small rDNA-derived RNA (srRNA). The RNA can be double-stranded RNA or single-stranded RNA. The RNA can be circular RNA. The RNA can be a bacterial rRNA (e.g., 16s rRNA or 23s rRNA).

In some embodiments described herein, an analyte may be a denatured nucleic acid, wherein the resulting denatured nucleic acid is single-stranded. The nucleic acid may be denatured, for example, optionally using formamide, heat, or both formamide and heat. In some embodiments, the nucleic acid is not denatured for use in a method disclosed herein.

In certain embodiments, an analyte can be extracted from a live cell. Processing conditions can be adjusted to ensure that a biological sample remains live during analysis, and analytes are extracted from (or released from) live cells of the sample. Live cell-derived analytes can be obtained only once from the sample, or can be obtained at intervals from a sample that continues to remain in viable condition.

Methods and compositions disclosed herein can be used to analyze any number of analytes. For example, the number of analytes that are analyzed can be at least about 2, at least about 3, at least about 4, at least about 5, at least about 6, at least about 7, at least about 8, at least about 9, at least about 10, at least about 11, at least about 12, at least about 13, at least about 14, at least about 15, at least about 20, at least about 25, at least about 30, at least about 40, at least about 50, at least about 100, at least about 1,000, at least about 10,000, at least about 100,000 or more different analytes present in a region of the sample or within an individual feature of the substrate.

In any embodiment described herein, the analyte comprises a target sequence. In some embodiments, the target sequence may be endogenous to the sample, generated in the sample, added to the sample, or associated with an analyte in the sample. In some embodiments, the target sequence is a single-stranded target sequence (e.g., a sequence in a rolling circle amplification product). In some embodiments, the analytes comprise one or more single-stranded target sequences. In one aspect, a first single-stranded target sequence is not identical to a second single-stranded target sequence. In another aspect, a first single-stranded target sequence is identical to one or more second single-stranded target sequence. In some embodiments, the one or more second single-stranded target sequence is comprised in the same analyte (e.g., nucleic acid) as the first single-stranded target sequence. Alternatively, the one or more second single-stranded target sequence is comprised in a different analyte (e.g., nucleic acid) from the first single-stranded target sequence.

(ii) Labelling Agents

In some embodiments, provided herein are methods and compositions for analyzing endogenous analytes (e.g., RNA, ssDNA, and cell surface or intracellular proteins and/or metabolites) in a sample using one or more labelling agents. In some embodiments, an analyte labelling agent may include an agent that interacts with an analyte (e.g., an endogenous analyte in a sample). In some embodiments, the labelling agents can comprise a reporter oligonucleotide that is indicative of the analyte or portion thereof interacting with the labelling agent. For example, the reporter oligonucleotide may comprise a barcode sequence that permits identification of the labelling agent. In some cases, the sample contacted by the labelling agent can be further contacted with a probe (e.g., a single-stranded probe sequence), that hybridizes to a reporter oligonucleotide of the labelling agent, in order to identify the analyte associated with the labelling agent. In some embodiments, the analyte labelling agent comprises an analyte binding moiety and a labelling agent barcode domain comprising one or more barcode sequences, e.g., a barcode sequence that corresponds to the analyte binding moiety and/or the analyte. An analyte binding moiety barcode includes to a barcode that is associated with or otherwise identifies the analyte binding moiety. In some embodiments, by identifying an analyte binding moiety by identifying its associated analyte binding moiety barcode, the analyte to which the analyte binding moiety binds can also be identified. An analyte binding moiety barcode can be a nucleic acid sequence of a given length and/or sequence that is associated with the analyte binding moiety. An analyte binding moiety barcode can generally include any of the variety of aspects of barcodes described herein.

In some embodiments, the method comprises one or more post-fixing (also referred to as post-fixation) steps after contacting the sample with one or more labelling agents.

In the methods and systems described herein, one or more labelling agents capable of binding to or otherwise coupling to one or more features may be used to characterize analytes, cells and/or cell features. In some instances, cell features include cell surface features. Analytes may include, but are not limited to, a protein, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, a gap junction, an adherens junction, or any combination thereof. In some instances, cell features may include intracellular analytes, such as proteins, protein modifications (e.g., phosphorylation status or other post-translational modifications), nuclear proteins, nuclear membrane proteins, or any combination thereof.

In some embodiments, an analyte binding moiety may include any molecule or moiety capable of binding to an analyte (e.g., a biological analyte, e.g., a macromolecular constituent). A labelling agent may include, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The labelling agents can include (e.g., are attached to) a reporter oligonucleotide that is indicative of the cell surface feature to which the binding group binds. For example, the reporter oligonucleotide may comprise a barcode sequence that permits identification of the labelling agent. For example, a labelling agent that is specific to one type of cell feature (e.g., a first cell surface feature) may have coupled thereto a first reporter oligonucleotide, while a labelling agent that is specific to a different cell feature (e.g., a second cell surface feature) may have a different reporter oligonucleotide coupled thereto. For a description of exemplary labelling agents, reporter oligonucleotides, and methods of use, see, e.g., U.S. Pat. No. 10,550,429; U.S. Pat. Pub. 20190177800; and U.S. Pat. Pub. 20190367969, which are each incorporated by reference herein in their entirety.

In some embodiments, an analyte binding moiety includes one or more antibodies or antigen binding fragments thereof. The antibodies or antigen binding fragments including the analyte binding moiety can specifically bind to a target analyte. In some embodiments, the analyte is a protein (e.g., a protein on a surface of the biological sample (e.g., a cell) or an intracellular protein). In some embodiments, a plurality of analyte labelling agents comprising a plurality of analyte binding moieties bind a plurality of analytes present in a biological sample. In some embodiments, the plurality of analytes includes a single species of analyte (e.g., a single species of polypeptide). In some embodiments in which the plurality of analytes includes a single species of analyte, the analyte binding moieties of the plurality of analyte labelling agents are the same. In some embodiments in which the plurality of analytes includes a single species of analyte, the analyte binding moieties of the plurality of analyte labelling agents are the different (e.g., members of the plurality of analyte labelling agents can have two or more species of analyte binding moieties, wherein each of the two or more species of analyte binding moieties binds a single species of analyte, e.g., at different binding sites). In some embodiments, the plurality of analytes includes multiple different species of analyte (e.g., multiple different species of polypeptides).

In other instances, e.g., to facilitate sample multiplexing, a labelling agent that is specific to a particular cell feature may have a first plurality of the labelling agent (e.g., an antibody or lipophilic moiety) coupled to a first reporter oligonucleotide and a second plurality of the labelling agent coupled to a second reporter oligonucleotide.

In some aspects, these reporter oligonucleotides may comprise nucleic acid barcode sequences that permit identification of the labelling agent which the reporter oligonucleotide is coupled to. The selection of oligonucleotides as the reporter may provide advantages of being able to generate significant diversity in terms of sequence, while also being readily attachable to most biomolecules, e.g., antibodies, etc., as well as being detectable.

Attachment (coupling) of the reporter oligonucleotides to the labelling agents may be achieved through any of a variety of direct or indirect, covalent or non-covalent associations or attachments. For example, oligonucleotides may be covalently attached to a portion of a labelling agent (such a protein, e.g., an antibody or antibody fragment) using chemical conjugation techniques (e.g., Lightning-Link® antibody labelling kits available from Innova Biosciences), as well as other non-covalent attachment mechanisms, e.g., using biotinylated antibodies and oligonucleotides (or beads that include one or more biotinylated linker, coupled to oligonucleotides) with an avidin or streptavidin linker. Antibody and oligonucleotide biotinylation techniques are available. See, e.g., Fang, et al., "Fluoride-Cleavable Biotinylation Phosphoramidite for 5'-end-Labelling and Affinity Purification of Synthetic Oligonucleotides," Nucleic Acids Res. Jan. 15, 2003; 31(2):708-715, which is entirely incorporated herein by reference for all purposes. Likewise, protein and peptide biotinylation techniques have been developed and are readily available. See, e.g., U.S. Pat. No. 6,265,552, which is entirely incorporated herein by reference for all purposes. Furthermore, click reaction chemistry may be used to couple reporter oligonucleotides to labelling agents. Commercially available kits, such as those from Thunderlink and Abcam, and techniques common in the art may be used to couple reporter oligonucleotides to labelling agents as appropriate. In another example, a labelling agent is indirectly (e.g., via hybridization) coupled to a reporter oligonucleotide comprising a barcode sequence that identifies the label agent. For instance, the labelling agent may be directly coupled (e.g., covalently bound) to a hybridization oligonucleotide that comprises a sequence that hybridizes with a sequence of the reporter oligonucleotide. Hybridization of the hybridization oligonucleotide to the reporter oligonucleotide couples the labelling agent to the reporter oligonucleotide. In some embodiments, the reporter oligonucleotides are releasable from the labelling agent, such as upon application of a stimulus. For example, the reporter oligonucleotide may be attached to the labeling agent through a labile bond (e.g., chemically labile, photolabile, thermally labile, etc.) as generally described for releasing molecules from supports elsewhere herein. In some instances, the reporter oligonucleotides described herein may include one or more functional sequences that can be used in subsequent processing.

In some cases, the labelling agent can comprise a reporter oligonucleotide and a label. A label can be fluorophore, a radioisotope, a molecule capable of a colorimetric reaction, a magnetic particle, or any other suitable molecule or compound capable of detection. The label can be conjugated to a labelling agent (or reporter oligonucleotide) either directly or indirectly (e.g., the label can be conjugated to a molecule that can bind to the labelling agent or reporter oligonucleotide). In some cases, a label is conjugated to a first oligonucleotide that is complementary (e.g., hybridizes) to a sequence of the reporter oligonucleotide.

In some embodiments, multiple different species of analytes (e.g., polypeptides) from the biological sample can be subsequently associated with the one or more physical properties of the biological sample. For example, the multiple different species of analytes can be associated with locations of the analytes in the biological sample. Such information (e.g., proteomic information when the analyte binding moiety(ies) recognizes a polypeptide(s)) can be used in association with other spatial information (e.g., genetic information from the biological sample, such as DNA sequence information, transcriptome information (e.g., sequences of transcripts), or both). For example, a cell surface protein of a cell can be associated with one or more physical properties of the cell (e.g., a shape, size, activity, or a type of the cell). The one or more physical properties can be characterized by imaging the cell. The cell can be bound by an analyte labelling agent comprising an analyte binding moiety that binds to the cell surface protein and an analyte binding moiety barcode that identifies that analyte binding moiety. Results of protein analysis in a sample (e.g., a tissue sample or a cell) can be associated with DNA and/or RNA analysis in the sample.

(iii) Products of Endogenous Analyte and/or Labelling Agent

In some embodiments, provided herein are methods and compositions for analyzing one or more products of an endogenous analyte and/or a labelling agent in a biological sample. In some embodiments, an endogenous analyte (e.g., a viral or cellular DNA or RNA) or a product (e.g., a hybridization product, a ligation product, an extension product (e.g., by a DNA or RNA polymerase), a replication product, a transcription/reverse transcription product, and/or an amplification product such as a rolling circle amplification (RCA) product) thereof is analyzed. In some embodiments, a labelling agent that directly or indirectly binds to an analyte in the biological sample is analyzed. In some embodiments, a product (e.g., a hybridization product, a ligation product, an extension product (e.g., by a DNA or RNA polymerase), a replication product, a transcription/reverse transcription product, and/or an amplification product such as a rolling circle amplification (RCA) product) of a labelling agent that directly or indirectly binds to an analyte in the biological sample is analyzed.

(a) Hybridization

In some embodiments, a product of an endogenous analyte and/or a labelling agent is a hybridization product comprising the pairing of substantially complementary or complementary nucleic acid sequences within two different molecules, one of which is the endogenous analyte or the labelling agent (e.g., reporter oligonucleotide attached thereto). The other molecule can be another endogenous molecule or another labelling agent such as a probe. Pairing can be achieved by any process in which a nucleic acid sequence joins with a substantially or fully complementary sequence through base pairing to form a hybridization complex. For purposes of hybridization, two nucleic acid sequences are "substantially complementary" if at least 60% (e.g., at least 70%, at least 80%, or at least 90%) of their individual bases are complementary to one another.

Various probes and probe sets can be hybridized to an endogenous analyte and/or a labelling agent and each probe may comprise one or more barcode sequences. Exemplary barcoded probes or probe sets may be based on a padlock probe, a gapped padlock probe, a SNAIL (Splint Nucleotide Assisted Intramolecular Ligation) probe set, a PLAYR (Proximity Ligation Assay for RNA) probe set, a PLISH (Proximity Ligation in situ Hybridization) probe set, and RNA-templated ligation probes. The specific probe or probe set design can vary.

(b) Ligation

In some embodiments, a product of an endogenous analyte and/or a labelling agent is a ligation product. In some embodiments, the ligation product is formed between two or more endogenous analytes. In some embodiments, the ligation product is formed between an endogenous analyte and a labelling agent. In some embodiments, the ligation product is formed between two or more labelling agent. In some embodiments, the ligation product is an intramolecular ligation of an endogenous analyte. In some embodiments, the ligation product is an intramolecular ligation of a labelling agent, for example, the circularization of a circularizable probe or probe set upon hybridization to a target sequence. The target sequence can be comprised in an endogenous analyte (e.g., nucleic acid such as a genomic DNA or mRNA) or a product thereof (e.g., cDNA from a cellular mRNA transcript), or in a labelling agent (e.g., the reporter oligonucleotide) or a product thereof.

In some embodiments, provided herein is a probe or probe set capable of DNA-templated ligation, such as from a cDNA molecule. See, e.g., U.S. Pat. No. 8,551,710, which is hereby incorporated by reference in its entirety. In some embodiments, provided herein is a probe or probe set capable of RNA-templated ligation. See, e.g., U.S. Pat. Pub. 2020/0224244 which is hereby incorporated by reference in its entirety. In some embodiments, the probe set is a SNAIL probe set. See, e.g., U.S. Pat. Pub. 20190055594, which is hereby incorporated by reference in its entirety. In some embodiments, provided herein is a multiplexed proximity ligation assay. See, e.g., U.S. Pat. Pub. 20140194311 which is hereby incorporated by reference in its entirety. In some embodiments, provided herein is a probe or probe set capable of proximity ligation, for instance a proximity ligation assay for RNA (e.g., PLAYR) probe set. See, e.g., U.S. Pat. Pub. 20160108458, which is hereby incorporated by reference in its entirety. In some embodiments, a circular probe can be indirectly hybridized to the target nucleic acid. In some embodiments, the circular construct is formed from a probe set capable of proximity ligation, for instance a proximity ligation in situ hybridization (PLISH) probe set. See, e.g., U.S. Pat. Pub. 2020/0224243 which is hereby incorporated by reference in its entirety.

In some embodiments, the ligation involves chemical ligation. In some embodiments, the ligation involves template dependent ligation. In some embodiments, the ligation involves template independent ligation. In some embodiments, the ligation involves enzymatic ligation.

In some embodiments, the enzymatic ligation involves use of a ligase. In some aspects, the ligase used herein comprises an enzyme that is commonly used to join polynucleotides together or to join the ends of a single polynucleotide. An RNA ligase, a DNA ligase, or another variety of ligase can be used to ligate two nucleotide sequences together. Ligases comprise ATP-dependent double-strand polynucleotide ligases, NAD-i-dependent double-strand DNA or RNA ligases and single-strand polynucleotide ligases, for example any of the ligases described in EC 6.5.1.1 (ATP-dependent ligases), EC 6.5.1.2 (NAD+-dependent ligases), EC 6.5.1.3 (RNA ligases). Specific examples of ligases comprise bacterial ligases such as E. coli DNA ligase, Tth DNA ligase, Thermococcus sp. (strain 9° N) DNA ligase (9° N™ DNA ligase, New England Biolabs), Taq DNA ligase, Ampligase™ (Epicentre Biotechnologies) and phage ligases such as T3 DNA ligase, T4 DNA ligase and T7 DNA ligase and mutants thereof. In some embodiments, the ligase is a T4 RNA ligase. In some embodiments, the ligase is a splintR ligase. In some embodiments, the ligase is a single stranded DNA ligase. In some embodiments, the ligase is a T4 DNA ligase. In some embodiments, the ligase is a ligase that has an DNA-splinted DNA ligase activity. In some embodiments, the ligase is a ligase that has an RNA-splinted DNA ligase activity.

In some embodiments, the ligation herein is a direct ligation. In some embodiments, the ligation herein is an indirect ligation. "Direct ligation" means that the ends of the polynucleotides hybridize immediately adjacently to one another to form a substrate for a ligase enzyme resulting in their ligation to each other (intramolecular ligation). Alternatively, "indirect" means that the ends of the polynucleotides hybridize non-adjacently to one another, e.g., separated by one or more intervening nucleotides or "gaps". In some embodiments, said ends are not ligated directly to each other, but instead occurs either via the intermediacy of one or more intervening (so-called "gap" or "gap-filling" (oligo) nucleotides) or by the extension of the 3' end of a probe to "fill" the "gap" corresponding to said intervening nucleotides (intermolecular ligation). In some cases, the gap of one or more nucleotides between the hybridized ends of the polynucleotides may be "filled" by one or more "gap" (oligo)nucleotide(s) which are complementary to a splint, padlock probe, or target nucleic acid. The gap may be a gap of 1 to 60 nucleotides or a gap of 1 to 40 nucleotides or a gap of 3 to 40 nucleotides. In specific embodiments, the gap may be a gap of about 1, 2, 3, 4, 5, 6, 7, 8, 9 or 10 or more nucleotides, of any integer (or range of integers) of nucleotides in between the indicated values. In some embodiments, the gap between said terminal regions may be filled by a gap oligonucleotide or by extending the 3' end of a polynucleotide. In some cases, ligation involves ligating the ends of the probe to at least one gap (oligo)nucleotide, such that the gap (oligo)nucleotide becomes incorporated into the resulting polynucleotide. In some embodiments, the ligation herein is preceded by gap filling. In other embodiments, the ligation herein does not require gap filling.

In some embodiments, ligation of the polynucleotides produces polynucleotides with melting temperature higher than that of unligated polynucleotides. Thus, in some aspects, ligation stabilizes the hybridization complex containing the ligated polynucleotides prior to subsequent steps, comprising amplification and detection.

In some aspects, a high fidelity ligase, such as a thermostable DNA ligase (e.g., a Taq DNA ligase), is used. Thermostable DNA ligases are active at elevated temperatures, allowing further discrimination by incubating the ligation at a temperature near the melting temperature ($T_m$) of the DNA strands. This selectively reduces the concentration of annealed mismatched substrates (expected to have a slightly lower $T_m$ around the mismatch) over annealed fully base-paired substrates. Thus, high-fidelity ligation can be achieved through a combination of the intrinsic selectivity of the ligase active site and balanced conditions to reduce the incidence of annealed mismatched dsDNA.

In some embodiments, the ligation herein is a proximity ligation of ligating two (or more) nucleic acid sequences that are in proximity with each other, e.g., through enzymatic means (e.g., a ligase). In some embodiments, proximity ligation can include a "gap-filling" step that involves incorporation of one or more nucleic acids by a polymerase, based on the nucleic acid sequence of a template nucleic acid molecule, spanning a distance between the two nucleic acid molecules of interest (see, e.g., U.S. Pat. No. 7,264,929, the entire contents of which are incorporated herein by reference). A wide variety of different methods can be used for proximity ligating nucleic acid molecules, including (but not limited to) "sticky-end" and "blunt-end" ligations. Additionally, single-stranded ligation can be used to perform proximity ligation on a single-stranded nucleic acid molecule. Sticky-end proximity ligations involve the hybridization of complementary single-stranded sequences between the two nucleic acid molecules to be joined, prior to the ligation event itself. Blunt-end proximity ligations generally do not include hybridization of complementary regions from each nucleic acid molecule because both nucleic acid molecules lack a single-stranded overhang at the site of ligation.

(c) Primer Extension and Amplification

In some embodiments, a product is a primer extension product of an analyte, a labelling agent, a probe or probe set bound to the analyte (e.g., a padlock probe bound to genomic DNA, mRNA, or cDNA), or a probe or probe set bound to the labelling agent (e.g., a padlock probe bound to one or more reporter oligonucleotides from the same or different labelling agents).

A primer is generally a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A primer, may in some cases, refer to a primer binding sequence.

In some embodiments, a product of an endogenous analyte and/or a labelling agent is an amplification product of one or more polynucleotides, for instance, a circular probe or circularizable probe or probe set. In some embodiments, the amplifying is achieved by performing rolling circle amplification (RCA). In other embodiments, a primer that hybridizes to the circular probe or circularized probe is added and used as such for amplification. In some embodiments, the RCA comprises a linear RCA, a branched RCA, a dendritic RCA, or any combination thereof.

In some embodiments, the amplification is performed at a temperature between or between about 20° C. and about 60° C. In some embodiments, the amplification is performed at a temperature between or between about 30° C. and about 40° C. In some aspects, the amplification step, such as the rolling circle amplification (RCA) is performed at a temperature between at or about 25° C. and at or about 50° C., such as at or about 25° C., 27° C., 29° C., 31° C., 33° C., 35° C., 37° C., 39° C., 41° C., 43° C., 45° C., 47° C., or 49° C.

In some embodiments, upon addition of a DNA polymerase in the presence of appropriate dNTP precursors and other cofactors, a primer is elongated to produce multiple copies of the circular template. This amplification step can utilize isothermal amplification or non-isothermal amplification. In some embodiments, after the formation of the hybridization complex and association of the amplification probe, the hybridization complex is rolling-circle amplified to generate a cDNA nanoball (e.g., amplicon) containing multiple copies of the cDNA. Techniques for rolling circle amplification (RCA) such as linear RCA, a branched RCA, a dendritic RCA, or any combination thereof. (See, e.g., Baner et al, Nucleic Acids Research, 26:5073-5078, 1998; Lizardi et al, Nature Genetics 19:226, 1998; Mohsen et al., Acc Chem Res. 2016 Nov. 15; 49(11): 2540-2550; Schweitzer et al. Proc. Natl Acad. Sci. USA 97:101 13-1 19, 2000; Faruqi et al, BMC Genomics 2:4, 2000; Nallur et al, Nucl. Acids Res. 29:el 18, 2001; Dean et al. Genome Res. 11:1095-1099, 2001; Schweitzer et al, Nature Biotech. 20:359-365, 2002; U.S. Pat. Nos. 6,054,274, 6,291,187, 6,323,009, 6,344,329 and 6,368,801). Exemplary polymerases for use in RCA comprise DNA polymerase such phi29 (φ29) polymerase, Klenow fragment, *Bacillus stearothermophilus* DNA polymerase (BST), T4 DNA polymerase, T7 DNA polymerase, or DNA polymerase I. In some aspects, DNA polymerases that have been engineered or mutated to have desirable characteristics can be employed. In some embodiments, the polymerase is phi29 DNA polymerase.

In some aspects, during the amplification step, modified nucleotides can be added to the reaction to incorporate the modified nucleotides in the amplification product (e.g., nanoball). Exemplary of the modified nucleotides comprise amine-modified nucleotides. In some aspects of the methods, for example, for anchoring or cross-linking of the generated amplification product (e.g., nanoball) to a scaffold, to cellular structures and/or to other amplification products (e.g., other nanoballs). In some aspects, the amplification products comprises a modified nucleotide, such as an amine-modified nucleotide. In some embodiments, the amine-modified nucleotide comprises an acrylic acid N-hydroxysuccinimide moiety modification. Examples of other amine-modified nucleotides comprise, but are not limited to, a 5-Aminoallyl-dUTP moiety modification, a 5-Propargylamino-dCTP moiety modification, a N6-6-Aminohexyl-dATP moiety modification, or a 7-Deaza-7-Propargylamino-dATP moiety modification.

In some aspects, the polynucleotides and/or amplification product (e.g., amplicon) can be anchored to a polymer matrix. For example, the polymer matrix can be a hydrogel. In some embodiments, one or more of the polynucleotide probe(s) can be modified to contain functional groups that can be used as an anchoring site to attach the polynucleotide probes and/or amplification product to a polymer matrix. Exemplary modification and polymer matrix that can be employed in accordance with the provided embodiments comprise those described in, for example, WO 2014/163886, WO 2017/079406, US 2016/0024555, US 2018/0251833 and US 2017/0219465. In some examples, the scaffold also contains modifications or functional groups that can react with or incorporate the modifications or functional groups of the probe set or amplification product. In some examples, the scaffold can comprise oligonucleotides, polymers or chemical groups, to provide a matrix and/or support structures.

The amplification products may be immobilized within the matrix generally at the location of the nucleic acid being amplified, thereby creating a localized colony of amplicons. The amplification products may be immobilized within the matrix by steric factors. The amplification products may also be immobilized within the matrix by covalent or noncovalent bonding. In this manner, the amplification products may be considered to be attached to the matrix. By being immobilized to the matrix, such as by covalent bonding or cross-linking, the size and spatial relationship of the original amplicons is maintained. By being immobilized to the matrix, such as by covalent bonding or cross-linking, the amplification products are resistant to movement or unraveling under mechanical stress.

In some aspects, the amplification products are copolymerized and/or covalently attached to the surrounding matrix thereby preserving their spatial relationship and any information inherent thereto. For example, if the amplification products are those generated from DNA or RNA within a cell embedded in the matrix, the amplification products can also be functionalized to form covalent attachment to the matrix preserving their spatial information within the cell thereby providing a subcellular localization distribution pattern. In some embodiments, the provided methods involve embedding the one or more polynucleotide probe sets and/or the amplification products in the presence of hydrogel subunits to form one or more hydrogel-embedded amplification products. In some embodiments, the hydrogel-tissue chemistry described comprises covalently attaching nucleic acids to in situ synthesized hydrogel for tissue clearing, enzyme diffusion, and multiple-cycle sequencing while an existing hydrogel-tis sue chemistry method cannot. In some embodiments, to enable amplification product embedding in the tissue-hydrogel setting, amine-modified nucleotides are comprised in the amplification step (e.g., RCA), functionalized with an acrylamide moiety using acrylic acid N-hydroxysuccinimide esters, and copolymerized with acrylamide monomers to form a hydrogel.

In some embodiments, the RCA template may comprise the target analyte, or a part thereof, where the target analyte is a nucleic acid, or it may be provided or generated as a proxy, or a marker, for the analyte. As noted above, many assays are known for the detection of numerous different analytes, which use an RCA-based detection system, e.g., where the signal is provided by generating an RCP from a circular RCA template which is provided or generated in the assay, and the RCP is detected to detect the analyte. The RCP may thus be regarded as a reporter which is detected to detect the target analyte. However, the RCA template may also be regarded as a reporter for the target analyte; the RCP is generated based on the RCA template, and comprises complementary copies of the RCA template. The RCA template determines the signal which is detected, and is thus indicative of the target analyte. As will be described in more detail below, the RCA template may be a probe, or a part or component of a probe, or may be generated from a probe, or it may be a component of a detection assay (e.g. a reagent in a detection assay), which is used as a reporter for the assay, or a part of a reporter, or signal-generation system. The RCA template used to generate the RCP may thus be a circular (e.g. circularized) reporter nucleic acid molecule, namely from any RCA-based detection assay which uses or generates a circular nucleic acid as a reporter for the assay.

In some embodiments, a product herein includes a molecule or a complex generated in a series of reactions, e.g., hybridization, ligation, extension, replication, transcription/reverse transcription, and/or amplification (e.g., rolling circle amplification), in any suitable combination. For example, a product comprising a target sequence for a probe disclosed herein may be a hybridization complex formed of a cellular nucleic acid in a sample and an exogenously added nucleic acid probe. The exogenously added nucleic acid probe may comprise an overhang that does not hybridize to the cellular nucleic acid but hybridizes to another probe. The exogenously added nucleic acid probe may be optionally ligated to a cellular nucleic acid molecule or another exogenous nucleic acid molecule. In other examples, a product comprising a target sequence for a probe disclosed herein may be an RCP of a circularizable probe or probe set which hybridizes to a cellular nucleic acid molecule (e.g., genomic DNA or mRNA) or product thereof (e.g., a transcript such as cDNA, a DNA-templated ligation product of two probes, or an RNA-templated ligation product of two probes). In other examples, a product comprising a target sequence for a probe disclosed herein may a probe hybridizing to an RCP. The probe may comprise an overhang that does not hybridize to the RCP but hybridizes to another probe. The probe may be optionally ligated to a cellular nucleic acid molecule or another probe, e.g., an anchor probe that hybridize to the RCP.

C. Target Sequences

A target sequence for a probe disclosed herein may be comprised in any analyte disclose herein, including an endogenous analyte (e.g., a viral or cellular nucleic acid), a labelling agent, or a product of an endogenous analyte and/or a labelling agent.

In some aspects, one or more of the target sequences includes one or more barcode(s), e.g., at least two, three, four, five, six, seven, eight, nine, ten, or more barcodes. Barcodes can spatially-resolve molecular components found in biological samples, for example, within a cell or a tissue sample. A barcode can be attached to an analyte or to another moiety or structure in a reversible or irreversible manner. A barcode can be added to, for example, a fragment of a deoxyribonucleic acid (DNA) or ribonucleic acid (RNA) sample before or during sequencing of the sample. Barcodes can allow for identification and/or quantification of individual sequencing-reads (e.g., a barcode can be or can include a unique molecular identifier or "UMI"). In some aspects, a barcode comprises about 4, 5, 6, 7, 8, 9, 10, 11, 12, 13, 14, 15, 16, 17, 18, 19, 20, 21, 22, 23, 24, 25, 26, 27, 28, 29, 30, or more than 30 nucleotides.

In some embodiments, a barcode includes two or more sub-barcodes that together function as a single barcode. For example, a polynucleotide barcode can include two or more polynucleotide sequences (e.g., sub-barcodes) that are separated by one or more non-barcode sequences. In some embodiments, the one or more barcode(s) can also provide a platform for targeting functionalities, such as oligonucleotides, oligonucleotide-antibody conjugates, oligonucleotide-streptavidin conjugates, modified oligonucleotides, affinity purification, detectable moieties, enzymes, enzymes for detection assays or other functionalities, and/or for detection and identification of the polynucleotide.

In some embodiments, barcodes (e.g., primary and/or secondary barcode sequences) can be analyzed (e.g., detected or sequenced) using any suitable methods or techniques, including those described herein, such as RNA sequential probing of targets (RNA SPOTs), sequential fluorescent in situ hybridization (seqFISH), single-molecule fluorescent in situ hybridization (smFISH), multiplexed error-robust fluorescence in situ hybridization (MERFISH), in situ sequencing, hybridization-based in situ sequencing (HybISS), targeted in situ sequencing, fluorescent in situ sequencing (FISSEQ), sequencing by synthesis (SBS), sequencing by ligation (SBL), sequencing by hybridization (SBH), or spatially-resolved transcript amplicon readout mapping (STARmap). In some embodiments, the methods provided herein can include analyzing the barcodes by sequential hybridization and detection with a plurality of labelled probes (e.g., detection oligos).

In some embodiments, in a barcode sequencing method, barcode sequences are detected for identification of other molecules including nucleic acid molecules (DNA or RNA) longer than the barcode sequences themselves, as opposed to direct sequencing of the longer nucleic acid molecules. In some embodiments, a N-mer barcode sequence comprises $4^N$ complexity given a sequencing read of N bases, and a much shorter sequencing read may be required for molecular identification compared to non-barcode sequencing methods such as direct sequencing. For example, 1024 molecular species may be identified using a 5-nucleotide barcode sequence ($4^5$=1024), whereas 8 nucleotide barcodes can be used to identify up to 65,536 molecular species, a number greater than the total number of distinct genes in the human genome. In some embodiments, the barcode sequences contained in the probes or RCPs are detected, rather than endogenous sequences, which can be an efficient read-out in terms of information per cycle of sequencing. Because the barcode sequences are pre-determined, they can also be designed to feature error detection and correction mechanisms, see, e.g., U.S. Pat. Pub. 20190055594 and U.S. Pat. Pub. US20210164039, which are hereby incorporated by reference in their entirety.

III. Nucleic Acid Concatemer Compaction and/or Stabilization

A. Rolling Circle Amplification (RCA) from Probes Comprising Hybridizing Regions In some aspects, provided herein are methods and compositions for processing a biological sample comprising a nucleic acid concatemer, such as a product (e.g., an amplification product, such as a rolling circle amplification product (RCP)) of an analyte in the biological sample. In some embodiments, the nucleic acid concatemer is a product of a labelling agent that directly or indirectly binds to an analyte in the biological sample.

In some embodiments, the analyte is a nucleic acid analyte or a non-nucleic acid analyte, and wherein the labelling agent comprises a reporter oligonucleotide and an analyte-binding moiety coupled thereto. In some embodiments, the nucleic acid concatemer (e.g., RCP) comprises nucleic acids. In some embodiments, the nucleic acid concatemer contains natural and unnatural nucleotides. For example, the nucleic acid concatemer may comprise modified nucleotides, non-nucleotides, or synthetic nucleotides. Nucleotides amendable to the present application include the natural nucleotides of DNA (deoxyribonucleic acid), including adenine (A), guanine (G), cytosine (C), and thymine (T), and the natural nucleotides of RNA (ribonucleic acid), adenine (A), uracil (U), guanine (G), and cytosine (C). Additional suitable bases include natural bases, such as deoxyadenosine, deoxythymidine, deoxyguanosine, deoxycytidine, inosine, diamino purine; base analogs, such as 2-aminoadenosine, 2-thiothymidine, inosine, pyrrolo-pyrimidine, 3-methyl adenosine, C5-propynylcytidine, C5-propynyluridine, C5-bromouridine, C5-fluorouridine, C5-iodouridine, C5-methylcytidine, 7-deazaadenosine, 7-deazaguanosine, 8-oxoadenosine, 8-oxoguanosine, 0(6)-methylguanine, 4-((3-(2-(2-(3-aminopropoxy)ethoxy)ethoxy)propyl)amino)pyrimidin-2(1H)-one, 4-amino-5-(hepta-1,5-diyn-1-yl)pyrimidin-2(1H)-one, 6-methyl-3,7-dihydro-2H-pyrrolo[2,3-d]pyrimidin-2-one, 3H-benzo[b]pyrimido[4,5-e][1,4]oxazin-2(10H)-one, and 2-thiocytidine;

modified nucleotides, such as 2'-substituted nucleotides, including 2'-O-methylated bases and 2'-fluoro bases; and modified sugars, such as 2'-fluororibose, ribose, 2'-deoxyribose, arabinose, and hexose; and/or modified phosphate groups, such as phosphorothioates and 5'-N-phosphoramidite linkages. In some embodiments, the modified nucleotides are amine-modified nucleotides.

In some embodiments, the nucleic acid concatemer is between about 1 and about 85 kilobases in length, such as between any of about 1 and about 15 kilobases, about 10 and about 30 kilobases, about 20 and about 40 kilobases, about 30 and about 50 kilobases, about 40 and about 60 kilobases, about 50 and about 70 kilobases, and about 60 and about 85 kilobases in length. In some embodiments, the nucleic acid concatemer is at least 1 kilobase in length, such as any of about 15, 25, 35, 45, 55, 65, or 85 kilobases in length. In some embodiments, the nucleic acid concatemer is more than 85 kilobases in length.

In some embodiments, the nucleic acid concatemer is a rolling circle amplification product comprising a barcode sequence corresponding to an analyte in the biological sample, and the nucleic acid concatemer is between about 1 and about 15 kilobases, between about 15 and about 25 kilobases, between about 25 and about 35 kilobases, between about 35 and about 45 kilobases, between about 45 and about 55 kilobases, between about 55 and about 65 kilobases, between about 65 and about 75 kilobases, or more than 75 kilobases in length.

In some embodiments, the nucleic acid concatemer forms a nanoball such as one having a diameter between about 0.1 µm and about 3 µm. The nanoball may be a product of amplification, such as RCA. In some embodiments, the nanoball has a diameter of between about 0.1 µm and about 4 µm, such as between any of about 0.1 µm and about 0.5 µm, about 0.2 µm and about 2 µm, about 1 µm and about 3 µm, and about 2 µm and about 4 µm. In some embodiments, the nanoball diameter is at least about 0.1 µm, such as at least any of about 0.2 µm, 0.5 µm, 1 µm, 1.5 µm, 2 µm, 2.5 µm, 3 µm, 3.5 µm, and 4 µm.

In some embodiments, a nucleic acid concatemer is generated from a nucleic acid analyte. For example, the nucleic acid analyte may be DNA, ssDNA, or RNA. In some embodiments, the analyte is a non-nucleic acid analyte (e.g., a protein). In some embodiments, the nucleic acid concatemer is generated from a labelling agent that directly or indirectly binds to an analyte in the biological sample. Examples of labelling agents are described in Section II.B.ii.

In some aspects, the polynucleotides and/or amplification product (e.g., amplicon) can be anchored to a polymer matrix. For example, the polymer matrix can be a hydrogel. In some embodiments, one or more of the oligonucleotides probe(s) can be modified to contain functional groups (e.g., photoreactive nucleotides) that can be used as an anchoring site to attach the polynucleotide probes and/or amplification product to a polymer matrix. In some embodiments, the nucleic acid concatemer can further comprise one or more amine-modified nucleotides. Exemplary polymer matrix that can be employed in accordance with the provided embodiments comprise those described in, for example, US 2016/0024555, US 2018/0251833, US 2016/0024555, US 2018/0251833 and US 2017/0219465. In some examples, the scaffold can comprise oligonucleotides, polymers or chemical groups, to provide a matrix and/or support structures.

In some preferred embodiments, the nucleic acid concatemer is an amplification product, such as a rolling circle amplification (RCA) product. RCA may comprise contacting the biological sample with one or more probes (e.g., a circular probe or circularizable probe or probe set) to produce an RCP. In some embodiments, a different palindromic sequence may be included in each circular probe or circularizable probe or probe set in a plurality of circular probes or circularizable probes or probe sets, and in some aspects, the different palindromic sequences can prevent probes comprising the palindromic sequences from cross-hybridization to one another. In some embodiments, provided herein is a plurality of circular probes or circularizable probes or probe sets (e.g., padlock probes) that bind to different target nucleic acids, and each comprising a different hybridizing region palindromic sequence that is different from that in another probe in the plurality. In some embodiments, the plurality comprises a first circular probe or circularizable probe or probe set (e.g., a first padlock probe) comprising one, two, or more hybridizing region palindromic sequences, and a second circular probe or circularizable probe or probe set (e.g., a second padlock probe) comprising one, two, or more hybridizing region palindromic sequences, the hybridizing region palindromic sequence(s) in the first probe or probe set being different from the hybridizing region palindromic sequence(s) in the second probe or probe set. The first and second probes or probe sets can bind to the same target nucleic acid or bind to different target nucleic acids.

In some embodiments, a probe or probe set comprising a palindromic sequence reduces the size of the RCP by about 95%, about 90%, about 85%, about 80%, about 75%, about 70%, about 65%, about 60%, about 55%, about 50%, about 45%, about 40%, about 35%, about 30%, about 25%, about 20%, about 15%, about 10%, about 5%, about 2%, or about 1% compared to the RCP size generated using a probe or probe set without the palindromic sequence. In some embodiments, a probe or probe set comprising a palindromic sequence reduces the size of the RCP by 1-10%, 1-15%, 1-20%, 1-25%, or 1-30% compared to the RCP size generated using a probe or probe set without the palindromic sequence. In some embodiments, a probe or probe set comprising a palindromic sequence reduces the size of the RCP by 2-10%, 2-15%, 2-20%, 2-25%, or 2-30% compared to the RCP size generated using a probe or probe set without the palindromic sequence. In some embodiments, a probe or probe set comprising a palindromic sequence reduces the size of the RCP by 5-10%, 5-15%, 5-20%, 5-25%, or 5-30% compared to the RCP size generated using a probe or probe set without the palindromic sequence. In some embodiments, a probe or probe set comprising a palindromic sequence reduces the size of the RCP by 5-15%, 5-20%, 5-25%, or 5-30% compared to the RCP size generated using a probe or probe set without the palindromic sequence.

In some embodiments, the one or more probes or probe sets comprise a circular probe, or a circularizable probe or probe set. In some embodiments, the circular probe or the circularizable probe or probe set is or comprises an oligonucleotide. A circularizable probe or probe set may be ligated to form a circularized probe. In some embodiments, the circular probe or the circularizable probe or probe set comprises a barcode sequence. In some embodiments, the barcode sequence of the circular probe or the circularizable probe or probe set is incorporated into the nucleic acid concatemer during amplification (e.g., RCA).

In some embodiments, the circular probe or circularizable probe or probe set is a padlock probe. In some embodiments, the padlock probe is no more than 25, no more than 30, no more than 40, no more than 50, no more than 60, no more than 70, no more than 80, no more than 90, no more than 100, no more than 110, or no more than 120 nucleotides in length.

In some embodiments, the circular probe or circularizable probe or probe set comprises one or more hybridizing regions. In some embodiments, the one or more hybridizing regions are capable of hybridizing to each other. In some embodiments, the circular probe or circularizable probe or probe set comprises at least two hybridizing regions. In some embodiments, the circular probe or circularizable probe or probe set comprises a first hybridizing region and a second hybridizing region. In some embodiments, the first hybridizing region and the second hybridizing region are capable of hybridizing to each other. In some embodiments, the first hybridizing region and the second hybridizing region are complementary to each other.

In some aspects, the first and/or second hybridizing regions each comprise a palindromic sequence. In some embodiments, the first hybridizing region and the second hybridizing region comprise identical sequences. In some embodiments, the first hybridizing region and the second hybridizing region comprise different sequences. In some embodiments, the first and/or second hybridizing region is longer than the second and/or first hybridizing region, respectively, but does not interfere with the hybridization of the hybridizing regions to each other.

In some aspects, the circular probe or circularizable probe or probe set further comprises a third hybridizing region and a fourth hybridizing region. In some embodiments, the third hybridizing region and the fourth hybridizing region are capable of hybridizing to each other. In some embodiments, the third hybridizing region and the fourth hybridizing region are complementary to each other. In some embodiments, the third and/or fourth hybridizing regions each comprise a palindromic sequence. In some embodiments, the third hybridizing region and the fourth hybridizing region comprise identical sequences. In some embodiments, the third hybridizing region and the fourth hybridizing region comprise different sequences. In some embodiments, the third and/or fourth hybridizing region is longer than the fourth and/or third hybridizing region, respectively, but does not interfere with the hybridization of the hybridizing regions to each other.

In some embodiments, the first and second hybridizing regions are different in sequence from the third and fourth hybridizing regions, respectively. In some embodiments, the first and second hybridizing regions do not hybridize to the third or fourth hybridizing region. In some embodiments, the first and second hybridizing regions are the same in sequence as the third and fourth hybridizing regions, respectively.

In some embodiments, the hybridizing regions (e.g., the first, second, third, and/or fourth hybridizing regions) are each between about 5 and about 35 nucleotides in length, such as between any of about 5 about 20 nucleotides in length, about 10 about 25 nucleotides in length, about 15 about 30 nucleotides in length, and about 20 about 35 nucleotides in length. In some embodiments, the hybridizing regions are between about 15 and about 30 nucleotides in length. In some embodiments, the hybridizing regions are about 30 nucleotides in length. In some embodiments, the hybridizing regions are between about 8 and about 15 nucleotides in length. In some embodiments, the hybridizing regions are about 10 nucleotides in length. In some embodiments, the hybridizing regions are no more than 14 nucleotides in length, such as no more than about 13, 12, 11, 10, 9, 8, 7, 6, or 5 nucleotides in length.

In some embodiments, the methods disclosed herein involve the use of one or more probes or probe sets that directly or indirectly hybridize to a target nucleic acid, such as a nucleic acid analyte. In some aspects, the biological sample is contacted with a barcoded probe or barcoded probe set. In some embodiments, the barcode probe or barcoded probe set comprises one or more barcode sequences. Therefore, in some embodiments, the nucleic acid concatemer comprises one or more barcode sequences. The barcode sequence may be specific to a target nucleic acid (e.g., an analyte) in the biological sample, thereby serving to identify the target nucleic acid during downstream analyses.

In some embodiments, the hybridizing regions (e.g., a first and second hybridizing region, and/or a third and fourth hybridizing region) are linked (e.g., separated) by a loop region. For example, the first and second hybridizing regions may be linked by a loop region that is immediately adjacent to the first and second hybridizing regions. In some embodiments, the loop region comprises one or more barcode sequences. Therefore, in some embodiments, the one or more barcode sequences are located between hybridizing regions on the circular probe or circularizable probe or probe set. The barcode sequence may be specific to a target nucleic acid (e.g., an analyte) in the biological sample, thereby serving to identify the target nucleic acid during downstream analyses.

In some embodiments, the one or more barcode sequences are located between the first and second hybridizing regions on the circular probe or circularizable probe or probe set. In some embodiments, the one or more barcode sequences are located between the third and fourth hybridizing regions on the circular probe or circularizable probe or probe set. In some embodiments, the loop region linking a first hybridizing region and a second hybridizing region comprises one or more barcode sequences, and the loop region linking a third hybridizing region and a fourth hybridizing region does not comprise one or more barcode sequences. In some embodiments, the loop region linking a third hybridizing region and a fourth hybridizing region comprises one or more barcode sequences, and the loop region linking a first hybridizing region and a second hybridizing region does not comprise one or more barcode sequences. In some embodiments, both the loop region linking a first hybridizing region and a second hybridizing region and the loop region linking a third hybridizing region and a fourth hybridizing region comprise one or more barcode sequences.

In some embodiments, the loop region is no more than about 5, no more than about 10, no more than about 15, no more than about 20, no more than about 25, no more than about 30, no more than about 35, no more than about 40, no more than about 45, or no more than about 50 nucleotides in length. In some embodiments, the loop region comprises less than about 50 nucleotides in length, such as less than any of about 45, 40, 35, 30, 25, 20, 15, 10, or 5 nucleotides in length. In some embodiments, the loop region comprises between about 3 and about 10 nucleotides in length. In some embodiments, the loop region comprises 4 nucleotides in length. In some embodiments, the loop region comprises between about 20 and about 50 nucleotides in length.

FIG. 1A shows an exemplary set of oligonucleotide probes comprising a circular or circularized probe and an oligonucleotide for RCA that is hybridized to the target nucleic acid, shown in black. In some embodiments, the probe is a padlock probe. In some embodiments, the padlock probe is no more than 25 to no more than 120 nucleotides in length. The oligonucleotide in the probe set comprises a region that hybridizes to the target sequence adjacent to a region that hybridizes to the 5' and 3' ends of the second probe, to facilitate the circularization of the second circularizable probe (FIG. 1A). In some embodiments, the circular or circularizable probe comprises a first hybridizing region and a second hybridizing region. In some embodiments, the probe further comprises a barcode sequence, wherein the barcode sequence is located between the two hybridizing regions of the second circularizable probe and may be used to identify the target nucleic acid during downstream analysis. In some embodiments, the first and second hybridizing regions have complementary sequences and are capable of hybridizing to each other. In some embodiments, the first and second hybridizing regions each comprise a palindromic sequence. In some embodiments, the first and second hybridizing regions are between about 5 and 35 nucleotides in length.

In some aspects, provided herein is a method for analyzing a biological sample, comprising: (a) contacting the biological sample with a padlock probe comprising a sequence that hybridizes to a target nucleic acid in the biological sample, wherein the padlock probe comprises: (i) a first hybridizing region and a second hybridizing region capable of hybridizing to each other, wherein the first and second hybridizing regions are linked by a first loop region; (ii) a third hybridizing region and a fourth hybridizing region capable of hybridizing to each other, wherein the third and fourth hybridizing regions are linked by a second loop region; and (iii) one or more barcode sequences in the first and/or second loop regions; and (b) generating a rolling circle amplification product in situ in the biological sample using a circularized padlock probe as a template, wherein the padlock probe is circularized to generate the circularized padlock probe using the target nucleic acid and/or a splint as template, wherein the rolling circle amplification product comprises multiple copies of complementary sequences of the first, second, third, and fourth hybridizing regions, and wherein the complementary sequences of the first and second hybridizing regions from two or more different copies hybridize to one another and the complementary sequences of the third and fourth hybridizing regions from two or more different copies hybridize to one another, thereby compacting and/or stabilizing the rolling circle amplification product in situ in the biological sample.

FIG. 1C shows an exemplary set of oligonucleotide probes for RCA that is hybridized to the target nucleic acid. In some embodiments, the probe set comprises an oligonucleotide and a circular or circularizable probe. In some embodiments, the circularizable probe set comprises a padlock probe. In some embodiments, the padlock probe is no more than 25 to no more than 120 nucleotides in length. The first probe comprises a region that hybridizes to the target sequence immediately adjacent to a region that hybridizes to the 5' and 3' ends of the second probe to facilitate the circularization of the second probe. In some embodiments, the second probe (e.g., a padlock probe) comprises a first hybridizing region, a second hybridizing region, a third hybridizing region, and a fourth hybridizing region. In some embodiments, a first barcode sequence is located between the first and second hybridizing regions, and a second barcode sequence is located between the third and fourth hybridizing regions. In some embodiments, the one or more barcode sequences may be used to identify the target nucleic acid during downstream analysis. In some embodiments, the first and second barcode sequences are the same. In some embodiments, the first and second hybridizing regions have complementary sequences and are capable of hybridizing to each other. In some embodiments, the third and fourth hybridizing regions have complementary sequences and are capable of hybridizing to each other. In some embodiments, the first and second hybridizing regions are different in sequence from the third and fourth hybridizing regions, respectively. In some embodiments, the first and second hybridizing regions do not hybridize to the third or fourth hybridizing region. In some embodiments, the first and second hybridizing regions are the same in sequence as the third and fourth hybridizing regions, respectively. In some embodiments, the first and second hybridizing regions can hybridize to the third or fourth hybridizing region. In some embodiments, the hybridizing regions each comprise a palindromic sequence. In some embodiments, the hybridizing regions are between about 5 and 35 nucleotides in length.

A SNAIL probe set is shown in FIGS. 1A-1B for purpose of illustration only. Any suitable circularizable probe or probe set, or indeed more generally circularizable reporter molecules, may be used to generate the RCA template. A circularizable probe or reporter (e.g., the RCA template) can be in the form of a linear molecule having ligatable ends which may circularized by ligating the ends together directly or indirectly to each other, or to the respective ends of an intervening ("gap") oligonucleotide or to an extended 3' end of the circularizable RCA template. A circularizable template may also be provided in two or more parts, namely two or more molecules (e.g., oligonucleotides) which may be ligated together to form a circle. When said RCA template is circularizable it is circularized by ligation prior to RCA. Ligation may be templated using a ligation template, and in the case of padlock and molecular inversion probes and such like the target analyte may provide the ligation template, or it may be separately provided. The circularizable RCA template (or template part or portion) will comprise at its respective 3' and 5' ends regions of complementarity to corresponding cognate complementary regions (or binding sites) in the ligation template, which may be adjacent where the ends are directly ligated to each other, or non-adjacent, with an intervening "gap" sequence, where indirect ligation is to take place.

In the case of padlock probes, in one embodiment the ends of the padlock probe may be brought into proximity to each other by hybridization to adjacent sequences on a target nucleic acid molecule (such as a target analyte), which acts as a ligation template, thus allowing the ends to be ligated together to form a circular nucleic acid molecule, allowing the circularized padlock probe to act as a template for an RCA reaction. In such an example the terminal sequences of the padlock probe which hybridize to the target nucleic acid molecule will be specific to the target analyte in question, and will be replicated repeatedly in the RCP. They may therefore act as a marker sequence indicative of that target analyte. Accordingly, it can be seen that the marker sequence in the RCP may be equivalent to a sequence present in the target analyte itself. Alternatively, a marker sequence (e.g. tag or barcode sequence) may be provided in the non-target complementary parts of the padlock probe. In still a further embodiment, the marker sequence may be present in the gap oligonucleotide which is hybridized between the respective hybridized ends of the padlock probe, where they are hybridized to non-adjacent sequences in the target molecule. Such gap-filling padlock probes are akin to molecular inversion probes.

In some embodiments, similar circular RCA template molecules can be generated using molecular inversion probes. Like padlock probes, these are also typically linear nucleic acid molecules capable of hybridizing to a target nucleic acid molecule (such as a target analyte) and being circularized. The two ends of the molecular inversion probe may hybridize to the target nucleic acid molecule at sites which are proximate but not directly adjacent to each other, resulting in a gap between the two ends. The size of this gap may range from only a single nucleotide in some embodiments, to larger gaps of 100 to 500 nucleotides, or longer, in other embodiments. Accordingly, it is necessary to supply a polymerase and a source of nucleotides, or an additional gap-filling oligonucleotide, in order to fill the gap between the two ends of the molecular inversion probe, such that it can be circularized.

As with the padlock probe, the terminal sequences of the molecular inversion probe which hybridize to the target nucleic acid molecule, and the sequence between them, will be specific to the target analyte in question, and will be replicated repeatedly in the RCP. They may therefore act as a marker sequence indicative of that target analyte. Alternatively, a marker sequence (e.g. tag or barcode sequence) may be provided in the non-target complementary parts of the molecular inversion probe.

In some embodiments, the probes disclosed herein may be invader probes, e.g., for generating a circular nucleic acid such as a circularized probe. Such probes are of particular utility in the detection of single nucleotide polymorphisms. The detection method of the present invention may, therefore, be used in the detection of a single nucleotide polymorphism, or indeed any variant base, in the target nucleic acid sequence. Probes for use in such a method may be designed such that the 3' ligatable end of the probe is complementary to and capable of hybridizing to the nucleotide in the target molecule which is of interest (the variant nucleotide), and the nucleotide at the 3' end of the 5' additional sequence at the 5' end of the probe or at the 5' end of another, different, probe part is complementary to the same said nucleotide, but is prevented from hybridizing thereto by a 3' ligatable end (e.g., it is a displaced nucleotide). Cleavage of the probe to remove the additional sequence provides a 5' ligatable end, which may be ligated to the 3' ligatable end of the probe or probe part if the 3' ligatable end is hybridized correctly to the target nucleic acid molecule. Probes designed according to this principle provide a high degree of discrimination between different variants at the position of interest, as only probes in which the 3' ligatable end is complementary to the nucleotide at the position of interest may participate in a ligation reaction. In one embodiment, the probe is provided in a single part, and the 3' and 5' ligatable ends are provided by the same probe. In some embodiments, an invader probe is a padlock probe (an invader padlock or "iLock"), e.g., as described in Krzywkowski et al., *Nucleic Acids Research* 45, e161, 2017 and US 2020/0224244, which are incorporated herein by reference.

Other types of probe which result in circular molecules which can be detected by RCA and which comprise either a target analyte sequence or a complement thereof include selector-type probes described in US20190144940, which comprise sequences capable of directing the cleavage of a target nucleic acid molecule so as to release a fragment comprising a target sequence from the target analyte and sequences capable of templating the circularization and ligation of the fragment. US20180327818 describes probes which comprise a 3' sequence capable of hybridizing to a target nucleic acid molecule and acting as a primer for the production of a complement of a target sequence within the target nucleic acid molecule (e.g., by target templated extension of the primer), and an internal sequence capable of templating the circularization and ligation of the extended probe comprising the reverse complement of the target sequence within the target analyte and a portion of the probe. In the case of both such probes, target sequences or complements thereof are incorporated into a circularized molecule which acts as the template for the RCA reaction to generate the RCP, which consequently comprises concatenated repeats of said target sequence. In some embodiments, said target sequence may act as, or may comprise a marker sequence within the RCP indicative of the target analyte in question. Alternatively, a marker sequence (e.g. tag or barcode sequence) may be provided in the non-target complementary parts of the probes.

In some embodiments, a nucleic acid probe disclosed herein can be pre-assembled from multiple components, e.g., prior to contacting the nucleic acid probe with a target nucleic acid or a sample. In some embodiments, a nucleic acid probe disclosed herein can be assembled during and/or after contacting a target nucleic acid or a sample with multiple components. In some embodiments, a nucleic acid probe disclosed herein is assembled in situ in a sample. In some embodiments, the multiple components can be contacted with a target nucleic acid or a sample in any suitable order and any suitable combination.

In some embodiments, the melting temperature of a duplex of the first and second hybridizing regions and the melting temperature of a duplex of the third and fourth hybridizing regions may be in thermodynamic equilibrium with the temperature at which the rolling circle amplification product is generated (e.g., an RCA reaction temperature such as between about 15° C. and about 45° C.). In some embodiments, the complementary sequences of the first and/or second hybridizing regions may hybridize to the complementary sequences of the third and/or fourth hybridizing regions. Alternatively, in some embodiments, the complementary sequences of the first and second hybridizing regions may not hybridize to the complementary sequences of the third and fourth hybridizing regions.

In some embodiments, a probe disclosed herein is amplified through rolling circle amplification (RCA) to generate a rolling circle amplification product (RCP). In some embodiments, the RCP comprises multiple copies of a hybridizing region from a probe disclosed herein. In some embodiments, the method comprises using a circular or circularizable construct hybridized to the nucleic acid of interest to generate a circular nucleic acid. In some embodiments, the RCA comprises a linear RCA. In some embodiments, the RCA comprises a branched RCA. In some embodiments, the RCA comprises a dendritic RCA. In some embodiments, the RCA comprises any combination of the foregoing. In some embodiments, the circular nucleic acid is a construct formed using ligation. In some embodiments, the circular construct is formed using template primer extension followed by ligation. In some embodiments, the circular construct is formed by providing an insert between ends to be ligated. In some embodiments, the circular construct is formed using a combination of any of the foregoing. In some embodiments, the ligation is a DNA-DNA templated ligation. In some embodiments, the ligation is an RNA-RNA templated ligation. Exemplary RNA-templated ligation probes and methods are described in US 2020/0224244 which is incorporated herein by reference in its entirety. In some embodiments, the ligation is a RNA-DNA templated ligation. In some embodiments, a splint is provided as a template for ligation.

Figure 3:
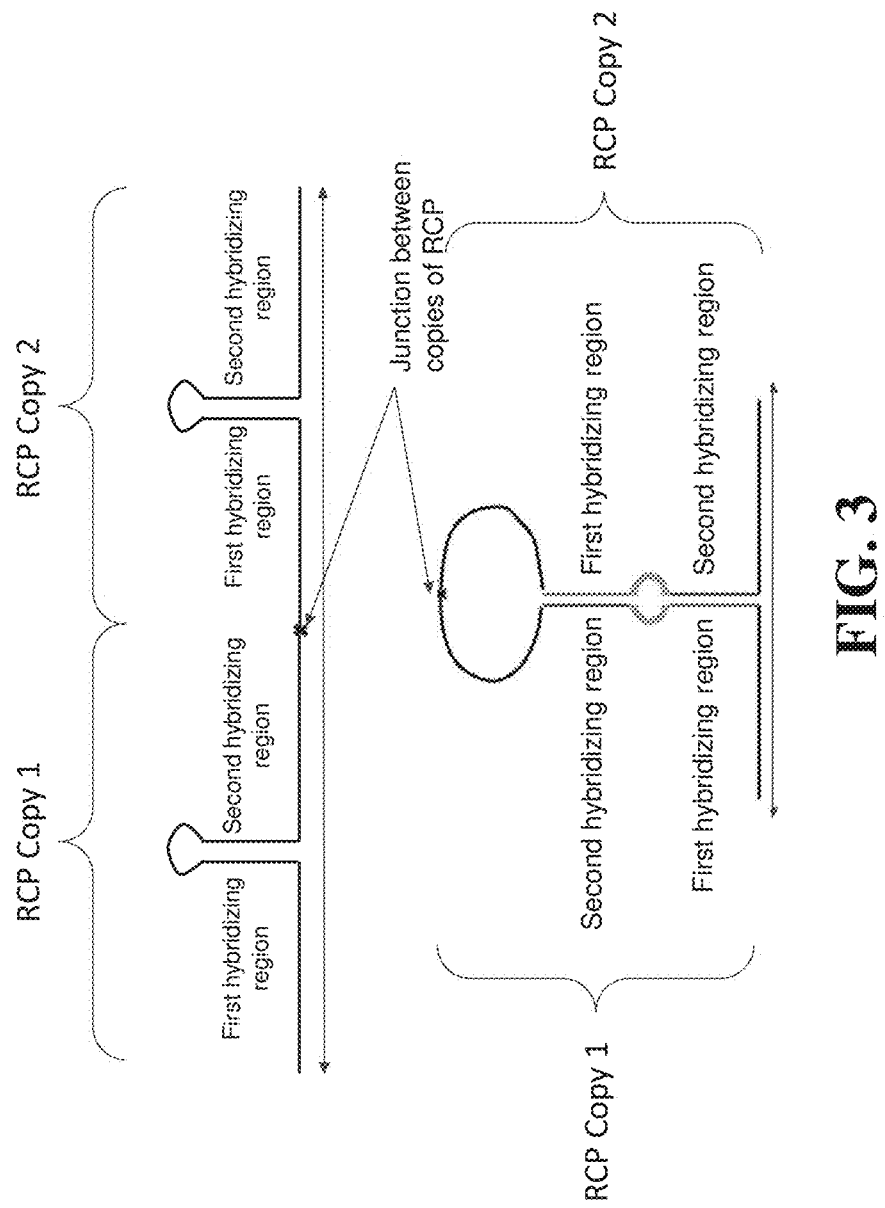
FIG. 3 shows exemplary configurations of the hybridization of hybridizing regions in an RCP.

In some aspects, the melting temperature of a duplex of hybridizing regions determines whether a first copy of a first hybridizing region hybridizes with a first copy of a second hybridizing region, or a second copy of a second hybridizing region. In some embodiments, the hybridization a first copy of a first hybridizing region hybridizes with a first copy of a second hybridizing region creates relatively ordered tandem repeats (e.g., hairpin hybridization structures) of RCA occurs at a temperature below the melting temperature of hybridization of a first hybridizing region with a second hybridizing region (FIG. 3, top panel). In some embodiments, the relatively ordered tandem repeats allow for RCP compaction.

In some embodiments, the melting temperature of a duplex of hybridizing regions is in thermodynamic equilibrium with the temperature at which the RCP is generated (FIG. 3, bottom panel). In some embodiments, although the melting temperature of a duplex of hybridizing regions is in thermodynamic equilibrium with the temperature at which the RCP is generated, relatively ordered tandem repeats (e.g., hairpin hybridization structures) still form in the RCP. In some embodiments wherein the melting temperature of a duplex of hybridizing regions is in thermodynamic equilibrium with the temperature at which the RCP is generated, inter-copy hybridization occurs between hybridizing region copies. For example, in some embodiments, a first copy of a first hybridizing region hybridizes with a second copy of a second hybridizing region (e.g., inter-copy hybridization). In some embodiments, the inter-copy hybridization further compacts the RCP, as it reduces the contour length of the RCP.

In some embodiments, the melting temperature of a duplex of a third and fourth hybridizing region is in thermodynamic equilibrium with the temperature at which the RCP is generated. In some embodiments, the melting temperature of a duplex of a third and fourth hybridizing region is in thermodynamic equilibrium with the temperature at which the RCP is generated. In some embodiments, the melting temperature of both a duplex of a first and second hybridizing region and a duplex of a third and fourth hybridizing region are in thermodynamic equilibrium with the temperature at which the RCP is generated.

In some embodiments, the melting temperature of the duplex is between about 15° C. and about 45° C., such as between any of about 25° C. and about 35° C., about 30° C. and about 40° C., or about 35° C. and about 45° C. In some embodiments, the melting temperature at which the RCP is generated is between about 15° C. and about 45° C., such as between any of about 25° C. and about 35° C., about 30° C. and about 40° C., or about 35° C. and about 45° C. In some embodiments, the melting temperature of the is about 30° C., and the rolling circle amplification product is generated at about 30° C. In some embodiments, the melting temperature of the duplex is identical to that of the melting temperature at which the RCP is generated. In some embodiments, the melting temperature of the duplex is about 10° C. above, or about 10° C. below, that of the melting temperature at which the RCP is generated.

In some embodiments, a probe disclosed herein (e.g., a padlock probe) can comprise a 5' flap which may be recognized by a structure-specific cleavage enzyme, e.g. an enzyme capable of recognizing the junction between single-stranded 5' overhang and a DNA duplex, and cleaving the single-stranded overhang. It will be understood that the branched three-strand structure which is the substrate for the structure-specific cleavage enzyme may be formed by 5' end of one probe part and the 3' end of another probe part when both have hybridized to the target nucleic acid molecule, as well as by the 5' and 3' ends of a one-part probe. Enzymes suitable for such cleavage include Flap endonucleases (FENS), which are a class of enzymes having endonucleolytic activity and being capable of catalyzing the hydrolytic cleavage of the phosphodiester bond at the junction of single- and double-stranded DNA. Thus, in some embodiment, cleavage of the additional sequence 5' to the first target-specific binding site is performed by a structure-specific cleavage enzyme, e.g. a Flap endonuclease. Suitable Flap endonucleases are described in Ma et al. 2000. *JBC* 275, 24693-24700 and in US 2020/0224244 and may include *P. furiosus* (Pfu), *A. fulgidus* (Afu), *M. jannaschii* (Mja) or *M. thermoautotrophicum* (Mth). In other embodiments an enzyme capable of recognizing and degrading a single-stranded oligonucleotide having a free 5' end may be used to cleave an additional sequence (5' flap) from a structure as described above. Thus, an enzyme having 5' nuclease activity may be used to cleave a 5' additional sequence. Such 5' nuclease activity may be 5' exonuclease and/or 5' endonuclease activity. A 5' nuclease enzyme is capable of recognizing a free 5' end of a single-stranded oligonucleotide and degrading said single-stranded oligonucleotide. A 5' exonuclease degrades a single-stranded oligonucleotide having a free 5' end by degrading the oligonucleotide into constituent mononucleotides from its 5' end. A 5' endonuclease activity may cleave the 5' flap sequence internally at one or more nucleotides. Further, a 5' nuclease activity may take place by the enzyme traversing the single-stranded oligonucleotide to a region of duplex once it has recognized the free 5' end, and cleaving the single-stranded region into larger constituent nucleotides (e.g. dinucleotides or trinucleotides), or cleaving the entire 5' single-stranded region, e.g. as described in Lyamichev et al. 1999. PNAS 96, 6143-6148 for Taq DNA polymerase and the 5' nuclease thereof. Preferred enzymes having 5' nuclease activity include Exonuclease VIII, or a native or recombinant DNA polymerase enzyme from *Thermus aquaticus* (Taq), *Thermus thermophilus* or *Thermus flavus*, or the nuclease domain therefrom.

Following formation of the circular nucleic acid, in some instances, an amplification primer is added. In other instances, the amplification primer is added with the primary and/or secondary probes. In some instances, the amplification primer may also be complementary to the target nucleic acid and the padlock probe (e.g., a SNAIL probe). In some embodiments, a washing step is performed to remove any unbound probes, primers, etc. In some embodiments, the wash is a stringency wash. Washing steps can be performed at any point during the process to remove non-specifically bound probes, probes that have ligated, etc.

In some instances, upon addition of a DNA polymerase in the presence of appropriate dNTP precursors and other cofactors, the amplification primer is elongated by replication of multiple copies of the template. The amplification step can utilize isothermal amplification or non-isothermal amplification. In some embodiments, after the formation of the hybridization complex and any subsequent circularization (such as ligation of, e.g., a padlock probe) the circular probe is rolling-circle amplified to generate an RCPRCP containing multiple copies of the circular.

Suitable examples of DNA polymerases that can be used include, but are not limited to: *E. coli* DNA polymerase I, Bsu DNA polymerase, Bst DNA polymerase, Taq DNA polymerase, VENT™ DNA polymerase, DEEPVENT™ DNA polymerase, LongAmp® Taq DNA polymerase, LongAmp® Hot Start Taq DNA polymerase, Crimson LongAmp® Taq DNA polymerase, Crimson Taq DNA polymerase, OneTaq® DNA polymerase, OneTaq® Quick- Load® DNA polymerase, Hemo KlenTaq® DNA polymerase, REDTaq® DNA polymerase, Phusion® DNA polymerase, Phusion® High-Fidelity DNA polymerase, Platinum Pfx DNA polymerase, AccuPrime Pfx DNA polymerase, Phi29 DNA polymerase, Klenow fragment, Pwo DNA polymerase, Pfu DNA polymerase, T4 DNA polymerase and T7 DNA polymerase enzymes.

In some embodiments, rolling circle amplification products are generated using a polymerase selected from the group consisting of Phi29 DNA polymerase, Phi29-like DNA polymerase, M2 DNA polymerase, B103 DNA polymerase, GA-1 DNA polymerase, phi-PRD1 polymerase, Vent DNA polymerase, Deep Vent DNA polymerase, Vent (exo-) DNA polymerase, KlenTaq DNA polymerase, DNA polymerase I, Klenow fragment of DNA polymerase I, DNA polymerase III, T3 DNA polymerase, T4 DNA polymerase, T5 DNA polymerase, T7 DNA polymerase, Bst polymerase, rBST DNA polymerase, N29 DNA polymerase, TopoTaq DNA polymerase, T7 RNA polymerase, SP6 RNA polymerase, T3 RNA polymerase, and a variant or derivative thereof.

In some embodiments, a padlock probe or a probe set that comprises a padlock probe contains one or more barcodes. In some embodiments, the barcodes are bound by detectable probes, which may but do not need to be detectably labeled. In some embodiments, one or more decoding schemes are used to decode the signals, such as fluorescence, for sequence determination. Exemplary decoding schemes are described in Eng et al., "Transcriptome-scale Super-Resolved Imaging in Tissues by RNA SeqFISH+," *Nature* 568(7751):235-239 (2019); Chen et al., "Spatially resolved, highly multiplexed RNA profiling in single cells," *Science;* 348(6233):aaa6090 (2015); U.S. Pat. No. 10,457,980 B2; US 2016/0369329 A1; WO 2018/026873 A1; US2020/0080139 A1; US20210017587 A1; and US 2017/0220733 A1, all of which are incorporated by reference in their entirety. In some embodiments, these assays enable signal amplification, combinatorial decoding, and error correction schemes at the same time.

In some embodiments, the RCP generated from a rolling circle amplification technique described herein comprises multiple copies of a hybridizing region (e.g., a first hybridizing region, a second hybridizing region, a third hybridizing region, and/or a fourth hybridizing region). In some embodiments, the RCP comprises multiple copies of a first hybridizing region and a second hybridizing region. In some embodiments, the RCP further comprises multiple copies of a third and fourth hybridizing region, in addition to multiple copies of a first hybridizing region and a second hybridizing region. In some embodiments, a first and second copy of a hybridizing region are adjacent to each other. In some embodiments, the first and second copy are immediately adjacent to each other. In some embodiments, the first and second copies are separated by 0, 1, 2, 5, 10, 20, 50, 100, or more copies of the hybridizing region in the rolling circle amplification product.

In some embodiments, the rolling circle amplification generates a plurality of compacted RCPs comprising multiple copies of a hybridizing region. In some embodiments, the compacted RCP has a diameter of between about 0.1 µm and about 3 µm, e.g., between about 0.1 µm and about 0.5 µm (e.g., between about 0.2 µm and about 0.3 µm, or between about 0.3 µm and about 0.4 µm), between about 0.5 µm and about 1 µm, between about 0.8 µm and about 1.3 µm, or between about 1 µm and about 1.5 µm. In some embodiments, the compacted RCP is between about 1 and about 15 kilobases, between about 15 and about 25 kilobases, between about 25 and about 35 kilobases, between about 35 and about 45 kilobases, between about 45 and about 55 kilobases, between about 55 and about 65 kilobases, between about 65 and about 75 kilobases, or more than 75 kilobases in length, e.g., between about 45 and about 70 kilobases. In some embodiments, the compacted RCP comprises between about 10 and about 100, between about 100 and about 1,000, between about 1,000 and about 5,000, between about 5,000 and about 10,000, or more than 10,000 copies of a hybridizing region (e.g., a first and a second hybridizing region).

Following amplification, the sequence of the amplicon (e.g., RCP) or a portion thereof, is determined or otherwise analyzed, for example by using detectably labeled probes and imaging. The sequencing or analysis of the amplification products can comprise sequencing by hybridization, sequencing by ligation, and/or fluorescent in situ sequencing, and/or wherein the in situ hybridization comprises sequential fluorescent in situ hybridization. In some instances, a sequence of the RCP is detected using, e.g., the secondary and higher order probes and detection oligonucleotides described herein.

B. Compositions and Methods for RCP Compaction and/or Stabilization

Compaction of RCPs without the introduction of exogenously added oligonucleotide probes in situ may provide a number of advantages. For instance, exogenously added oligonucleotide compaction probes may be stripped away along with detection probes following rounds of in situ hybridization and target detection. Therefore, strategies for persistent compaction of RCPs that are resistant to stripping are needed. In some aspects, compaction of RCPs by hybridization of hybridizing regions within the RCP results in compacted RCPs that enhance RCP detection, as reduction in size results in local concentration of the detection probes to increase signal intensity. In some embodiments, compaction also creates RCPs with increase stability and increased resolution of RCPs into discrete puncta, e.g., in a biological sample in situ.

In some aspects, provided herein is a method for analysing a biological sample comprising contacting a biological sample with a circular probe or circularizable probe or probe set that hybridizes to a target nucleic acid in the biological sample. In some embodiments, the circular probe or circularizable probe or probe set comprises a first hybridizing region and a second hybridizing region capable of hybridizing to each other. In some embodiments, the first hybridizing region and second hybridizing region are complementary to each other. In some embodiments, the first hybridizing region and the second hybridizing region are palindromic sequences. In some embodiments, the first hybridizing region and the second hybridizing region are linked by a loop region. In some embodiments, the method further comprises generating a rolling circle amplification product (RCP) in situ in the biological sample using the circular probe or a circularized probe generated from the circularizable probe or probe set as a template. In some embodiments, the melting temperature of the duplex is between about 15° C. and about 45° C., and the melting temperature at which the RCP is generated is between about 15° C. and about 45° C. In some embodiments, the RCP comprises multiple copies of complementary sequences of the first and second hybridizing regions. In some embodiments, the RCP comprises about 1, 2, 5, 10, 20, 50 or 100, or more copies of the first and second hybridizing region. In some embodiments, the complementary sequences of the first and second hybridizing regions from different copies hybridize to one another. In some embodiments, the hybridization of the first and second hybridizing regions from different copies compact the RCP in situ in the biological sample.

In some embodiments, in the RCP, the complementary sequence of the first hybridizing region of a first copy hybridizes to the complementary sequence of the second hybridizing region of a second copy. In some embodiments, in the RCP, the complementary sequence of the second hybridizing region of the first copy hybridizes to the complementary sequence of the first hybridizing region of the second copy. In some embodiments, in the RCP, the complementary sequence of the first hybridizing region of a first copy hybridizes to the complementary sequence of the second hybridizing region of a second copy and the complementary sequence of the second hybridizing region of the first copy hybridizes to the complementary sequence of the first hybridizing region of the second copy.

In some embodiments, the first and second copies of a hybridizing region are adjacent to each other. In some embodiments, the first and second copies are immediately adjacent to each other. In some embodiments, the first and second copies are separated by 0, 1, 2, 5, 10, 20, 50, 100, or more copies of the hybridizing region in the rolling circle amplification product.

In some aspects, provided herein is a method for analysing a biological sample comprising contacting a biological sample with a circular probe or circularizable probe or probe set that hybridizes to a target nucleic acid in the biological sample. In some embodiments, the circular probe or circularizable probe or probe set comprises a first hybridizing region and a second hybridizing region capable of hybridizing to each other, and a third hybridizing region and a fourth hybridizing region capable of hybridizing to each other. In some embodiments, the first and second hybridizing regions are different in sequence from the third and fourth hybridizing regions, respectively. In some embodiments, the first and second hybridizing regions do not hybridize to the third or fourth hybridizing region. In some embodiments, the first and second hybridizing regions are the same in sequence as the third and fourth hybridizing regions, respectively. In some embodiments, the first hybridizing region and the second hybridizing region are linked by a loop region, and the third hybridizing region and the fourth hybridizing region are linked by a loop region. In some embodiments, the method further comprises generating a rolling circle amplification product (RCP) in situ in the biological sample using the circular probe or a circularized probe generated from the circularizable probe or probe set as a template. In some embodiments, the melting temperature of the duplex is between about 15° C. and about 45° C., and the melting temperature at which the RCP is generated is between about 15° C. and about 45° C. In some embodiments, the RCP comprises multiple copies of complementary sequences of the first, second, third, and fourth hybridizing regions. In some embodiments, the RCP comprises about 1, 2, 5, 10, 20, 50 or 100, or more copies of the hybridizing regions. In some embodiments, the complementary sequences of the first and second hybridizing regions from different copies hybridize to one another. In some embodiments, the hybridization of the first and second hybridizing regions from different copies compact the RCP in situ in the biological sample. In some embodiments, the complementary sequences of the third and fourth hybridizing regions from different copies hybridize to one another. In some embodiments, the hybridization of the third and fourth hybridizing regions from different copies compact the RCP in situ in the biological sample.

Figure 2A:
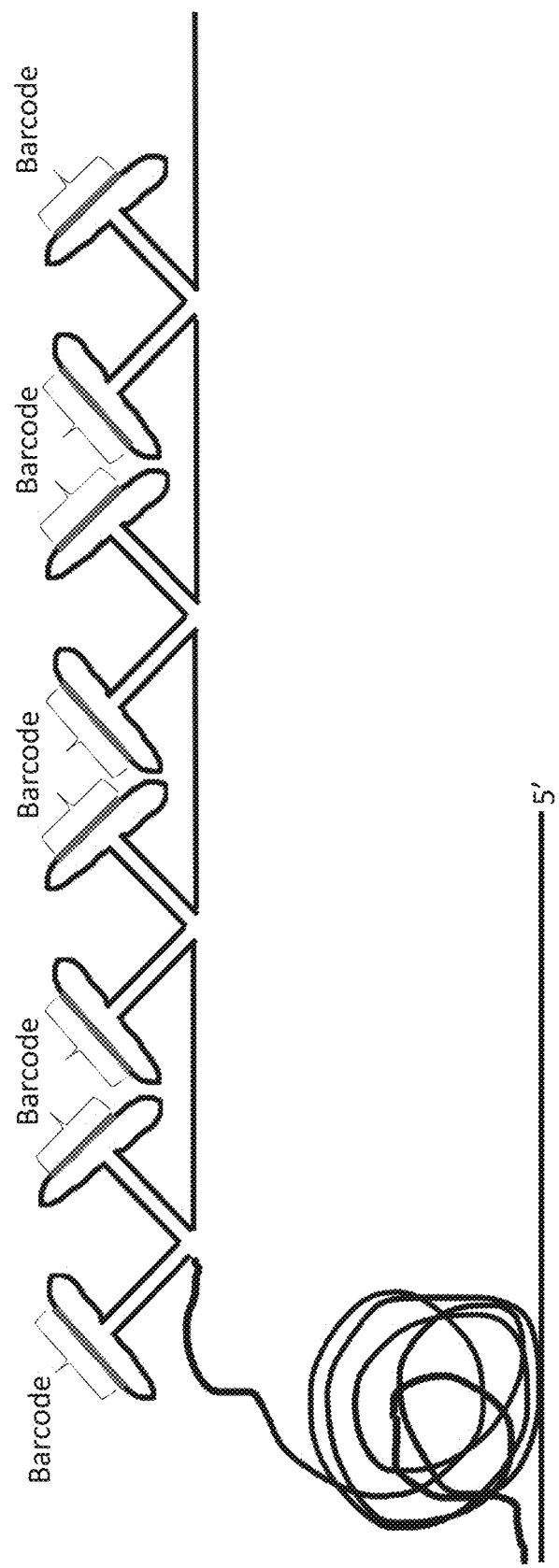
FIGS. 2A-2C illustrate exemplary conformations of RCP comprising complementary hybridizing regions.

FIG. 2A shows an exemplary conformation of the RCP generated following the circularization of the probe illustrated in FIG. 1C. In some embodiments, the complementary sequence of a first copy of a first hybridizing region hybridizes to the complementary sequence of the first copy of the second hybridizing region. When the melting temperature of hybridization of a first hybridizing region with a second hybridizing region is not in equilibrium with that of the amplification temperature for rolling circle amplification (RCA) (e.g., the RCA reaction temperature may be lower than the melting temperature), hairpin formation between complementary hybridizing region sequences in the same copy can be favored.

In some embodiments, the complementary sequence of the first hybridizing region of a first copy of the probe sequence hybridizes to the complementary sequence of the second hybridizing region of the same copy, and the complementary sequence of the third hybridizing region of the first copy of the probe sequence hybridizes to the fourth hybridizing region of the same copy. In some embodiments, the first and second hybridizing regions and the third and fourth hybridizing regions are linked by a loop region, wherein the loop region optionally comprises one or more barcode sequences. In some embodiments, the loop region is no more than 5, no more than 10, no more than 15, no more than 20, no more than 25, or no more than 30 nucleotides in length. In some embodiments the melting temperature of the duplex of the first and second hybridizing regions and the third and fourth hybridizing regions is in thermodynamic equilibrium with the temperature at which the RCP is generated. In some embodiments, the hybridizing regions are designed such that the melting temperature of hybridization of a first hybridizing region with a second hybridizing region is not in equilibrium with that of the amplification temperature for RCA, thereby favoring a hairpin hybridization conformation. In some embodiments, hybridization of the hybridizing regions of the probe sequence facilitates compaction of the RCP.

Figures 2B, 2C:
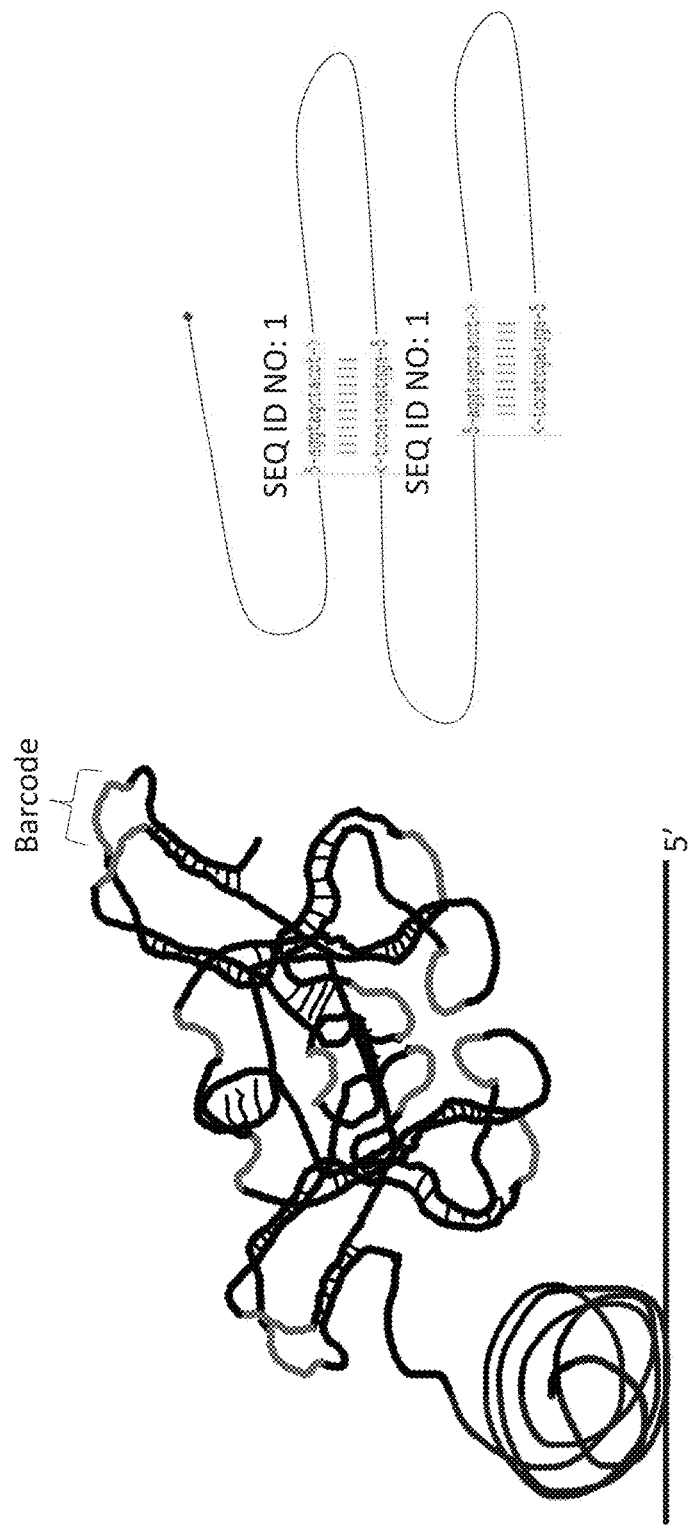

FIG. 2B shows another exemplary conformation of the RCP generated following the circularization and amplification of the probe illustrated in FIG. 1C. In some embodiments, the hybridizing regions are designed such that the melting temperature of hybridization of a first hybridizing region with a second hybridizing region is in equilibrium with that of the amplification temperature for RCA to allow for inter-copy hybridization. The complementary sequence of a first copy of a first hybridizing region hybridizes to the complementary sequence of a second copy of the second hybridizing region, thereby further compacting the RCP. The first and second copies may be adjacent or separated by any number of copies.

In some embodiments, the complementary sequence of the first hybridizing region of a first copy of the probe sequence hybridizes to the complementary sequence of the second hybridizing region of a second copy of the probe sequence, the complementary sequence of the second hybridizing region of the first copy of the probe sequence hybridizes to the complementary sequence of the first hybridizing region of the second copy of the probe sequence, the complementary sequence of the third hybridizing region of the first copy of the probe sequence hybridizes to the complementary sequence of the fourth hybridizing region of the second copy of the probe sequence, and the complementary sequence of the fourth hybridizing region of the first copy of the probe sequence hybridizes to the complementary sequence of the third hybridizing region of the second copy of the probe sequence. In some embodiments, the complementary sequence of the first and second hybridizing regions and the third and fourth hybridizing regions of the first copy of the probe sequence hybridizes to a second copy of the probe sequence. In some embodiments, the complementary sequence of the first and second hybridizing regions of the first copy of the probe sequence hybridizes to a second copy of the probe sequence, and the complementary sequences of the third and fourth hybridizing regions of the first copy of the probe sequence hybridize to a third copy of the probe sequence. In some embodiments, the first and second copies of the probe sequence are adjacent to each other. In some embodiments, the first and second copies of the probe sequence are separated by 1, 2, 5, 10, 20, 50, 100, or more copies in the rolling circle amplification product. In some embodiments, the first and second hybridizing regions and the third and fourth hybridizing regions are linked by a loop region, wherein the loop region optionally comprises one or more barcode sequences. In some embodiments, the loop region is no more than 5, no more than 10, no more than 15, no more than 20, no more than 25, or no more than 30 nucleotides in length. In some embodiments, the melting temperature of the duplex of the first and second hybridizing regions and the third and fourth hybridizing regions is in thermodynamic equilibrium with the temperature at which the rolling circle amplification product is generated. In some embodiments, the hybridizing regions are designed such that the $T_m$ of hybridization of the first hybridizing region with a second hybridizing region is in equilibrium with that of the amplification temperature for rolling circle amplification to allow for inter-copy hybridization of hybridizing regions. In some embodiments, hybridization of the hybridizing regions of different copies of the probe sequence facilitates compaction of the rolling circle product. In some embodiment, hybridization of the hybridizing regions of the different copies of the probe sequence also stabilizes the rolling circle product conformation.

In some aspects, provided herein is a method for analyzing a biological sample, comprising: (a) contacting the biological sample with a padlock probe comprising a sequence that hybridizes to a target nucleic acid in the biological sample, wherein the padlock probe comprises: (i) a first hybridizing region and a second hybridizing region capable of hybridizing to each other, wherein the first and second hybridizing regions are linked by a loop region; and (iii) one or more barcode sequences; and (b) generating a rolling circle amplification product in situ in the biological sample using a circularized padlock probe as a template, wherein the padlock probe is circularized to generate the circularized padlock probe using the target nucleic acid and/or a splint as template, wherein the rolling circle amplification product comprises multiple copies of a unit sequence comprising complementary sequences of the first and second hybridizing regions, and wherein the complementary sequence of the first hybridizing region from a first copy hybridize to the complementary sequence of the second hybridizing region from a second copy, and the complementary sequence of the second hybridizing region from the first copy hybridize to the complementary sequence of the first hybridizing region from the second copy, thereby compacting and/or stabilizing the rolling circle amplification product in situ in the biological sample.

FIG. 3 shows two exemplary conformations of the RCP generated following the circularization and amplification of the probe illustrated in FIG. 1A. The top schematic illustrates one exemplary hybridization configuration of the hybridizing regions in a hairpin hybridization state. The complementary sequence of the first hybridizing region of the first copy hybridizes to the complementary sequence of the second hybridizing region of the same copy, and the complementary sequence of the first hybridizing region of the second copy of the RCP hybridizes to the complementary sequence of the second hybridizing region of the same copy. The first and second hybridizing regions of the first and second copies are linked by a loop region. In some embodiments, the loop region optionally comprises one or more barcode sequences. The bottom schematic illustrates a second exemplary hybridization configuration of the hybridizing regions in an inter-copy loop state. The complementary sequence of the first hybridizing region of a first copy hybridizes to the complementary sequence of the second hybridizing region of a second copy, and the complementary sequence of the first copy hybridizes to the complementary sequence of the first hybridizing region of the second copy. The second configuration wherein the first and second hybridizing regions from different copies hybridize to one another results in greater compaction of the RCP. In some embodiments, as shown in the top schematic, the complementary sequence of the first hybridizing region of a first copy of the probe sequence hybridizes to the complementary sequence of the second hybridizing region of the first copy, and the complementary sequence of the first hybridizing region of a second copy of the probe sequence hybridizes to the complementary sequence of the second hybridizing region of the second copy, resulting in a hairpin hybridization structure (e.g., exemplified in FIG. 4A). In some embodiments, the first and second hybridizing regions are linked by a loop region, wherein the loop region optionally comprises one or more barcode sequences. In some embodiments, the loop region is no more than 5, no more than 10, no more than 15, no more than 20, no more than 25, or no more than 30 nucleotides in length. In some embodiments, as shown in the bottom schematic of FIG. 3, the complementary sequence of the first hybridizing region of a first copy of the probe sequence hybridizes to the complementary sequence of the second hybridizing region of a second copy of the probe sequence, and the complementary sequence of the second hybridizing region of the first copy of the probe sequence hybridizes to the complementary sequence of the first hybridizing region of the second copy of the probe, resulting in an inter-copy loop state. In some embodiments, the first and second copies of the probe sequence are adjacent to each other. In some embodiments, the first and second copies of the probe sequence are separated by 1, 2, 5, 10, 20, 50, 100, or more copies in the rolling circle amplification product. In some embodiments, the first and second hybridizing regions and the third and fourth hybridizing regions are linked by a loop region, wherein the loop region optionally comprises one or more barcode sequences. In some embodiments, the loop region is no more than 5, no more than 10, no more than 15, no more than 20, no more than 25, or no more than 30 nucleotides in length In some embodiments, the melting temperature of the duplex of the first and second hybridizing regions and the third and fourth hybridizing regions is in thermodynamic equilibrium with the temperature at which the rolling circle amplification product is generated. In some embodiments, hybridization of the hybridizing regions of different copies of the probe sequence facilitates compaction of the rolling circle product.

In some embodiments, the first and second copies can be adjacent copies of the unit sequence in the rolling circle amplification product (e.g., as shown in FIG. 3). Alternatively, in some embodiments, the first and second copies may be separated by one or more copies of the unit sequence in the rolling circle amplification product.

In some embodiments, hybridization between sequences in different copies of the unit sequence may be favored over hybridization between sequences in the same copy of the unit sequence. In some embodiments, the melting temperature of a duplex comprising (i) the complementary sequence of the first hybridizing region from the first copy hybridized to the complementary sequence of the second hybridizing region from the second copy and (ii) the complementary sequence of the second hybridizing region from the first copy hybridized to the complementary sequence of the first hybridizing region from the second copy can be higher than: (a) the melting temperature of a duplex comprising the complementary sequence of the first hybridizing region from the first copy hybridized to the complementary sequence of the second hybridizing region from the first copy, and/or (b) the melting temperature of a duplex comprising the complementary sequence of the first hybridizing region from the second copy hybridized to the complementary sequence of the second hybridizing region from the second copy. In such embodiments, the more compact conformation shown in FIG. 3 (lower panel) is favored over the extended conformation shown in FIG. 3 (upper panel) to promote compaction and/or stabilization of the concatemer.

Figures 4A, 4B:
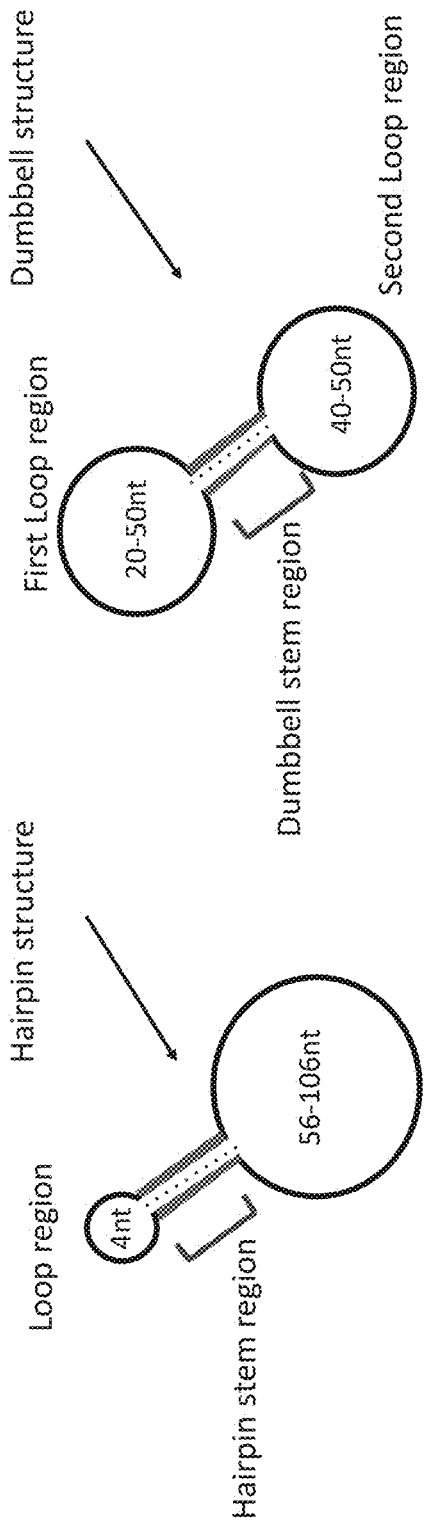
FIG. 4A depicts an exemplary circularized probe with a hairpin stem region.
FIG. 4B depicts an exemplary circularized probe with a dumbbell stem region.

FIG. 4A shows a circularized form of the circularizable probe illustrated in FIG. 1A, comprising a hairpin secondary structure, to be used in RCA. The circularized probe structure comprises a hairpin stem region and a loop. The hairpin stem region (e.g., hybridization region between a first and second hybridizing region on the circularized probe) may vary in length. The hairpin loop may be 4 nucleotides or more in length. The probe may further comprise one or more barcode sequences that can be used to identify the target nucleic acid during downstream analyses, one or more primer binding sequences (e.g., for RCA) and/or one or more anchor sequences. In some embodiments, the loop linking the first and second hybridizing regions on the probe can be about 4 nucleotides in length. The probe structure comprises a large (e.g., 56 to 106 nucleotide) nucleotide loop and the hairpin hybridization regions (e.g., between a first and second hybridizing region on the circularized probe), are depicted in yellow (FIG. 4A). In some embodiments, the hybridizing regions that form the hairpin hybridization structure have complementary sequences that hybridize to each other to form the stem of the hairpin. In FIG. 4A, the hairpin structure comprises a four nucleotide loop. In some embodiments, the stem of the hairpin is about 30 nucleotides in length. The circularized probe illustrated in FIG. 4A also comprises a barcode region, depicted in orange. In some embodiments, the circularizable probe also comprises a binding region (e.g., an anchor sequence) which can be used to detect the RCP during downstream analyses (e.g., assays descried in FIGS. 5-6), e.g., using Cy3-labeled probes that bind to the RCPs or intermediate probes that bind to the RCPs.

FIG. 4B shows a second circularized form of a circularizable probe illustrated in FIG. 1A, comprising dumbbell secondary structure, to be used in RCA. The circularized probe structure comprises two loops, the first between 20 and 50 nucleotides in length, and the second between 40 and 50 nucleotides in length. The dumbbell stem region (e.g., hybridization region between a first and second hybridizing region on the circularized probe) varies in length. The probe may further comprise one or more barcode sequences that can be used to identify the target nucleic acid during downstream analyses, one or more primer binding sequences (e.g., for RCA) and/or one or more anchor sequences. In some embodiments, the loop linking the first and second hybridizing regions on the probe can be about 20 to about 50 nucleotides in length. In some embodiments, the loop linking the first and second hybridizing regions in the dumbbell structure is larger than that of the hairpin structure. In some embodiments, the probe structure comprises a first loop that is between 20 and 50 nucleotides in length and a second loop that is between 40 and 50 nucleotides in length when circularized (FIG. 4B). The two loops are separated by dumbbell hybridizing regions (e.g., between a first and second hybridizing region on the circularized probe), shown in FIG. 4B, which have complementary sequences that hybridize to each other to form the stem of the dumbbell. In some embodiments, the length of the stem of the dumbbell is 10 nucleotides in length. The circularizable probe also comprises a barcode region, depicted in orange (FIG. 4B). In some embodiments, the circularizable probe also comprises a binding region (e.g., an anchor sequence) which can be used to detect the RCP during downstream analyses (e.g., assays descried in FIGS. 5-6), e.g., using Cy3-labeled probes that bind to the RCPs or intermediate probes that bind to the RCPs.

In some aspects, the methods provided herein further comprise embedding and/or immobilizing a sample (e.g., a biological sample) in a hydrogel matrix. In some embodiments, the nucleic acid concatemer (e.g., RCPs) generated by any of the methods described herein are embedded in a hydrogel matrix. Methods for embedding a sample in a matrix have been described in, e.g., US2016/0024555, US2019/0276881, US2020/0071751, WO2020/0076976, WO2020/0076979, and WO2020/0096687, which are incorporated herein by reference in their entirety. In some embodiments, the hydrogel comprises a three dimensional matrix. For example, the matrix may be a three dimensional nucleic acid-containing polymer. In some embodiments, the polymer is a gel or a hydrogel. In some embodiments, the nucleic acids described herein (e.g., oligonucleotide probes) may be bound a hydrogel matrix to stabilize a nucleic acid concatemer.

In some embodiments, the matrix may encapsulate a biological sample, such as a tissue sample. In some embodiments, the sample is embedded or immobilized, partially or completely, in the matrix. In some embodiments, the matrix comprises polyacrylamide, cellulose, alginate, polyamide, cross-linked agarose, cross-linked dextran or cross-linked polyethylene glycol. In some embodiments, the matrix comprises any suitable polymerizing and/or crosslinking material known in the art. In some embodiments, polymerization initiators and/or crosslinkers may be present. In some embodiments, the matrix is porous, such that exogenous reagents and/or oligonucleotide probes may be introduced to the matrix.

In some aspects, the oligonucleotide probe bound to the three dimensional matrix comprises naturally or non-naturally occurring nucleic acids (e.g., synthetic or modified nucleic acids). In some embodiments, the oligonucleotide probe is modified to incorporate a functional moiety for attachment to the matrix (such as, by covalent cross-linking or non-covalent binding). In some embodiments, the functional moiety is bound to the oligonucleotide probe at the 3' end of the probe. In some embodiments, the functional moiety is bound to the oligonucleotide probe at the 5' end of the probe. In some embodiments, the functional moiety is cross-linked to a modified nucleic acid (e.g., dNTp or dUTP)

on the oligonucleotide probe. In some embodiments, the cross-linker reactive group is any suitable reactive group known in the art.

In some embodiments, the matrix is modified to incorporate a functional moiety for attachment to the oligonucleotide probe. In some embodiments, the functional moiety of the oligonucleotide probe is attached (e.g., by covalent cross-linking or non-covalent binding) to the matrix via the functional group of the matrix. In some embodiments, the cross-linkers further include a spacer for attachment to the matrix. In some embodiments, the spacer comprises polyethylene glycol, carbon spacers, and/or photo-cleavable spacers.

The functional moiety of the oligonucleotide probe and/or the matrix may comprise a ligand. In some embodiments, the ligand reacts with a cross-linker or another ligand (e.g., the ligand of the oligonucleotide probe reacts with the ligand of the matrix). In some embodiments, the functional moiety is any of an amine, acrydite, alkyne, biotin, azide, and thiol. In some embodiments, the method comprises embedding an oligonucleotide probe comprising a functional moiety described herein to the matrix. In some embodiments, the functional moiety of the matrix is an alkyne, and the functional moiety of the oligonucleotide probe is an azide.

IV. Detection and Analysis

In some aspects, the provided methods involve analyzing, e.g., detecting or determining, one or more sequences present in the target nucleic acid and/or in the nucleic acid concatemers described herein. In some embodiments, the detecting comprises hybridizing one or more detectably labeled probes to the nucleic acid concatemer, or via hybridization to adaptor probes that hybridize to the nucleic acid concatemer). In some embodiments, the analysis comprises determining the sequence of all or a portion of the nucleic acid concatemer (e.g., a barcode sequence or a complement thereof), wherein the sequence is indicative of a sequence of the target nucleic acid.

In some cases, analysis is performed on one or more images captured, and may comprise processing the image(s) and/or quantifying signals observed. In some embodiments, images of signals from different fluorescent channels and/or detectable probe hybridization cycles can be compared and analyzed. In some embodiments, images of signals (or absence thereof) at a particular location in a sample from different fluorescent channels and/or sequential detectable probe hybridization cycles can be aligned to analyze an analyte at the location. For instance, a particular location in a sample can be tracked and signal spots from sequential probe hybridization (and optionally ligation) cycles can be analyzed to detect a target polynucleotide sequence (e.g., a barcode sequence or subsequence thereof) in a nucleic acid at the location. The analysis may comprise processing information of one or more cell types, one or more types of analytes, a number or level of analyte, and/or a number or level of cells detected in a particular region of the sample. In some embodiments, the analysis comprises detecting a sequence e.g., a barcode sequence present in an amplification product at a location in the sample. In some embodiments, the analysis includes quantification of puncta (e.g., if amplification products are detected). In some cases, the analysis includes determining whether particular cells and/or signals are present that correlate with one or more analytes from a particular panel. In some embodiments, the obtained information may be compared to a positive and negative control, or to a threshold of a feature to determine if the sample exhibits a certain feature or phenotype. In some cases, the information may comprise signals from a cell, a region, and/or comprise readouts from multiple detectable labels. In some case, the analysis further includes displaying the information from the analysis or detection step. In some embodiments, software may be used to automate the processing, analysis, and/or display of data.

Methods for binding and identifying a target nucleic acid that uses various probes or oligonucleotides have been described in, e.g., US2003/0013091, US2007/0166708, US2010/0015607, US2010/0261026, US2010/0262374, US2010/0112710, US2010/0047924, and US2014/0371088, each of which is incorporated herein by reference in its entirety. Detectably-labeled probes can be useful for detecting multiple target nucleic acids and be detected in one or more hybridization cycles (e.g., sequential hybridization in a FISH-type assay, sequencing by hybridization).

In some embodiments, the methods comprise sequencing all or a portion of the nucleic acid concatemer, such as one or more barcode sequences present in the nucleic acid concatemer. In some embodiments, the sequence of the nucleic acid concatemer, or barcode thereof, is indicative of a sequence of the target nucleic acid to which the nucleic acid concatemer is hybridized. In some embodiments, the analysis and/or sequence determination comprises sequencing all or a portion of the nucleic acid concatemer and/or in situ hybridization to the nucleic acid concatemer. In some embodiments, the sequencing step involves sequencing by hybridization, sequencing by ligation, sequencing by synthesis, sequencing by binding, and/or fluorescent in situ sequencing (FISSEQ), hybridization-based in situ sequencing and/or wherein the in situ hybridization comprises sequential fluorescent in situ hybridization. In some embodiments, the analysis and/or sequence determination comprises detecting a polymer generated by a hybridization chain reaction (HCR) reaction, see e.g., US2017/0009278, which is incorporated herein by reference, for exemplary probes and HCR reaction components. In some embodiments, the detection or determination comprises hybridizing to the first overhang a detection oligonucleotide labeled with a fluorophore, an isotope, a mass tag, or a combination thereof. In some embodiments, the detection or determination comprises imaging the probe hybridized to the target nucleic acid (e.g., imaging one or more detectably labeled probes hybridized thereto). In some embodiments, the target nucleic acid is an mRNA in a tissue sample, and the detection or determination is performed when the target nucleic acid and/or the amplification product is in situ in the tissue sample. In some embodiments, the target nucleic acid is an amplification product (e.g., a rolling circle amplification product/nucleic acid concatemer).

In some aspects, the provided methods comprise imaging the probe hybridized to the nucleic acid concatemer, for example, via binding of the secondary probe (e.g., a detection probe) and detecting the detectable label. In some embodiments, the detection probe comprises a detectable label that can be measured and quantitated. The terms "label" and "detectable label" comprise a directly or indirectly detectable moiety that is associated with (e.g., conjugated to) a molecule to be detected, e.g., a secondary probe that is a detectable probe, comprising, but not limited to, fluorophores, radioactive isotopes, fluorescers, chemiluminescers, enzymes, enzyme substrates, enzyme cofactors, enzyme inhibitors, chromophores, dyes, metal ions, metal sols, ligands (e.g., biotin or haptens) and the like.

The term "fluorophore" comprises a substance or a portion thereof that is capable of exhibiting fluorescence in the detectable range. Particular examples of labels that may be used in accordance with the provided embodiments comprise, but are not limited to phycoerythrin, Alexa dyes, fluorescein, YPet, CyPet, Cascade blue, allophycocyanin, Cy3, Cy5, Cy7, rhodamine, dansyl, umbelliferone, Texas red, luminol, acradimum esters, biotin, green fluorescent protein (GFP), enhanced green fluorescent protein (EGFP), yellow fluorescent protein (YFP), enhanced yellow fluorescent protein (EYFP), blue fluorescent protein (BFP), red fluorescent protein (RFP), firefly luciferase, *Renilla* luciferase, NADPH, beta-galactosidase, horseradish peroxidase, glucose oxidase, alkaline phosphatase, chloramphenical acetyl transferase, and urease.

Fluorescence detection in tissue samples can often be hindered by the presence of strong background fluorescence. "Autofluorescence" is the general term used to distinguish background fluorescence (that can arise from a variety of sources, including aldehyde fixation, extracellular matrix components, red blood cells, lipofuscin, and the like) from the desired immunofluorescence from the fluorescently labeled antibodies or probes. Tissue autofluorescence can lead to difficulties in distinguishing the signals due to fluorescent antibodies or probes from the general background. In some embodiments, a method disclosed herein utilizes one or more agents to reduce tissue autofluorescence, for example, Autofluorescence Eliminator (Sigma/EMD Millipore), TrueBlack Lipofuscin Autofluorescence Quencher (Biotium), MaxBlock Autofluorescence Reducing Reagent Kit (MaxVision Biosciences), and/or a very intense black dye (e.g., Sudan Black, or comparable dark chromophore).

In some embodiments, a detectable probe containing a detectable label can be used to detect one or more nucleic acid concatemer(s) described herein. In some embodiments, the methods involve incubating the detectable probe containing the detectable label with the sample, washing unbound detectable probe, and detecting the label, e.g., by imaging. In some embodiments, the nucleic acid concatemer(s) remain crosslinked to the target nucleic acid during the washing and detecting steps.

Examples of detectable labels comprise but are not limited to various radioactive moieties, enzymes, prosthetic groups, fluorescent markers, luminescent markers, bioluminescent markers, metal particles, protein-protein binding pairs and protein-antibody binding pairs. Examples of fluorescent proteins comprise, but are not limited to, yellow fluorescent protein (YFP), green fluorescence protein (GFP), cyan fluorescence protein (CFP), umbelliferone, fluorescein, fluorescein isothiocyanate, rhodamine, dichlorotriazinylamine fluorescein, dansyl chloride and phycoerythrin.

Examples of bioluminescent markers comprise, but are not limited to, luciferase (e.g., bacterial, firefly and click beetle), luciferin, aequorin and the like. Examples of enzyme systems having visually detectable signals comprise, but are not limited to, galactosidases, glucorimidases, phosphatases, peroxidases and cholinesterases. Identifiable markers also comprise, radioactive compounds such as $^{125}$I, $^{35}$S, $^{14}$C, or $^{3}$H. Identifiable markers are commercially available from a variety of sources.

Examples of fluorescent labels and nucleotides and/or polynucleotides conjugated to such fluorescent labels comprise those described in, for example, Hoagland, Handbook of Fluorescent Probes and Research Chemicals, Ninth Edition (Molecular Probes, Inc., Eugene, 2002); Keller and Manak, DNA Probes, 2nd Edition (Stockton Press, New York, 1993); Eckstein, editor, Oligonucleotides and Analogues: A Practical Approach (IRL Press, Oxford, 1991); and Wetmur, Critical Reviews in Biochemistry and Molecular Biology, 26:227-259 (1991). In some embodiments, exemplary techniques and methods methodologies applicable to the provided embodiments comprise those described in, for example, U.S. Pat. Nos. 4,757,141, 5,151,507 and 5,091,519. In some embodiments, one or more fluorescent dyes are used as labels for labeled target sequences, for example, as described in U.S. Pat. No. 5,188,934 (4,7-dichlorofluorescein dyes); U.S. Pat. No. 5,366,860 (spectrally resolvable rhodamine dyes); U.S. Pat. No. 5,847,162 (4,7-dichlororhodamine dyes); U.S. Pat. No. 4,318,846 (ether-substituted fluorescein dyes); U.S. Pat. No. 5,800,996 (energy transfer dyes); U.S. Pat. No. 5,066,580 (xanthine dyes); and U.S. Pat. No. 5,688,648 (energy transfer dyes). Labelling can also be carried out with quantum dots, as described in U.S. Pat. Nos. 6,322,901, 6,576,291, 6,423,551, 6,251,303, 6,319,426, 6,426,513, 6,444,143, 5,990,479, 6,207,392, US 2002/0045045 and US 2003/0017264. As used herein, the term "fluorescent label" comprises a signaling moiety that conveys information through the fluorescent absorption and/or emission properties of one or more molecules. Exemplary fluorescent properties comprise fluorescence intensity, fluorescence lifetime, emission spectrum characteristics and energy transfer.

Examples of commercially available fluorescent nucleotide analogues readily incorporated into nucleotide and/or polynucleotide sequences comprise, but are not limited to, Cy3-dCTP, Cy3-dUTP, Cy5-dCTP, Cy5-dUTP (Amersham Biosciences, Piscataway, N.J.), fluorescein-!2-dUTP, tetramethylrhodamine-6-dUTP, TEXAS RED™-5-dUTP, CASCADE BLUE™-7-dUTP, BODIPY TMFL-14-dUTP, BODIPY TMR-14-dUTP, BODIPY TMTR-14-dUTP, RHOD AMINE GREEN™-5-dUTP, OREGON GREENR™ 488-5-dUTP, TEXAS RED™-12-dUTP, BODIPY™ 630/650-14-dUTP, BODIPY™ 650/665-14-dUTP, ALEXA FLUOR™ 488-5-dUTP, ALEXA FLUOR™ 532-5-dUTP, ALEXA FLUOR™ 568-5-dUTP, ALEXA FLUOR™ 594-5-dUTP, ALEXA FLUOR™ 546-14-dUTP, fluorescein-12-UTP, tetramethylrhodamine-6-UTP, TEXAS RED™-5-UTP, mCherry, CASCADE BLUE™-7-UTP, BODIPY™ FL-14-UTP, BODIPY TMR-14-UTP, BODIPY™ TR-14-UTP, RHOD AMINE GREEN™-5-UTP, ALEXA FLUOR™ 488 UTP, and ALEXA FLUOR™ 546-14-UTP (Molecular Probes, Inc. Eugene, Oreg.). Methods are known for custom synthesis of nucleotides having other fluorophores (See, Henegariu et al. (2000) Nature Biotechnol. 18:345).

Other fluorophores available for post-synthetic attachment comprise, but are not limited to, ALEXA FLUOR™ 350, ALEXA FLUOR™ 532, ALEXA FLUOR™ 546, ALEXA FLUOR™ 568, ALEXA FLUOR™ 594, ALEXA FLUOR™ 647, BODIPY 493/503, BODIPY FL, BODIPY R6G, BODIPY 530/550, BODIPY TMR, BODIPY 558/568, BODIPY 558/568, BODIPY 564/570, BODIPY 576/589, BODIPY 581/591, BODIPY 630/650, BODIPY 650/665, Cascade Blue, Cascade Yellow, Dansyl, lissamine rhodamine B, Marina Blue, Oregon Green 488, Oregon Green 514, Pacific Blue, rhodamine 6G, rhodamine green, rhodamine red, tetramethyl rhodamine, Texas Red (available from Molecular Probes, Inc., Eugene, Oreg.), Cy2, Cy3.5, Cy5.5, and Cy7 (Amersham Biosciences, Piscataway, N.J.). FRET tandem fluorophores may also be used, comprising, but not limited to, PerCP-Cy5.5, PE-Cy5, PE-Cy5.5, PE-Cy7, PE-Texas Red, APC-Cy7, PE-Alexa dyes (610, 647, 680), and APC-Alexa dyes.

In some cases, metallic silver or gold particles may be used to enhance signal from fluorescently labeled nucleotide and/or polynucleotide sequences (Lakowicz et al. (2003) Bio Techniques 34:62).

Biotin, or a derivative thereof, may also be used as a label on a nucleotide and/or a polynucleotide sequence, and subsequently bound by a detectably labeled avidin/streptavidin derivative (e.g., phycoerythrin-conjugated streptavidin), or a detectably labeled anti-biotin antibody. Digoxigenin may be incorporated as a label and subsequently bound by a detectably labeled anti-digoxigenin antibody (e.g., fluoresceinated anti-digoxigenin). An aminoallyl-dUTP residue may be incorporated into a polynucleotide sequence and subsequently coupled to an N-hydroxy succinimide (NHS) derivatized fluorescent dye. In general, any member of a conjugate pair may be incorporated into a detection polynucleotide provided that a detectably labeled conjugate partner can be bound to permit detection. An antibody may comprise an antibody molecule of any class, or any sub-fragment thereof, such as an Fab.

Other suitable labels for a polynucleotide sequence may comprise fluorescein (FAM), digoxigenin, dinitrophenol (DNP), dansyl, biotin, bromodeoxyuridine (BrdU), hexahistidine (6×His), and phosphor-amino acids (e.g., P-tyr, P-ser, P-thr). In some embodiments the following hapten/antibody pairs are used for detection, in which each of the antibodies is derivatized with a detectable label: biotin/a-biotin, digoxigenin/a-digoxigenin, dinitrophenol (DNP)/a-DNP, 5-Carboxyfluorescein (FAM)/a-FAM.

In some embodiments, a nucleotide and/or an oligonucleotide sequence can be indirectly labeled, especially with a hapten that is then bound by a capture agent, e.g., as disclosed in U.S. Pat. Nos. 5,344,757, 5,702,888, 5,354,657, 5,198,537 and 4,849,336, and PCT publication WO 91/17160. Many different hapten-capture agent pairs are available for use. Exemplary haptens comprise, but are not limited to, biotin, des-biotin and other derivatives, dinitrophenol, dansyl, fluorescein, Cy5, and digoxigenin. For biotin, a capture agent may be avidin, streptavidin, or antibodies. Antibodies may be used as capture agents for the other haptens (many dye-antibody pairs being commercially available, e.g., Molecular Probes, Eugene, Oreg.).

In some aspects, the detecting involves using detection methods such as flow cytometry; sequencing; probe binding and electrochemical detection; pH alteration; catalysis induced by enzymes bound to DNA tags; quantum entanglement; Raman spectroscopy; terahertz wave technology; and/or scanning electron microscopy. In some aspects, the flow cytometry is mass cytometry or fluorescence-activated flow cytometry. In some aspects, the detecting comprises performing microscopy, scanning mass spectrometry or other imaging techniques described herein. In such aspects, the detecting comprises determining a signal, e.g., a fluorescent signal.

In some aspects, the detection (comprising imaging) is carried out using any of a number of different types of microscopy, e.g., confocal microscopy, two-photon microscopy, light-field microscopy, intact tissue expansion microscopy, and/or CLARITY™-optimized light sheet microscopy (COLM).

In some embodiments, fluorescence microscopy is used for detection and imaging of the detection probe. In some aspects, a fluorescence microscope is an optical microscope that uses fluorescence and phosphorescence instead of, or in addition to, reflection and absorption to study properties of organic or inorganic substances. In fluorescence microscopy, a sample is illuminated with light of a wavelength which excites fluorescence in the sample. The fluoresced light, which is usually at a longer wavelength than the illumination, is then imaged through a microscope objective. Two filters may be used in this technique; an illumination (or excitation) filter which ensures the illumination is near monochromatic and at the correct wavelength, and a second emission (or barrier) filter which ensures none of the excitation light source reaches the detector. Alternatively, these functions may both be accomplished by a single dichroic filter. The "fluorescence microscope" comprises any microscope that uses fluorescence to generate an image, whether it is a more simple set up like an epifluorescence microscope, or a more complicated design such as a confocal microscope, which uses optical sectioning to get better resolution of the fluorescent image.

In some embodiments, confocal microscopy is used for detection and imaging of the detection probe. Confocal microscopy uses point illumination and a pinhole in an optically conjugate plane in front of the detector to eliminate out-of-focus signal. As only light produced by fluorescence very close to the focal plane can be detected, the image's optical resolution, particularly in the sample depth direction, is much better than that of wide-field microscopes. However, as much of the light from sample fluorescence is blocked at the pinhole, this increased resolution is at the cost of decreased signal intensity—so long exposures are often required. As only one point in the sample is illuminated at a time, 2D or 3D imaging requires scanning over a regular raster (e.g., a rectangular pattern of parallel scanning lines) in the specimen. The achievable thickness of the focal plane is defined mostly by the wavelength of the used light divided by the numerical aperture of the objective lens, but also by the optical properties of the specimen. The thin optical sectioning makes these types of microscopes particularly good at 3D imaging and surface profiling of samples. CLARITY™-optimized light sheet microscopy (COLM) provides an alternative microscopy for fast 3D imaging of large clarified samples. COLM interrogates large immunostained tissues, permits increased speed of acquisition and results in a higher quality of generated data.

Other types of microscopy that can be employed comprise bright field microscopy, oblique illumination microscopy, dark field microscopy, phase contrast, differential interference contrast (DIC) microscopy, interference reflection microscopy (also known as reflected interference contrast, or RIC), single plane illumination microscopy (SPIM), super-resolution microscopy, laser microscopy, electron microscopy (EM), Transmission electron microscopy (TEM), Scanning electron microscopy (SEM), reflection electron microscopy (REM), Scanning transmission electron microscopy (STEM) and low-voltage electron microscopy (LVEM), scanning probe microscopy (SPM), atomic force microscopy (ATM), ballistic electron emission microscopy (BEEM), chemical force microscopy (CFM), conductive atomic force microscopy (C-AFM), electrochemical scanning tunneling microscope (ECS™), electrostatic force microscopy (EFM), fluidic force microscope (FluidFM), force modulation microscopy (FMM), feature-oriented scanning probe microscopy (FOSPM), kelvin probe force microscopy (KPFM), magnetic force microscopy (MFM), magnetic resonance force microscopy (MRFM), near-field scanning optical microscopy (NSOM) (or SNOM, scanning near-field optical microscopy, SNOM, Piezoresponse Force Microscopy (PFM), PS™, photon scanning tunneling microscopy (PS™), PTMS, photothermal microspectroscopy/microscopy (PTMS), SCM, scanning capacitance microscopy (SCM), SECM, scanning electrochemical microscopy (SECM), SGM, scanning gate microscopy (SGM), SHPM, scanning Hall probe microscopy (SHPM), SICM, scanning ion-conductance microscopy (SICM), SPSM spin polarized scanning tunneling microscopy (SPSM), SSRM, scanning spreading resistance microscopy (SSRM), SThM, scanning thermal microscopy (SThM), STM, scanning tunneling microscopy (STM), STP, scanning tunneling potentiometry (STP), SVM, scanning voltage microscopy (SVM), and synchrotron x-ray scanning tunneling microscopy (SXS™), and intact tissue expansion microscopy (exM).

In some embodiments, sequencing can be performed in situ. In situ sequencing typically involves incorporation of a labeled nucleotide (e.g., fluorescently labeled mononucleotides or dinucleotides) in a sequential, template-dependent manner or hybridization of a labeled primer (e.g., a labeled random hexamer) to a nucleic acid template such that the identities (e.g., nucleotide sequence) of the incorporated nucleotides or labeled primer extension products can be determined, and consequently, the nucleotide sequence of the corresponding template nucleic acid. Aspects of in situ sequencing are described, for example, in Mitra et al., (2003) Anal. Biochem. 320, 55-65, and Lee et al., (2014) Science, 343(6177), 1360-1363. In addition, examples of methods and systems for performing in situ sequencing are described in US 2016/0024555, US 2019/0194709, and in U.S. Pat. Nos. 10,138,509, 10,494,662 and 10,179,932. Exemplary techniques for in situ sequencing comprise, but are not limited to, STARmap (described for example in Wang et al., (2018) Science, 361(6499) 5691), MERFISH (described for example in Moffitt, (2016) Methods in Enzymology, 572, 1-49), hybridization-based in situ sequencing (HybISS) (described for example in Gyllborg et al., Nucleic Acids Res (2020) 48(19):e112, and FISSEQ (described for example in US 2019/0032121).

In some embodiments, sequencing can be performed by sequencing-by-synthesis (SBS). In some embodiments, a sequencing primer is complementary to sequences at or near the one or more barcode(s). In such embodiments, sequencing-by-synthesis can comprise reverse transcription and/or amplification in order to generate a template sequence from which a primer sequence can bind. Exemplary SBS methods comprise those described for example, but not limited to, US 2007/0166705, US 2006/0188901, U.S. Pat. No. 7,057,026, US 2006/0240439, US 2006/0281109, US 2011/0059865, US 2005/0100900, U.S. Pat. No. 9,217,178, US 2009/0118128, US 2012/0270305, US 2013/0260372, and US 2013/0079232.

In some embodiments, sequence analysis of nucleic acids (e.g., nucleic acids such as probes or RCPs comprising barcode sequences) can be performed by sequential hybridization (e.g., sequencing by hybridization and/or sequential in situ fluorescence hybridization). Sequential fluorescence hybridization can involve sequential hybridization of detectable probes comprising an oligonucleotide and a detectable label. In some embodiments, a method disclosed herein comprises sequential hybridization of the detectable probes disclosed herein, including detectably labeled probes (e.g., fluorophore conjugated oligonucleotides) and/or probes that are not detectably labeled per se but are capable of binding (e.g., via nucleic acid hybridization) and being detected by detectably labeled probes. Exemplary methods comprising sequential fluorescence hybridization of detectable probes are described in US 2019/0161796, US 2020/0224244, US 2022/0010358, US 2021/0340618, and WO 2021/138676, all of which are incorporated herein by reference. In some embodiments, the methods provided herein can include analyzing the identifier sequences (e.g., analyte sequences or barcode sequences) by sequential hybridization and detection with a plurality of labeled probes (e.g., detection oligonucleotides.

In some embodiments, provided herein are methods for in situ analysis of analytes in a sample using sequential probe hybridization. In some aspects provided herein is a method for analyzing a biological sample, comprising: a) generating a rolling circle amplification product (RCP) of a circular probe or circularizable probe or probe set described herein, the RCP comprising an identifier sequence such as a barcode sequence or analyte sequence, wherein the identifier sequence is associated with an analyte of interest and is assigned a signal code sequence; b) contacting the biological sample with a first probe (e.g., an intermediate probe such as an L-probe) and a first detectably labeled probe to generate a first complex comprising the first probe hybridized to the RCP and the first detectably labeled probe hybridized to the first probe, wherein the first probe comprises (i) a recognition sequence (e.g., a target-binding sequence) complementary to the identifier sequence (e.g., barcode sequence or analyte sequence) and (ii) a first landing sequence (e.g., an overhang sequence), and wherein the first detectably labeled probe comprises a sequence complementary to the first landing sequence; c) detecting a first signal associated with the first detectably labeled probe, wherein the first signal corresponds to a first signal code in the signal code sequence; d) contacting the biological sample with a second probe (e.g., an intermediate probe such as L-probe) and a second detectably labeled probe to generate a second complex comprising the second probe hybridized to the RCP and the second detectably labeled probe hybridized to the second probe, wherein the second probe comprises (i) a recognition sequence (e.g., a target-binding sequence) complementary to the identifier sequence (e.g., barcode sequence or analyte sequence) and (ii) a second landing sequence (e.g., an overhang sequence), and wherein the second detectably labeled probe comprises a sequence complementary to the second landing sequence; and e) detecting a second signal associated with the second detectably labeled probe, wherein the second signal corresponds to a second signal code in the signal code sequence, wherein the signal code sequence comprising the first signal code and the second signal code is determined at a location in the biological sample, thereby decoding the identifier sequence (e.g., barcode sequence or analyte sequence) and identifying the analyte of interest at the location in the biological sample. In some embodiments, the detectable label of the first detectably labeled probe and the detectable label of the second detectably labeled probe are the same. In some embodiments, the detectable labels of the first detectably labeled probe and the second detectably labeled probe are different. In some embodiments, the first signal code and the second signal code are the same. In some embodiments, the first signal code and the second signal code are different.

In some embodiments, the first probe (e.g., a first intermediate probe such as a first L-probe), the second probe (e.g., a second intermediate probe such as a second L-probe), and one or more subsequent probes (e.g., subsequent intermediate probe such as subsequent L-probes) are contacted with the biological sample sequentially in a predetermined sequence which corresponds to the signal code sequence assigned to the identifier sequence (e.g., barcode sequence or analyte sequence), wherein the one or more subsequent probes each comprises (i) a recognition sequence complementary to the identifier sequence (e.g., barcode sequence or analyte sequence) and (ii) an overhang sequence complementary to a detectably labeled probe of a pool (e.g., a universal pool across different cycles of probe hybridization) of detectably labeled probes. In some embodiments, the biological sample is contacted with the first probe before the second probe and one or more subsequent probes. In some embodiments, the biological sample is contacted with the second after the first probe and before and one or more subsequent probes. In some embodiments, the biological sample is contacted with the one or more subsequent probes after the first probe. In some embodiments, the biological sample is contacted with the one or more subsequent probes after the first probe and the second probe.

In some embodiments, the first detectably labeled probe and the second detectably labeled probe are in the pool of detectably labeled probes. A pool of detectably labeled probes may comprises at least two detectably labeled probes, and may be used for multiplexing analyses of two or more target analytes (e.g., target nucleic acids) in a biological sample. In some embodiments, the contacting in b) comprises contacting the biological sample with the universal pool of detectably labeled probes, and the contacting in d) comprises contacting the biological sample with the universal pool of detectably labeled probes. In some embodiments, the universal pool of detectably labeled probes used in the contacting in b) is the same as the universal pool of detectably labeled probes used in the contacting in d). In some embodiments, the universal pool comprises detectably labeled probes each having a detectable label corresponding to a different nucleic acid sequence for hybridization to a landing sequence (e.g., an overhang sequence) in a probe (e.g., an intermediate probe such as an L-probe). In some embodiments, the number of different detectably labeled probes in the universal pool is four.

In some embodiments, the one or more subsequent probes are contacted with the biological sample to determine signal codes in the signal code sequence until sufficient signal codes have been determined to decode the identifier sequence (e.g., barcode sequence or analyte sequence), thereby identifying the target analyte (e.g., target nucleic acid). In some embodiments, the method further comprises a step of removing the first probe and/or the first detectably labeled probe from the biological sample before contacting the sample with a subsequent probe and a detectably labeled probe hybridizing to the subsequent probe. In some embodiments, the method further comprises a step of removing the second probe and/or the second detectably labeled probe from the biological sample, before contacting the sample with a subsequent probe and a detectably labeled probe hybridizing to the subsequent probe.

In some embodiments, the method further comprises identifying multiple different target analytes present at locations (e.g., different locations) in the biological sample. In some embodiments, each different target analyte is assigned a different signal code sequence and is targeted by a circular probe or circularizable probe or probe set comprising a complement of a different barcode sequence of the plurality of barcode sequences. In some embodiments, the number of different probes (e.g., L-probes that have different recognition sequences that bind to the barcode sequences) in each pool of probes is greater than the number of different detectably labeled probes in the universal pool of detectably labeled probes. In some embodiments, the number of different detectably labeled probes in the universal pool is four. In some embodiments, the number of different probes in each pool of probes (e.g., L-probes) is about 10, about 20, about 30, about 40, 50, about 100, about 200, about 500, about 1,000, or more. In some embodiments, the number of different recognition sequences (e.g., recognition sequences that bind to the barcode sequences) of probes in each pool of probes in at least about 10, such as at least any of about 20, 30, 40, 50, 100, 200, 500, 1,000, or more.

In some embodiments, sequencing can be performed using single molecule sequencing by ligation. Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. Aspects and features involved in sequencing by ligation are described, for example, in Shendure et al. Science (2005), 309: 1728-1732, and in U.S. Pat. Nos. 5,599,675; 5,750,341; 6,969,488; 6,172,218; and 6,306,597.

In some embodiments, the barcodes of the detection probes are targeted by detectably labeled secondary probe oligonucleotides, such as fluorescently labeled oligonucleotides. In some embodiments, one or more decoding schemes are used to decode the signals, such as fluorescence, for sequence determination. In any of the embodiments herein, barcodes (e.g., primary and/or secondary barcode sequences) can be analyzed (e.g., detected or sequenced) using any suitable methods or techniques, comprising those described herein, such as RNA sequential probing of targets (RNA SPOTs), sequential fluorescent in situ hybridization (seqFISH), single-molecule fluorescent in situ hybridization (smFISH), multiplexed error-robust fluorescence in situ hybridization (MERFISH), hybridization-based in situ sequencing (HybISS), in situ sequencing, targeted in situ sequencing, fluorescent in situ sequencing (FISSEQ), or spatially-resolved transcript amplicon readout mapping (STARmap). In some embodiments, the methods provided herein comprise analyzing the barcodes by sequential hybridization and detection with a plurality of labelled probes (e.g., detection oligonucleotides). Exemplary decoding schemes are described in Eng et al., "Transcriptome-scale Super-Resolved Imaging in Tissues by RNA SeqFISH+," *Nature* 568(7751):235-239 (2019); Chen et al., "Spatially resolved, highly multiplexed RNA profiling in single cells," *Science;* 348(6233):aaa6090 (2015); Gyllborg et al., Nucleic Acids Res (2020) 48(19):e112; U.S. Pat. No. 10,457,980 B2; US 2016/0369329 A1; WO 2018/026873 A1; US2020/0080139 A1; US20210017587 A1; and US 2017/0220733 A1, all of which are incorporated by reference in their entirety. In some embodiments, these assays enable signal amplification, combinatorial decoding, and error correction schemes at the same time.

In some embodiments, nucleic acid hybridization can be used for sequencing. These methods utilize labeled nucleic acid decoder probes that are complementary to at least a portion of a barcode sequence. Multiplex decoding can be performed with pools of many different probes with distinguishable labels. Non-limiting examples of nucleic acid hybridization sequencing are described for example in U.S. Pat. No. 8,460,865, and in Gunderson et al., Genome Research 14:870-877 (2004).

In some embodiments, real-time monitoring of DNA polymerase activity can be used during sequencing. For example, nucleotide incorporations can be detected through fluorescence resonance energy transfer (FRET), as described for example in Levene et al., *Science* (2003), 299, 682-686, Lundquist et al., *Opt. Lett.* (2008), 33, 1026-1028, and Korlach et al., *Proc. Natl. Acad. Sci. USA* (2008), 105, 1176-1181.

In some aspects, the analysis and/or sequence determination can be carried out at room temperature for best preservation of tissue morphology with low background noise and error reduction. In some embodiments, the analysis and/or sequence determination comprises eliminating error accumulation as sequencing proceeds.

In some embodiments, the analysis and/or sequence determination involves washing to remove unbound polynucleotides, thereafter revealing a fluorescent product for imaging.

V. Compositions, Kits, and Systems

In some embodiments, disclosed herein is a composition that comprises a complex containing a target nucleic acid (e.g., a target nucleic amplification product, such as a rolling circle amplification product) and an oligonucleotide probe (e.g., a circular probe or circularizable probe or probe set) comprising at least two hybridizing regions, e.g., any of the target nucleic acids, and oligonucleotide probes in Section III. In some embodiments, the complex further comprises a secondary probe (e.g., a detection probe), e.g., as described in Section IV. In some embodiments, a first hybridizing region and a second hybridizing region hybridize to each other, such that the nucleic acid concatemer is stabilized and/or compacted.

Also provided herein are kits, for example comprising one or more oligonucleotide probes, e.g., any described in Section III, and instructions for performing the methods provided herein. In some embodiments, the kits further comprise one or more reagents required for one or more steps comprising hybridization, ligation, extension, detection, sequencing, and/or sample preparation as described herein. In some embodiments, the kit further comprises a target nucleic acid, e.g., any described in Sections II and III. In some embodiments, any or all of the oligonucleotides are DNA molecules. In some embodiments, the target nucleic acid is a messenger RNA molecule. In some embodiments, the target nucleic acid is a probe (e.g., a padlock probe) or an amplification product thereof (e.g., a rolling circle amplification product, such as a nucleic acid concatemer). The various components of the kit may be present in separate containers or certain compatible components may be pre-combined into a single container. In some embodiments, the kits further contain instructions for using the components of the kit to practice the provided methods.

In some embodiments, the kits can contain reagents and/or consumables required for performing one or more steps of the provided methods. In some embodiments, the kits contain reagents for fixing, embedding, and/or permeabilizing the biological sample. In some embodiments, the kits contain reagents, such as enzymes and buffers for ligation and/or amplification, such as ligases and/or polymerases. In some aspects, the kit can also comprise any of the reagents described herein, e.g., wash buffer and ligation buffer. In some embodiments, the kits contain reagents for detection and/or sequencing, such as barcode detection probes or detectable labels. In some embodiments, the kits optionally contain other components, for example nucleic acid primers, enzymes and reagents, buffers, nucleotides, and reagents for additional assays.

VI. Applications

In some aspects, the provided embodiments can be applied in an in situ method of analyzing nucleic acid sequences, such as an in situ transcriptomic analysis or in situ sequencing, for example from intact tissues or samples in which the spatial information has been preserved. In some aspects, the embodiments can be applied in an imaging or detection method for multiplexed nucleic acid analysis. In some aspects, the provided embodiments can be used to compact nucleic acid concatemers via hybridizing regions in the circular probe or circularizable probe or probe set that hybridizes to a target nucleic acid in the biological sample, to increase the resolution and stability of the nucleic acid concatemers in situ.

In some embodiments, the region of interest comprises a single-nucleotide polymorphism (SNP). In some embodiments, the region of interest comprises is a single-nucleotide variant (SNV). In some embodiments, the region of interest comprises a single-nucleotide substitution. In some embodiments, the region of interest comprises a point mutation. In some embodiments, the region of interest comprises a single-nucleotide insertion.

In some aspects, the embodiments can be applied in investigative and/or diagnostic applications, for example, for characterization or assessment of particular cell or a tissue from a subject. Applications of the provided method can comprise biomedical research and clinical diagnostics. For example, in biomedical research, applications comprise, but are not limited to, spatially resolved gene expression analysis for biological investigation or drug screening. In clinical diagnostics, applications comprise, but are not limited to, detecting gene markers such as disease, immune responses, bacterial or viral DNA/RNA for patient samples.

In some aspects, the embodiments can be applied to visualize the distribution of genetically encoded markers in whole tissue at subcellular resolution, for example, chromosomal abnormalities (inversions, duplications, translocations, etc.), loss of genetic heterozygosity, the presence of gene alleles indicative of a predisposition towards disease or good health, likelihood of responsiveness to therapy, or in personalized medicine or ancestry

VII. Terminology

Specific terminology is used throughout this disclosure to explain various aspects of the apparatus, systems, methods, and compositions that are described.

Having described some illustrative embodiments of the present disclosure, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the present disclosure. In particular, although many of the examples presented herein involve specific combinations of method acts or system elements, it should be understood that those acts and those elements may be combined in other ways to accomplish the same objectives.

As used herein, the singular forms "a," "an," and "the" include plural referents unless the context clearly dictates otherwise. For example, "a" or "an" means "at least one" or "one or more."

The term "about" as used herein refers to the usual error range for the respective value readily known to the skilled person in this technical field. Reference to "about" a value or parameter herein includes (and describes) embodiments that are directed to that value or parameter per se.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Similarly, use of a), b), etc., or i), ii), etc. does not by itself connote any priority, precedence, or order of steps in the claims. Similarly, the use of these terms in the specification does not by itself connote any required priority, precedence, or order.

(i) Barcode

A "barcode" is a label, or identifier, that conveys or is capable of conveying information (e.g., information about an analyte in a sample and/or a probe). A barcode can be part of an analyte, or independent of an analyte. A barcode can be attached to an analyte. A particular barcode can be unique relative to other barcodes.

Barcodes can have a variety of different formats. For example, barcodes can include polynucleotide barcodes, random nucleic acid and/or amino acid sequences, and synthetic nucleic acid and/or amino acid sequences. A barcode can be attached to an analyte or to another moiety or structure in a reversible or irreversible manner. A barcode can be added to, for example, a fragment of a deoxyribonucleic acid (DNA) or ribonucleic acid (RNA) sample before or during sequencing of the sample. Barcodes can allow for identification and/or quantification of individual sequencing-reads (e.g., a barcode can be or can include a unique molecular identifier or "UMI").

Barcodes can spatially-resolve molecular components found in biological samples, for example, at single-cell resolution (e.g., a barcode can be or can include a "spatial barcode"). In some embodiments, a barcode includes both a UMI and a spatial barcode. In some embodiments, a barcode includes two or more sub-barcodes that together function as a single barcode. For example, a polynucleotide barcode can include two or more polynucleotide sequences (e.g., sub-barcodes) that are separated by one or more non-barcode sequences.

(ii) Nucleic Acid and Nucleotide

The terms "nucleic acid" and "nucleotide" are intended to be consistent with their use in the art and to include naturally-occurring species or functional analogs thereof. Particularly useful functional analogs of nucleic acids are capable of hybridizing to a nucleic acid in a sequence-specific fashion (e.g., capable of hybridizing to two nucleic acids such that ligation can occur between the two hybridized nucleic acids) or are capable of being used as a template for replication of a particular nucleotide sequence. Naturally-occurring nucleic acids generally have a backbone containing phosphodiester bonds. An analog structure can have an alternate backbone linkage including any of a variety of those known in the art. Naturally-occurring nucleic acids generally have a deoxyribose sugar (e.g., found in deoxyribonucleic acid (DNA)) or a ribose sugar (e.g. found in ribonucleic acid (RNA)).

A nucleic acid can contain nucleotides having any of a variety of analogs of these sugar moieties that are known in the art. A nucleic acid can include native or non-native nucleotides. In this regard, a native deoxyribonucleic acid can have one or more bases selected from the group consisting of adenine (A), thymine (T), cytosine (C), or guanine (G), and a ribonucleic acid can have one or more bases selected from the group consisting of uracil (U), adenine (A), cytosine (C), or guanine (G). Useful non-native bases that can be included in a nucleic acid or nucleotide are known in the art.

(iii) Probe and Target

A "probe" or a "target," when used in reference to a nucleic acid or sequence of a nucleic acids, is intended as a semantic identifier for the nucleic acid or sequence in the context of a method or composition, and does not limit the structure or function of the nucleic acid or sequence beyond what is expressly indicated.

(iv) Oligonucleotide and Polynucleotide

The terms "oligonucleotide" and "polynucleotide" are used interchangeably to refer to a single-stranded multimer of nucleotides from about 2 to about 500 nucleotides in length. Oligonucleotides can be synthetic, made enzymatically (e.g., via polymerization), or using a "split-pool" method. Oligonucleotides can include ribonucleotide monomers (e.g., can be oligoribonucleotides) and/or deoxyribonucleotide monomers (e.g., oligodeoxyribonucleotides). In some examples, oligonucleotides can include a combination of both deoxyribonucleotide monomers and ribonucleotide monomers in the oligonucleotide (e.g., random or ordered combination of deoxyribonucleotide monomers and ribonucleotide monomers). An oligonucleotide can be 4 to 10, 10 to 20, 21 to 30, 31 to 40, 41 to 50, 51 to 60, 61 to 70, 71 to 80, 80 to 100, 100 to 150, 150 to 200, 200 to 250, 250 to 300, 300 to 350, 350 to 400, or 400-500 nucleotides in length, for example. Oligonucleotides can include one or more functional moieties that are attached (e.g., covalently or non-covalently) to the multimer structure. For example, an oligonucleotide can include one or more detectable labels (e.g., a radioisotope or fluorophore).

(v) Hybridizing, Hybridize, Annealing, and Anneal

The terms "hybridizing," "hybridize," "annealing," and "anneal" are used interchangeably in this disclosure, and refer to the pairing of substantially complementary or complementary nucleic acid sequences within two different molecules. Pairing can be achieved by any process in which a nucleic acid sequence joins with a substantially or fully complementary sequence through base pairing to form a hybridization complex. For purposes of hybridization, two nucleic acid sequences are "substantially complementary" if at least 60% (e.g., at least 70%, at least 80%, or at least 90%) of their individual bases are complementary to one another.

(vi) Primer

A "primer" is a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A primer, may in some cases, refer to a primer binding sequence.

(vii) Primer Extension

Two nucleic acid sequences can become linked (e.g., hybridized) by an overlap of their respective terminal complementary nucleic acid sequences (e.g., 3' termini). Such linking can be followed by nucleic acid extension (e.g., an enzymatic extension) of one, or both termini using the other nucleic acid sequence as a template for extension. Enzymatic extension can be performed by an enzyme including, but not limited to, a polymerase and/or a reverse transcriptase.

(viii) Nucleic Acid Extension

A "nucleic acid extension" generally involves incorporation of one or more nucleic acids (e.g., A, G, C, T, U, nucleotide analogs, or derivatives thereof) into a molecule (such as, but not limited to, a nucleic acid sequence) in a template-dependent manner, such that consecutive nucleic acids are incorporated by an enzyme (such as a polymerase or reverse transcriptase), thereby generating a newly synthesized nucleic acid molecule. For example, a primer that hybridizes to a complementary nucleic acid sequence can be used to synthesize a new nucleic acid molecule by using the complementary nucleic acid sequence as a template for nucleic acid synthesis. Similarly, a 3' polyadenylated tail of an mRNA transcript that hybridizes to a poly (dT) sequence (e.g., capture domain) can be used as a template for single-strand synthesis of a corresponding cDNA molecule.

(ix) PCR Amplification

A "PCR amplification" comprises the use of a polymerase chain reaction (PCR) to generate copies of genetic material, including DNA and RNA sequences. Suitable reagents and conditions for implementing PCR are described, for example, in U.S. Pat. Nos. 4,683,202, 4,683,195, 4,800,159, 4,965,188, and 5,512,462, the entire contents of each of which are incorporated herein by reference. In a typical PCR amplification, the reaction mixture includes the genetic material to be amplified, an enzyme, one or more primers that are employed in a primer extension reaction, and reagents for the reaction. The oligonucleotide primers are of sufficient length to provide for hybridization to complementary genetic material under annealing conditions. The length of the primers generally depends on the length of the amplification domains, but will typically be at least 4 bases, at least 5 bases, at least 6 bases, at least 8 bases, at least 9 bases, at least 10 base pairs (bp), at least 11 bp, at least 12 bp, at least 13 bp, at least 14 bp, at least 15 bp, at least 16 bp, at least 17 bp, at least 18 bp, at least 19 bp, at least 20 bp, at least 25 bp, at least 30 bp, at least 35 bp, and can be as long as 40 bp or longer, where the length of the primers will generally range from 18 to 50 bp. The genetic material can be contacted with a single primer or a set of two primers (forward and reverse primers), depending upon whether primer extension, linear or exponential amplification of the genetic material is desired.

In some embodiments, the PCR amplification process uses a DNA polymerase enzyme. The DNA polymerase activity can be provided by one or more distinct DNA polymerase enzymes. In certain embodiments, the DNA polymerase enzyme is from a bacterium, e.g., the DNA polymerase enzyme is a bacterial DNA polymerase enzyme. For instance, the DNA polymerase can be from a bacterium of the genus *Escherichia, Bacillus, Thermophilus*, or *Pyrococcus*.

Suitable examples of DNA polymerases that can be used include, but are not limited to: *E. coli* DNA polymerase I, Bsu DNA polymerase, Bst DNA polymerase, Taq DNA polymerase, VENT™ DNA polymerase, DEEPVENT™ DNA polymerase, LongAmp® Taq DNA polymerase, LongAmp® Hot Start Taq DNA polymerase, Crimson LongAmp® Taq DNA polymerase, Crimson Taq DNA polymerase, OneTaq® DNA polymerase, OneTaq® Quick-Load® DNA polymerase, Hemo KlenTaq® DNA polymerase, REDTaq® DNA polymerase, Phusion® DNA polymerase, Phusion® High-Fidelity DNA polymerase, Platinum Pfx DNA polymerase, AccuPrime Pfx DNA polymerase, Phi29 DNA polymerase, Klenow fragment, Pwo DNA polymerase, Pfu DNA polymerase, T4 DNA polymerase and T7 DNA polymerase enzymes.

The term "DNA polymerase" includes not only naturally-occurring enzymes but also all modified derivatives thereof, including also derivatives of naturally-occurring DNA polymerase enzymes. For instance, in some embodiments, the DNA polymerase can have been modified to remove 5'-3' exonuclease activity. Sequence-modified derivatives or mutants of DNA polymerase enzymes that can be used include, but are not limited to, mutants that retain at least some of the functional, e.g. DNA polymerase activity of the wild-type sequence. Mutations can affect the activity profile of the enzymes, e.g. enhance or reduce the rate of polymerization, under different reaction conditions, e.g. temperature, template concentration, primer concentration, etc. Mutations or sequence-modifications can also affect the exonuclease activity and/or thermostability of the enzyme.

In some embodiments, PCR amplification can include reactions such as, but not limited to, a strand-displacement amplification reaction, a rolling circle amplification reaction, a ligase chain reaction, a transcription-mediated amplification reaction, an isothermal amplification reaction, and/or a loop-mediated amplification reaction.

In some embodiments, PCR amplification uses a single primer that is complementary to the 3' tag of target DNA fragments. In some embodiments, PCR amplification uses a first and a second primer, where at least a 3' end portion of the first primer is complementary to at least a portion of the 3' tag of the target nucleic acid fragments, and where at least a 3' end portion of the second primer exhibits the sequence of at least a portion of the 5' tag of the target nucleic acid fragments. In some embodiments, a 5' end portion of the first primer is non-complementary to the 3' tag of the target nucleic acid fragments, and a 5' end portion of the second primer does not exhibit the sequence of at least a portion of the 5' tag of the target nucleic acid fragments. In some embodiments, the first primer includes a first universal sequence and/or the second primer includes a second universal sequence.

In some embodiments (e.g., when the PCR amplification amplifies captured DNA), the PCR amplification products can be ligated to additional sequences using a DNA ligase enzyme. The DNA ligase activity can be provided by one or more distinct DNA ligase enzymes. In some embodiments, the DNA ligase enzyme is from a bacterium, e.g., the DNA ligase enzyme is a bacterial DNA ligase enzyme. In some embodiments, the DNA ligase enzyme is from a virus (e.g., a bacteriophage). For instance, the DNA ligase can be T4 DNA ligase. Other enzymes appropriate for the ligation step include, but are not limited to, Tth DNA ligase, Taq DNA ligase, *Thermococcus* sp. (strain 9oN) DNA ligase (9oN™

DNA ligase, available from New England Biolabs, Ipswich, MA), and Ampligase™ (available from Epicentre Biotechnologies, Madison, WI). Derivatives, e.g. sequence-modified derivatives, and/or mutants thereof, can also be used.

In some embodiments, genetic material is amplified by reverse transcription polymerase chain reaction (RT-PCR). The desired reverse transcriptase activity can be provided by one or more distinct reverse transcriptase enzymes, suitable examples of which include, but are not limited to: M-MLV, MuLV, AMV, HIV, ArrayScript™, MultiScribe™, ThermoScript™, and SuperScript® I, II, III, and IV enzymes. "Reverse transcriptase" includes not only naturally occurring enzymes, but all such modified derivatives thereof, including also derivatives of naturally-occurring reverse transcriptase enzymes.

In addition, reverse transcription can be performed using sequence-modified derivatives or mutants of M-MLV, MuLV, AMV, and HIV reverse transcriptase enzymes, including mutants that retain at least some of the functional, e.g. reverse transcriptase, activity of the wild-type sequence. The reverse transcriptase enzyme can be provided as part of a composition that includes other components, e.g. stabilizing components that enhance or improve the activity of the reverse transcriptase enzyme, such as RNase inhibitor(s), inhibitors of DNA-dependent DNA synthesis, e.g. actinomycin D. Many sequence-modified derivative or mutants of reverse transcriptase enzymes, e.g. M-MLV, and compositions including unmodified and modified enzymes are commercially available, e.g. ArrayScript™, MultiScribe™, ThermoScript™, and SuperScript® I, II, III, and IV enzymes.

Certain reverse transcriptase enzymes (e.g. Avian Myeloblastosis Virus (AMV) Reverse Transcriptase and Moloney Murine Leukemia Virus (M-MuLV, MMLV) Reverse Transcriptase) can synthesize a complementary DNA strand using both RNA (cDNA synthesis) and single-stranded DNA (ssDNA) as a template. Thus, in some embodiments, the reverse transcription reaction can use an enzyme (reverse transcriptase) that is capable of using both RNA and ssDNA as the template for an extension reaction, e.g. an AMV or MMLV reverse transcriptase.

In some embodiments, the quantification of RNA and/or DNA is carried out by real-time PCR (also known as quantitative PCR or qPCR), using techniques well known in the art, such as but not limited to "TAQMAN™" or "SYBR®", or on capillaries ("LightCycler® Capillaries"). In some embodiments, the quantification of genetic material is determined by optical absorbance and with real-time PCR. In some embodiments, the quantification of genetic material is determined by digital PCR. In some embodiments, the genes analyzed can be compared to a reference nucleic acid extract (DNA and RNA) corresponding to the expression (mRNA) and quantity (DNA) in order to compare expression levels of the target nucleic acids.

(x) Antibody

An "antibody" is a polypeptide molecule that recognizes and binds to a complementary target antigen. Antibodies typically have a molecular structure shape that resembles a Y shape. Naturally-occurring antibodies, referred to as immunoglobulins, belong to one of the immunoglobulin classes IgG, IgM, IgA, IgD, and IgE. Antibodies can also be produced synthetically. For example, recombinant antibodies, which are monoclonal antibodies, can be synthesized using synthetic genes by recovering the antibody genes from source cells, amplifying into an appropriate vector, and introducing the vector into a host to cause the host to express the recombinant antibody. In general, recombinant antibodies can be cloned from any species of antibody-producing animal using suitable oligonucleotide primers and/or hybridization probes. Recombinant techniques can be used to generate antibodies and antibody fragments, including non-endogenous species.

Synthetic antibodies can be derived from non-immunoglobulin sources. For example, antibodies can be generated from nucleic acids (e.g., aptamers), and from non-immunoglobulin protein scaffolds (such as peptide aptamers) into which hypervariable loops are inserted to form antigen binding sites. Synthetic antibodies based on nucleic acids or peptide structures can be smaller than immunoglobulin-derived antibodies, leading to greater tissue penetration.

Antibodies can also include affimer proteins, which are affinity reagents that typically have a molecular weight of about 12-14 kDa. Affimer proteins generally bind to a target (e.g., a target protein) with both high affinity and specificity. Examples of such targets include, but are not limited to, ubiquitin chains, immunoglobulins, and C-reactive protein. In some embodiments, affimer proteins are derived from cysteine protease inhibitors, and include peptide loops and a variable N-terminal sequence that provides the binding site.

Antibodies can also refer to an "epitope binding fragment" or "antibody fragment," which as used herein, generally comprises a portion of a complete antibody capable of binding the same epitope as the complete antibody, albeit not necessarily to the same extent. Although multiple types of epitope binding fragments are possible, an epitope binding fragment typically comprises at least one pair of heavy and light chain variable regions (VH and VL, respectively) held together (e.g., by disulfide bonds) to preserve the antigen binding site, and does not contain all or a portion of the Fc region. Epitope binding fragments of an antibody can be obtained from a given antibody by any suitable technique (e.g., recombinant DNA technology or enzymatic or chemical cleavage of a complete antibody), and typically can be screened for specificity in the same manner in which complete antibodies are screened. In some embodiments, an epitope binding fragment comprises an F(ab')2 fragment, Fab' fragment, Fab fragment, Fd fragment, or Fv fragment. In some embodiments, the term "antibody" includes antibody-derived polypeptides, such as single chain variable fragments (scFv), diabodies or other multimeric scFvs, heavy chain antibodies, single domain antibodies, or other polypeptides comprising a sufficient portion of an antibody (e.g., one or more complementarity determining regions (CDRs)) to confer specific antigen binding ability to the polypeptide.

(xi) Label, Detectable Label, and Optical Label

The terms "detectable label," "optical label," and "label" are used interchangeably herein to refer to a directly or indirectly detectable moiety that is associated with (e.g., conjugated to) a molecule to be detected, e.g., a probe or analyte. The detectable label can be directly detectable by itself (e.g., radioisotope labels or fluorescent labels) or, in the case of an enzymatic label, can be indirectly detectable, e.g., by catalyzing chemical alterations of a substrate compound or composition, which substrate compound or composition is directly detectable. Detectable labels can be suitable for small scale detection and/or suitable for high-throughput screening. As such, suitable detectable labels include, but are not limited to, radioisotopes, fluorophores, chemiluminescent compounds, bioluminescent compounds, and dyes.

The detectable label can be qualitatively detected (e.g., optically or spectrally), or it can be quantified. Qualitative detection generally includes a detection method in which the existence or presence of the detectable label is confirmed, whereas quantifiable detection generally includes a detection method having a quantifiable (e.g., numerically reportable) value such as an intensity, duration, polarization, and/or other properties. In some embodiments, the detectable label is bound to a feature or to a probe associated with a feature. For example, detectably labelled features can include a fluorescent, a colorimetric, or a chemiluminescent label attached to a bead (see, for example, Rajeswari et al., *J. Microbiol Methods* 139:22-28, 2017, and Forcucci et al., *J. Biomed Opt.* 10:105010, 2015, the entire contents of each of which are incorporated herein by reference).

In some embodiments, a plurality of detectable labels can be attached to a feature, probe, or composition to be detected. For example, detectable labels can be incorporated during nucleic acid polymerization or amplification (e.g., Cy5®-labelled nucleotides, such as Cy5®-dCTP). Any suitable detectable label can be used. In some embodiments, the detectable label is a fluorophore. For example, the fluorophore can be from a group that includes: 7-AAD (7-Aminoactinomycin D), Acridine Orange (+DNA), Acridine Orange (+RNA), Alexa Fluor® 350, Alexa Fluor® 430, Alexa Fluor® 488, Alexa Fluor® 532, Alexa Fluor® 546, Alexa Fluor® 555, Alexa Fluor® 568, Alexa Fluor® 594, Alexa Fluor® 633, Alexa Fluor® 647, Alexa Fluor® 660, Alexa Fluor® 680, Alexa Fluor® 700, Alexa Fluor® 750, Allophycocyanin (APC), AMCA/AMCA-X, 7-Aminoactinomycin D (7-AAD), 7-Amino-4-methylcoumarin, 6-Aminoquinoline, Aniline Blue, ANS, APC-Cy7, ATTO-TAG™ CBQCA, ATTO-TAG™ FQ, Auramine 0-Feulgen, BCECF (high pH), BFP (Blue Fluorescent Protein), BFP/GFP FRET, BOBO™-1/BO-PRO™-1, BOBO™-3/BO-PRO™-3, BODIPY® FL, BODIPY® TMR, BODIPY® TR-X, BODIPY® 530/550, BODIPY® 558/568, BODIPY® 564/570, BODIPY® 581/591, BODIPY® 630/650-X, BODIPY® 650-665-X, BTC, Calcein, Calcein Blue, Calcium Crimson™, Calcium Green-1™, Calcium Orange™, Calcofluor® White, 5-Carboxyfluoroscein (5-FAM), 5-Carboxynaphthofluoroscein, 6-Carboxyrhodamine 6G, 5-Carboxytetramethylrhodamine (5-TAMRA), Carboxy-X-rhodamine (5-ROX), Cascade Blue®, Cascade Yellow™, CCF2 (GeneBLAzer™), CFP (Cyan Fluorescent Protein), CFP/YFP FRET, Chromomycin A3, Cl-NERF (low pH), CPM, 6-CR 6G, CTC Formazan, Cy2®, Cy3®, Cy3.5®, Cy5®, Cy5.5®, Cy7®, Cychrome (PE-Cy5), Dansylamine, Dansyl cadaverine, Dansylchloride, DAPI, Dapoxyl, DCFH, DHR, DiA (4-Di-16-ASP), DiD (Di1C18(5)), DIDS, Di1 (Di1C18(3)), DiO (DiOC18(3)), DiR (Di1C18(7)), Di-4 ANEPPS, Di-8 ANEPPS, DM-NERF (4.5-6.5 pH), DsRed (Red Fluorescent Protein), EBFP, ECFP, EGFP, ELF®-97 alcohol, Eosin, Erythrosin, Ethidium bromide, Ethidium homodimer-1 (EthD-1), Europium (III) Chloride, 5-FAM (5-Carboxyfluorescein), Fast Blue, Fluorescein-dT phosphoramidite, FITC, Fluo-3, Fluo-4, FluorX®, Fluoro-Gold™ (high pH), Fluoro-Gold™ (low pH), Fluoro-Jade, FM® 1-43, Fura-2 (high calcium), Fura-2/BCECF, Fura Red™ (high calcium), Fura Red™/Fluo-3, GeneBLAzer™ (CCF2), GFP Red Shifted (rsGFP), GFP Wild Type, GFP/BFP FRET, GFP/DsRed FRET, Hoechst 33342 & 33258, 7-Hydroxy-4-methylcoumarin (pH 9), 1,5 IAEDANS, Indo-1 (high calcium), Indo-1 (low calcium), Indodicarbocyanine, Indotricarbocyanine, JC-1, 6-JOE, JOJO™-1/JO-PRO™-1, LDS 751 (+DNA), LDS 751 (+RNA), LOLO™-1/LO-PRO™-1, Lucifer Yellow, LysoSensor™ Blue (pH 5), LysoSensor™ Green (pH 5), LysoSensor™ Yellow/Blue (pH 4.2), LysoTracker® Green, LysoTracker® Red, LysoTracker® Yellow, Mag-Fura-2, Mag-Indo-1, Magnesium Green™, Marina Blue®, 4-Methylumbelliferone, Mithramycin, MitoTracker® Green, MitoTracker® Orange, MitoTracker® Red, NBD (amine), Nile Red, Oregon Green® 488, Oregon Green® 500, Oregon Green® 514, Pacific Blue, PBF1, PE (R-phycoerythrin), PE-Cy5, PE-Cy7, PE-Texas Red, PerCP (Peridinin chlorphyll protein), PerCP-Cy5.5 (TruRed), PharRed (APC-Cy7), C-phycocyanin, R-phycocyanin, R-phycoerythrin (PE), PI (Propidium Iodide), PKH26, PKH67, POPO™-1/PO-PRO™-1, POPO™-3/PO-PRO™-3, Propidium Iodide (PI), PyMPO, Pyrene, Pyronin Y, Quantam Red (PE-Cy5), Quinacrine Mustard, R670 (PE-Cy5), Red 613 (PE-Texas Red), Red Fluorescent Protein (DsRed), Resorufin, RH 414, Rhod-2, Rhodamine B, Rhodamine Green™, Rhodamine Red™, Rhodamine Phalloidin, Rhodamine 110, Rhodamine 123, 5-ROX (carboxy-X-rhodamine), S65A, S65C, S65L, S65T, SBFI, SITS, SNAFL®-1 (high pH), SNAFL®-2, SNARF®-1 (high pH), SNARF®-1 (low pH), Sodium Green™, SpectrumAqua®, SpectrumGreen® #1, SpectrumGreen® #2, SpectrumOrange®, SpectrumRed®, SYTO® 11, SYTO® 13, SYTO® 17, SYTO® 45, SYTOX® Blue, SYTOX® Green, SYTOX® Orange, 5-TAMRA (5-Carboxytetramethylrhodamine), Tetramethylrhodamine (TRITC), Texas Red®/Texas Red®-X, Texas Red®-X (NHS Ester), Thiadicarbocyanine, Thiazole Orange, TOTO®-1/TO-PRO®-1, TOTO®-3/TO-PRO®-3, TO-PRO®-5, Tri-color (PE-Cy5), TRITC (Tetramethylrhodamine), TruRed (PerCP-Cy5.5), WW 781, X-Rhodamine (XRITC), Y66F, Y66H, Y66W, YFP (Yellow Fluorescent Protein), YOYO®-1/YO-PRO®-1, YOYO®-3/YO-PRO®-3, 6-FAM (Fluorescein), 6-FAM (NHS Ester), 6-FAM (Azide), HEX, TAMRA (NHS Ester), Yakima Yellow, MAX, TET, TEX615, ATTO 488, ATTO 532, ATTO 550, ATTO 565, ATTO Rho101, ATTO 590, ATTO 633, ATTO 647N, TYE 563, TYE 665, TYE 705, 5' IRDye® 700, 5' IRDye® 800, 5' IRDye® 800CW (NHS Ester), WellRED D4 Dye, WellRED D3 Dye, WellRED D2 Dye, Lightcycler® 640 (NHS Ester), and Dy 750 (NHS Ester).

As mentioned above, in some embodiments, a detectable label is or includes a luminescent or chemiluminescent moiety. Common luminescent/chemiluminescent moieties include, but are not limited to, peroxidases such as horseradish peroxidase (HRP), soybean peroxidase (SP), alkaline phosphatase, and luciferase. These protein moieties can catalyze chemiluminescent reactions given the appropriate substrates (e.g., an oxidizing reagent plus a chemiluminescent compound. A number of compound families are known to provide chemiluminescence under a variety of conditions. Non-limiting examples of chemiluminescent compound families include 2,3-dihydro-1,4-phthalazinedione luminol, 5-amino-6,7,8-trimethoxy- and the dimethylamino[ca]benz analog. These compounds can luminesce in the presence of alkaline hydrogen peroxide or calcium hypochlorite and base. Other examples of chemiluminescent compound families include, e.g., 2,4,5-triphenylimidazoles, para-dimethylamino and—methoxy substituents, oxalates such as oxalyl active esters, p-nitrophenyl, N-alkyl acridinum esters, luciferins, lucigenins, or acridinium esters. In some embodiments, a detectable label is or includes a metal-based or mass-based label. For example, small cluster metal ions, metals, or semiconductors may act as a mass code. In some examples, the metals can be selected from Groups 3-15 of the periodic table, e.g., Y, La, Ag, Au, Pt, Ni, Pd, Rh, Jr, Co, Cu, Bi, or a combination thereof.

EXAMPLES

The following examples are included for illustrative purposes only and are not intended to limit the scope of the present disclosure.

Example 1: Compaction of an RCP In Situ in a Biological Sample Using Complementary Hybridizing Regions in the RCP This example demonstrates a method for compacting a rolling circle amplification (RCA) product (RCP). In particular, this example demonstrates compaction of an RCP in situ in a biological sample via hybridization of hybridizing regions in the RCP.

A biological sample (e.g., a processed or cleared biological sample, a tissue sample, a sample embedded in a hydrogel, etc.) is contacted with a primary probe, such as a circular probe or a circularizable probe or probe set (e.g., a padlock probe). The circular probe or circularizable probe or probe set can comprise a first hybridizing region and a second hybridizing region capable of hybridizing to each other, e.g., as shown in FIG. 1A. In some instances, the circular probe or circularizable probe or probe set can comprise a palindromic sequence, e.g., as shown in FIG. 1B. In some examples, the circular probe or circularizable probe or probe set can comprise two or more palindromic sequences which can be of the same sequence or different sequences. In examples where the probe or probe set contains only one palindromic sequence, the RCP would contain multiple copies of the complement of the same palindromic sequence, and any two copies can hybridize to each. In some examples, as shown in FIG. 1C, the circular probe or circularizable probe or probe set comprises a first hybridizing region and a second hybridizing region capable of hybridizing to each other, and additionally comprises a third hybridizing region and a fourth hybridizing region capable of hybridizing to each other. The third hybridizing region can be the same or different from the first hybridizing region, and the fourth hybridizing region can be the same or different from the second hybridizing region. In some examples, the first and second hybridizing regions are different in sequence from the third and fourth hybridizing regions respectively and cannot hybridize to the third or fourth hybridizing regions. For instance, the first and second hybridizing regions can be of the same palindromic sequence 1, the second and third hybridizing regions can be of the same palindromic sequence 2, and palindromic sequence 1 is different from palindromic sequence 2. In other examples, the first, second, third, and fourth hybridizing regions can be the same palindromic sequence.

The circular probe or circularizable probe or probe set is hybridized to a target nucleic acid sequence, such as an mRNA or cDNA, in the biological sample, and in the case of a circularizable probe or probe set, the probe molecule(s) can be ligated to generate a closed circle. The closed circle is then amplified by a polymerase (e.g., Phi29) in an RCA reaction to generate an RCP comprising multiple copies of the complements of the first and second hybridizing regions (e.g., multiple copies of the complement of the first hybridizing region and multiple copies of the complement of the second hybridizing region) or multiple copies of the palindromic sequence.

The hybridizing region and the complement thereof (e.g., compaction region in the RCP) may be any short sequence of nucleic acids, e.g., about 4 to 30 base pairs in length, and in some embodiments, is a palindromic sequence. An exemplary palindromic sequence, 5'-AGGTAGCTACCT-3'(SEQ ID NO: 1) is shown in FIG. 2C. In the RCP, the hybridizing regions in the RCP (which are the complements of the hybridizing regions in the circular probe or circularizable probe or probe set) may form a hairpin structure while the first hybridizing region hybridizing to the second hybridizing region. As shown in FIG. 2A and the top portion of FIG. 3, the complementary first hybridizing region and second hybridizing region have the potential to form relatively ordered tandem repeats, e.g., when RCA occurs at a temperature below the melting temperature ($T_m$) of hybridization of the first hybridizing region with the second hybridizing region.

In some examples, the hybridizing regions are designed such that the $T_m$ of hybridization of the first hybridizing region with the second hybridizing region is in equilibrium with that of the amplification temperature for RCA. While the hybridizing regions may still form a hairpin structure within the same copy of the RCP unit sequence (e.g., Copy 1 or Copy 2), there is potential for inter-copy hybridization as illustrated in FIG. 2B or the bottom portion of FIG. 3, when the $T_m$ of hybridization is in thermodynamic equilibrium with the amplification temperature. For instance, the first hybridizing region in Copy 1 hybridizes to the second hybridizing region in Copy 2, whereas the second hybridizing region in Copy 1 hybridizes to the first hybridizing region in Copy 2 (FIG. 3, bottom portion). This inter-copy hybridization may compact the RCP (e.g., compare FIG. 2B to FIG. 2A), as it may reduce the contour length of the RCP.

As shown in FIG. 2A, the complementary first hybridizing region and second hybridizing region have the potential to form relatively ordered tandem repeats of hairpin structures if RCA occurs at a temperature below the melting temperature of hybridization of the first hybridizing region with the second hybridizing region, and the complementary third hybridizing region and fourth hybridizing region have the potential to form relatively ordered tandem repeats if RCA occurs at a temperature below the melting temperature of hybridization of the third hybridizing region with the fourth hybridizing region. By having two sets of hybridizing regions with different complementary sequences yet a melting temperature in thermodynamic equilibrium with the RCA temperature (e.g., 30° C.), ordered tandem repeats of hairpin structures on the RCP have the potential to disassemble and the hybridizing regions in the same copy of the RCP unit sequence can hybridize with hybridizing regions in other copies, as seen in FIG. 2B.

Overall, the introduction of hybridizing regions in a circular probe or circularizable probe or probe set can allow for efficient compaction of RCPs in situ in a biological sample.

Example 2: Detection and Compaction of an RCP Using Circularized Probes with Various Secondary Structures This example demonstrates a method for compacting an RCP comprising various hybridizing region hybridization configurations. In particular, this example demonstrates effective compaction and detection of RCPs in situ in biological samples.

Two circular probe or circularizable probe designs were used to detect Satb2 transcripts in fresh frozen mouse brain tissue sections, by detecting RCPs of the circularized probes in the tissue samples. The probes were hybridized to the tissue samples in a hybridization buffer including SSC and formamide and incubated. Ligation of the probes hybridized on RNA in the samples was performed using SplintR® ligase in the presence of a SplintR® ligase buffer, BSA, and RNAse inhibitor. RCA primers were hybridized to the ligated probes in a solution contain SSC and formamide. RCA reaction mixture (containing Phi29 reaction buffer, dNTPs, Phi29 polymerase) was added and incubated for RCA. RCPs in the samples were detected using Cy-3 labelled detectable probes at room temperature.

The first probe design, shown in FIG. 4B, comprises a dumbbell structure formed by two loops of roughly equal size, comprising 20 to 50 nucleotides and 40 to 50 nucleotides, respectively, separated by a duplex stem region (e.g., hybridizing regions hybridized to each other) of 10 nucleotides in length. The second design, shown in FIG. 4A, comprises a hairpin structure formed by two loops, the first comprising 4 nucleotides and the second comprising between 56 to 106 nucleotides, separated by a stem region of 30 nucleotides in length.

Figure 5:
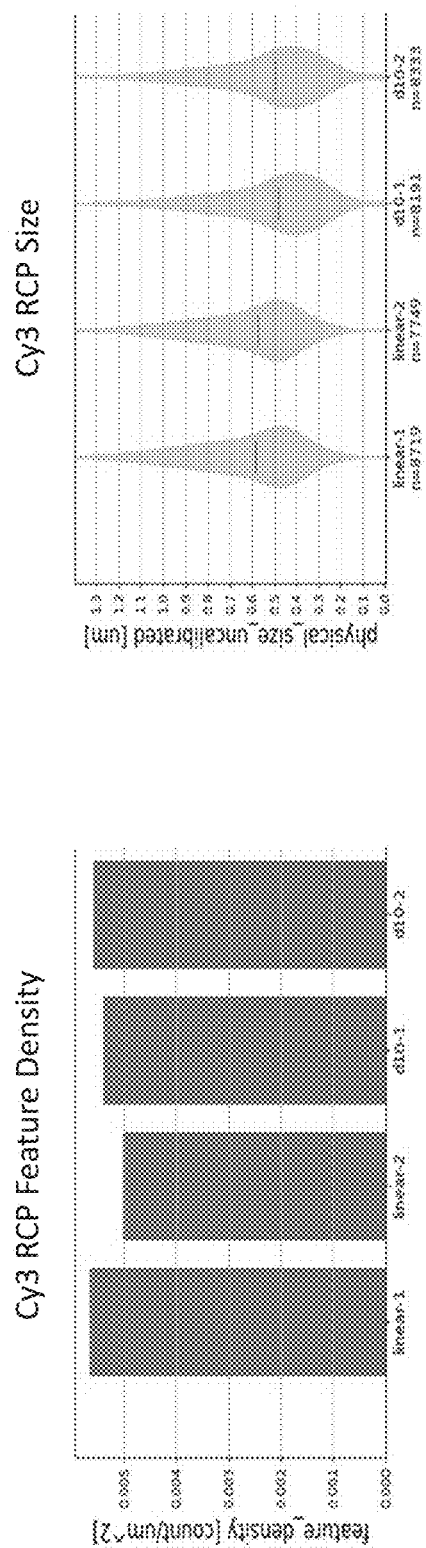
FIG. 5 shows the results from an assay evaluating the compaction of RCPs generated from circularized probes having a dumbbell structure.

FIG. 5 shows the results of the detection of RCPs generated from the circularized probe shown in FIG. 4B. The first panel of FIG. 5 depicts the density of RCPs generated from amplification of the probe as determined by the number of detected products per unit area (e.g., object counts per $\mu m^2$ nuclei area). Feature density detected using the probes comprising hybridizing regions was comparable to that of control probes. The second panel of FIG. 5 depicts the physical size of the RCPs. The controls ("linear-1" and "linear-2") were probes having no hairpin or dumbbell secondary structures. The controls showed an average RCP size of around 0.6 $\mu m$. The RCPs generated with the circularized probe with the dumbbell structure ("d10-1" and "d10-2," comprising the 10 nucleotide-long dumbbell hybridizing region where the duplex stem was 10 bp) showed an average size of around 0.5 $\mu m$. These results demonstrate that the hybridizing regions in the dumbbell probe allow the RCPs to compact to a greater degree than RCPs generated from probes not comprising a hybridizing region, indicating that the dumbbell probe resulted in compaction of the RCPs without sacrificing RCP signal count.

Figure 6:
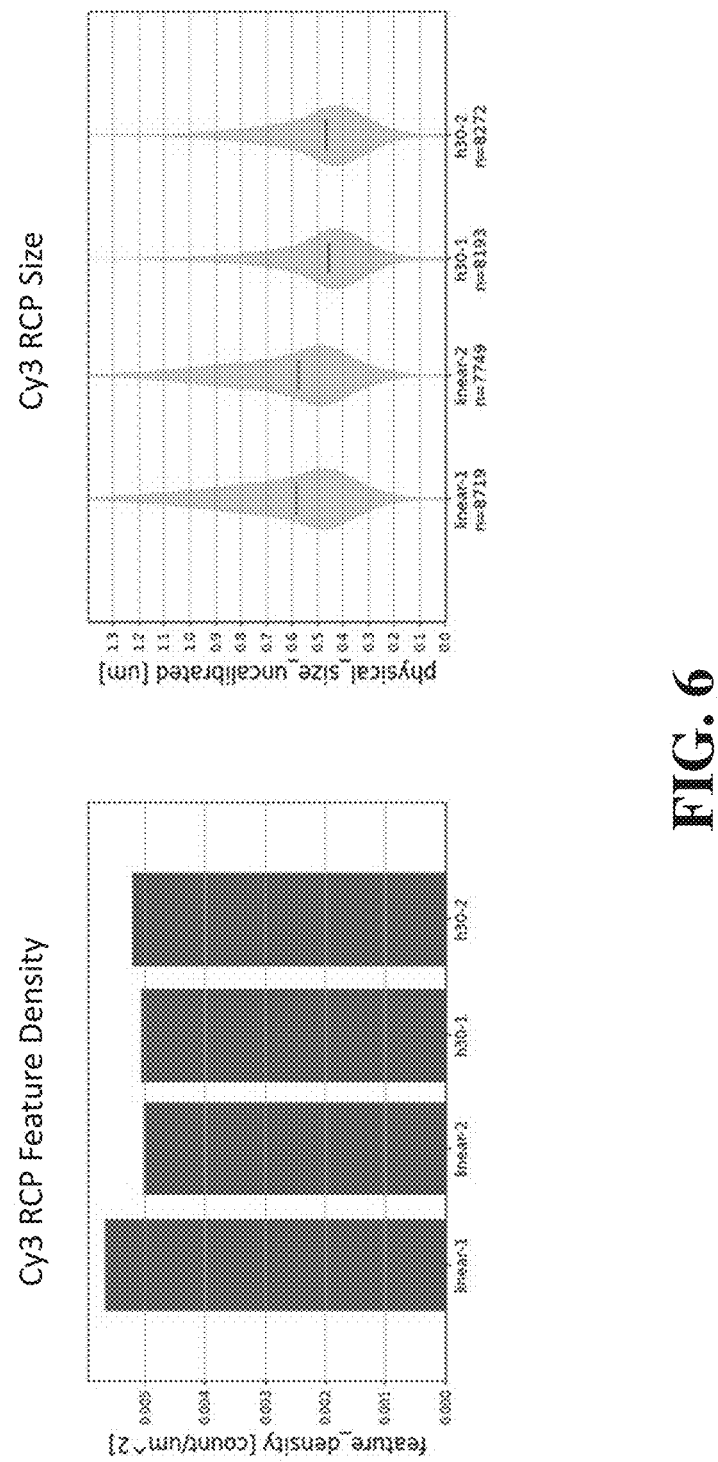
FIG. 6 shows the results from an assay evaluating the compaction of RCPs generated from circularized probes having a hairpin structure.

FIG. 6 shows the results from experiments testing the compaction and amplification RCPs generated from the circularized probe shown in FIG. 4A. The first panel of FIG. 6 depicts the density of RCPs generated from amplification of the probe as determined by the number of detected products per unit area. Feature density detected using the probes comprising hybridizing regions was comparable to that of control probes. The second panel of FIG. 6 depicts the physical size of the RCPs. The controls ("linear-1" and "linear-2") were probes having no hairpin or dumbbell secondary structures. The controls showed an average RCP size of around 0.6 $\mu m$. The RCPs generated from the circularized probe with the hairpin structure ("h30-1" and "h30-2", comprising the 30 nucleotide-long hybridizing region in the hairpin stem) showed an average size of around 0.45 $\mu m$. These results demonstrate that the hybridizing regions in the hairpin probe allow the RCPs to compact to a greater degree than RCPs generated from probes not comprising a hybridizing region, indicating that the hairpin probe resulted in compaction of the RCPs without sacrificing RCP signal count.

Example 3: Reduction of RCP Size Using Palindromic Sequences in RCP

This example demonstrates effective compaction and detection of RCPs in tissue samples. Circularizable probes containing a palindromic sequence (e.g., the 12-mer 5'-AGGTAGCTACCT-3'(SEQ ID NO: 1) shown in FIG. 2C) were used to detect transcripts in FFPE samples and fresh frozen (FF) mouse brain or human tonsil (huTonsil) samples, essentially as described in Example 2. RCP size in the different tissue types was analyzed and compared. The samples were imaged using fluorescent microscopy and the signals associated with the RCPs were quantified using a software.

Figure 7:
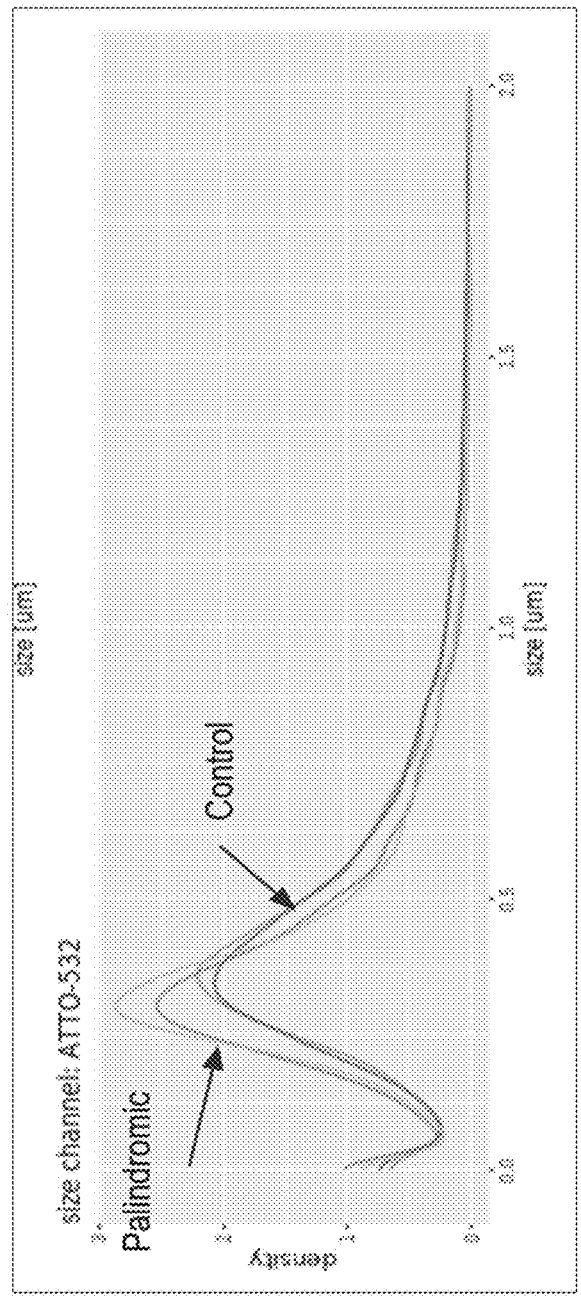
FIG. 7 depicts RCP feature density plotted against RCP size detected in fresh frozen mouse brain samples, using a circularizable probe comprising a palindromic sequence ("Palindromic") or using a circularizable probe comprising no palindromic sequence ("Control").
Figure 8A:
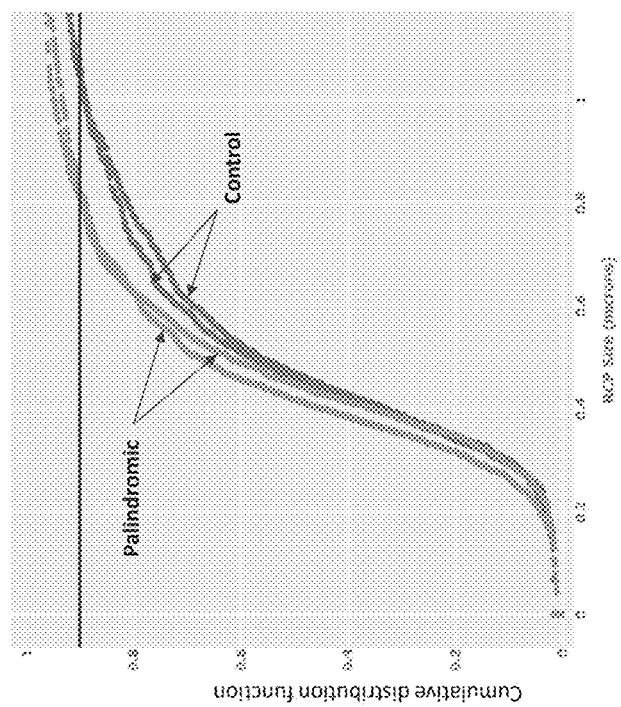
FIGS. 8A-8B show RCP size distributions in an FFPE tissue sample (FIG. 8A) and in an FF huTonsil tissue sample (FIG. 8B), detected using a circularizable probe comprising a palindromic sequence ("Palindromic") or using a circularizable probe comprising no palindromic sequence ("Control").
Figure 8B:
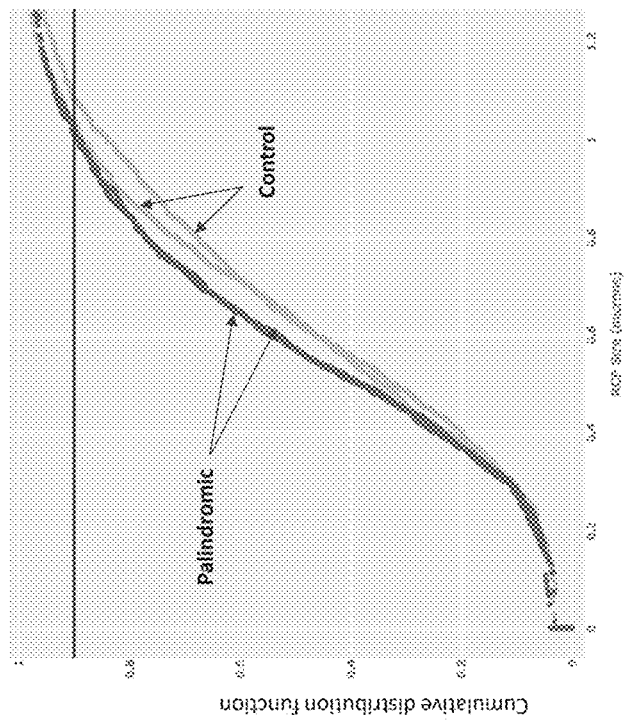
Figures 9, 10:
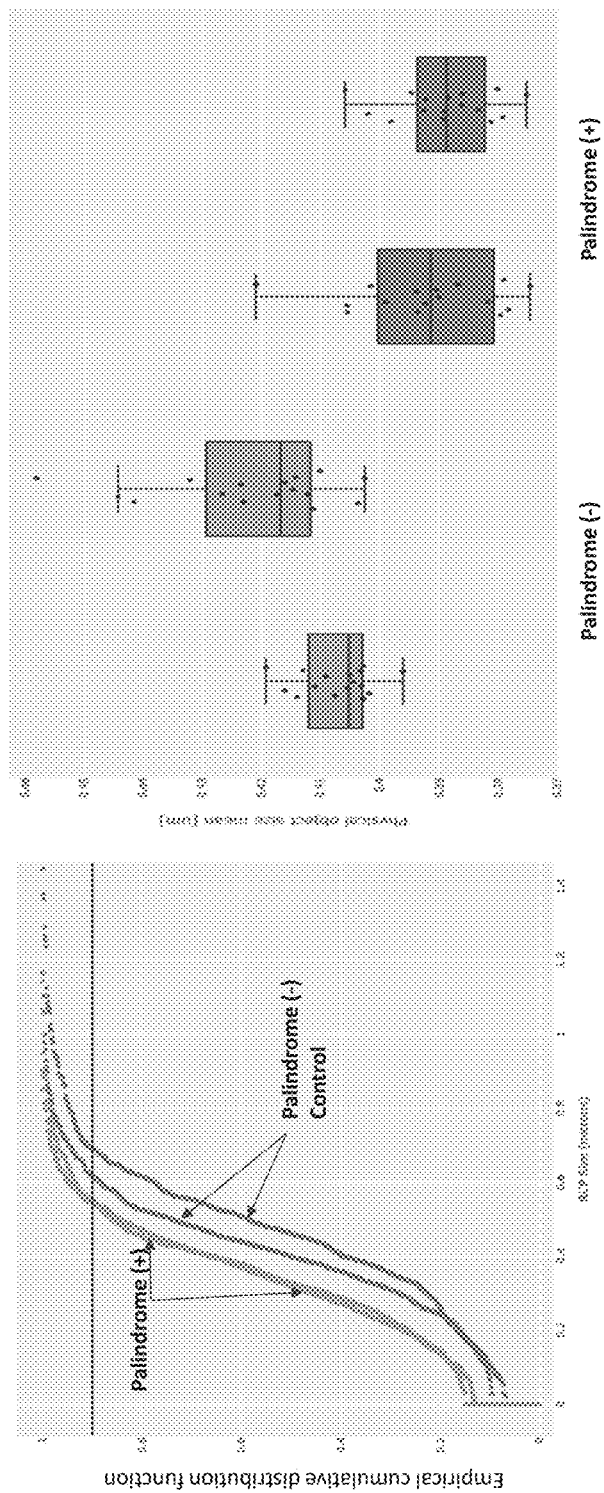
FIG. 9 shows relative RCP size difference detected using a circularizable probe comprising a palindromic sequence ("Palindrome (+)") or using a circularizable probe comprising no palindromic sequence ("Palindrome (−)"), detected in an FFPE tissue sample and at a higher resolution than in FIGS. 8A-8B.
FIG. 10 shows the mean and median RCP size detected in an FFPE tissue sample using the Palindrome (+) probe or the Palindrome (−) probe.

FIG. 7 depicts RCP feature density (y-axis) detected in FF mouse brain using a probe comprising a palindromic sequence compared to a control probe without palindromic sequences, plotted against the RCP size (x-axis). The probe comprising the palindromic sequence generated higher RCP density, and the RCP size also tends to be smaller compared to the control probe. As shown in FIGS. 8A-8B, RCPs detected using the probe comprising the palindromic sequence are generally smaller in both FFPE (FIG. 8A) and FF huTonsil (FIG. 8B) samples. FIG. 9 shows the relative size difference of RCPs detected at a higher resolution than in FIGS. 8A-8B, where the relative RCP size difference between RCP size detected using palindrome (+) and palindrome (−) probes in FFPE tissue samples are compared. Results demonstrate that the relative RCP size is significantly more pronounced when imaged at the higher resolution, with 85% of RCPs below 500 nm in the palindrome (+) group compared to 59% of RCPs below 500 nm in the palindrome (−) control group. FIG. 10 shows the mean and median RCP size of in both palindrome (+) and palindrome (−) groups. The mean RCP size is 0.39 $\mu m$ and the median RCP size is 0.345 $\mu m$ in the palindrome (+) group. These results show that probes comprising a palindromic sequence can be used to reduce RCP size in in situ analyte detection in various tissue and sample types.

The present disclosure is not intended to be limited in scope to the particular disclosed embodiments, which are provided, for example, to illustrate various aspects of the disclosure. Various modifications to the compositions and methods described will become apparent from the description and teachings herein. Such variations may be practiced without departing from the true scope and spirit of the disclosure and are intended to fall within the scope of the present disclosure.

The invention claimed is:

1. A method comprising:
   (a) contacting a biological sample with a circular probe or circularizable probe or probe set that hybridizes to a target nucleic acid in the biological sample, wherein the circular probe or circularizable probe or probe set comprises a first hybridizing region and a second hybridizing region capable of hybridizing to each other;
   (b) generating a rolling circle amplification product (RCP) at a location in the biological sample using the circular probe or a circularized probe generated from the circularizable probe or probe set as a template, wherein the RCP comprises multiple copies of complementary sequences of the first and second hybridizing regions, and wherein the complementary sequences of the first and second hybridizing regions from different copies hybridize to one another, thereby compacting and/or stabilizing the RCP at the location; and
   (c) detecting the RCP at the location in the biological sample.

2. The method of claim 1, wherein the first and second hybridizing regions are complementary to each other.

3. The method of claim 1, wherein the circular or circularizable probe or probe set comprises a palindromic sequence comprising the first and second hybridizing regions.

4. The method of claim 1, wherein the circular probe or circularizable probe or probe set further comprises a third hybridizing region and a fourth hybridizing region capable of hybridizing to each other.

5. The method of claim 4, wherein the first and second hybridizing regions are different in sequence from the third and fourth hybridizing regions, respectively.

6. The method of claim 4, wherein the first and second hybridizing regions do not hybridize to the third or fourth hybridizing region.

7. The method of claim 4, wherein the first and second hybridizing regions are the same in sequence as the third and fourth hybridizing regions, respectively.

8. The method of claim 1, wherein the circular probe or circularizable probe or probe set further comprises one or more barcode sequences.

9. The method of claim 1, wherein the first and second hybridizing regions are linked by a loop region.

10. The method of claim 9, wherein the loop region is no more than 5, no more than 10, no more than 15, no more than 20, no more than 25, or no more than 30 nucleotides in length.

11. The method of claim 1, wherein the melting temperature of a duplex of the first and second hybridizing regions is in thermodynamic equilibrium with the temperature at which the RCP is generated.

12. The method of claim 11, wherein the melting temperature is between about 15° C. and about 45° C. and/or wherein the temperature at which the RCP is generated is between about 15° C. and about 45° C.

13. The method of claim 1, wherein in the RCP, the complementary sequence of the first hybridizing region of a first copy hybridizes to the complementary sequence of the second hybridizing region of a second copy, and the complementary sequence of the second hybridizing region of the first copy hybridizes to the complementary sequence of the first hybridizing region of the second copy.

14. The method of claim 13, wherein the first and second copies are separated by 0, 1, 2, 5, 10, 20, 50, 100, or more copies in the RCP.

15. The method of claim 1, wherein: i) the compacted RCP has a diameter of between about 0.1 µm and about 3 µm, optionally between about 0.1 µm and about 0.5 µm, optionally between about 0.2 µm and about 0.3 µm, or between about 0.3 µm and about 0.4 µm, between about 0.5 µm and about 1 µm, between about 0.8 µm and about 1.3 µm, or between about 1 µm and about 1.5 µm; and/or ii) the compacted RCP is between about 1 and about 15 kilobases, between about 15 and about 25 kilobases, between about 25 and about 35 kilobases, between about 35 and about 45 kilobases, between about 45 and about 55 kilobases, between about 55 and about 65 kilobases, between about 65 and about 75 kilobases, or more than 75 kilobases in length, optionally between about 45 and about 70 kilobases.

16. The method of claim 1, wherein the target nucleic acid is an mRNA.

17. The method of claim 1, wherein the compacted RCP is immobilized in the biological sample.

18. The method of claim 1, wherein the method comprises imaging the biological sample to detect the RCP.

19. A method comprising:
   (a) contacting the biological sample with a padlock probe comprising a sequence that hybridizes to a target nucleic acid in the biological sample, wherein the padlock probe comprises:
   (i) a first hybridizing region and a second hybridizing region capable of hybridizing to each other, wherein the first and second hybridizing regions are linked by a loop region and
   (ii) one or more barcode sequences;
   (b) generating a rolling circle amplification product (RCP) at a location in the biological sample using a circularized padlock probe as a template, wherein the padlock probe is circularized to generate the circularized padlock probe using the target nucleic acid and/or a splint as template, wherein the RCP comprises multiple copies of complementary sequences of the first and second hybridizing regions, and wherein the complementary sequences of the first and second hybridizing regions from different copies hybridize to one another, thereby compacting and/or stabilizing the RCP at the location in the biological sample; and
   (c) detecting the RCP at the location in the biological sample.

20. A method comprising:
   (a) contacting the biological sample with a padlock probe comprising a sequence that hybridizes to a target nucleic acid in the biological sample, wherein the padlock probe comprises:
   (i) a first hybridizing region and a second hybridizing region capable of hybridizing to each other, wherein the first and second hybridizing regions are linked by a first loop region;
   (ii) a third hybridizing region and a fourth hybridizing region capable of hybridizing to each other, wherein the third and fourth hybridizing regions are linked by a second loop region; and
   (iii) one or more barcode sequences in the first and/or second loop regions;
   (b) generating a rolling circle amplification product (RCP) at a location in the biological sample using a circularized padlock probe as a template, wherein the padlock probe is circularized to generate the circularized padlock probe using the target nucleic acid and/or a splint as template, wherein the RCP comprises multiple copies of complementary sequences of the first, second, third, and fourth hybridizing regions, and wherein the complementary sequences of the first and second hybridizing regions from two or more different copies hybridize to one another and the complementary sequences of the third and fourth hybridizing regions from two or more different copies hybridize to one another, thereby compacting and/or stabilizing the RCP at the location in the biological sample; and (c) detecting the RCP at the location in the biological sample.

* * * * *